(12) United States Patent
Hibi et al.

(10) Patent No.: US 10,451,410 B2
(45) Date of Patent: Oct. 22, 2019

(54) SHAPE MEASUREMENT APPARATUS AND SHAPE MEASUREMENT METHOD

(71) Applicant: NIPPON STEEL & SUMITOMO METAL CORPORATION, Tokyo (JP)

(72) Inventors: Atsuhiro Hibi, Tokyo (JP); Yusuke Konno, Tokyo (JP); Nobuhiro Furuya, Tokyo (JP); Tomohiro Kuroiwa, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 106 days.

(21) Appl. No.: 15/567,933

(22) PCT Filed: Apr. 22, 2016

(86) PCT No.: PCT/JP2016/062801
§ 371 (c)(1),
(2) Date: Oct. 19, 2017

(87) PCT Pub. No.: WO2016/171263
PCT Pub. Date: Oct. 27, 2016

(65) Prior Publication Data
US 2018/0106608 A1 Apr. 19, 2018

(30) Foreign Application Priority Data

Apr. 22, 2015 (JP) ................. 2015-087517

(51) Int. Cl.
*G06T 7/60* (2017.01)
*G01B 11/02* (2006.01)
(Continued)

(52) U.S. Cl.
CPC .......... *G01B 11/2513* (2013.01); *G01B 11/02* (2013.01); *G01B 11/25* (2013.01); *G06T 7/60* (2013.01); *H04N 5/247* (2013.01)

(58) Field of Classification Search
None
See application file for complete search history.

(56) References Cited

U.S. PATENT DOCUMENTS 7,898,652 B2 * 3/2011 Hariyama .......... G01N 21/8922
356/237.1
10,255,520 B2 * 4/2019 Deng .................. G06K 9/6202
(Continued)

FOREIGN PATENT DOCUMENTS

CN 1523589 A 6/1998
CN 102353684 A 2/2012
(Continued)

OTHER PUBLICATIONS

A. Rovid, P. Varlaki and T. Hashimoto, "Vision Based Measurement System for Supporting the Deformation Analysis," 2008 International Conference on Intelligent Engineering Systems, Miami, FL, 2008, pp. 215-220. doi: 10.1109/INES.2008.4481297.*
(Continued)

*Primary Examiner* — Jiangeng Sun
(74) *Attorney, Agent, or Firm* — Birch, Stewart, Kolasch & Birch, LLP

(57) ABSTRACT

[Object] To measure the surface height of a rigid body to be measured more accurately even if any one of three types of disturbance of translation in the height direction, rotation around the longitudinal-direction axis, and rotation around the width-direction axis has occurred during conveyance.
[Solution] A shape measurement apparatus according to the present invention uses a shape-measuring light-section line that is a light-section line extending in the width direction of a rigid body to be measured and is used to calculate the surface shape of the rigid body to be measured, a first correcting light-section line that is parallel to the longitudinal direction of the rigid body to be measured and crosses the shape-measuring light-section line, and is used to correct
(Continued)

the effect of disturbance acting on the rigid body to be measured, and a second correcting light-section line that is parallel to the longitudinal direction of the rigid body to be measured, crosses the shape-measuring light-section line, and exists in a width-direction position of the rigid body to be measured different from the first correcting light-section line. On the basis of the two kinds of correcting light-section lines, the magnitude of disturbance is estimated at the intersection points of the shape-measuring light-section line and the correcting light-section lines; and thereby shape data obtained from the shape-measuring light-section line are corrected.

16 Claims, 29 Drawing Sheets

(51) Int. Cl.
  G01B 11/25 (2006.01)
  H04N 5/247 (2006.01)

(56) References Cited

U.S. PATENT DOCUMENTS

| | | | |
|---|---|---|---|
| 2004/0136278 A1 | 7/2004 | Lee et al. | |
| 2010/0209002 A1 | 8/2010 | Thiel et al. | |
| 2012/0204614 A1* | 8/2012 | Isei | B21C 51/00 |
| | | | 72/12.8 |
| 2013/0076857 A1* | 3/2013 | Kurashige | G01B 11/25 |
| | | | 348/40 |
| 2016/0012599 A1* | 1/2016 | Kuboyama | G06F 3/017 |
| | | | 348/348 |
| 2016/0260217 A1* | 9/2016 | Kitamura | G01B 11/2513 |
| 2017/0016832 A1* | 1/2017 | Umemura | G01N 21/892 |
| 2017/0343338 A1* | 11/2017 | Hamaguchi | G01B 11/25 |
| 2018/0087898 A1* | 3/2018 | Akagi | G01B 11/245 |
| 2018/0292203 A1* | 10/2018 | Akagi | G01B 11/30 |

FOREIGN PATENT DOCUMENTS

| | | |
|---|---|---|
| JP | 10-160437 A | 6/1998 |
| JP | 2011-47857 A | 3/2011 |
| JP | 2012-32271 A | 2/2012 |
| JP | 2013-221799 A | 10/2013 |
| WO | WO 2010/034301 A2 | 4/2010 |

OTHER PUBLICATIONS

Yang Zhang, Wei Liu,* Xiaodong Li, Fan Yang, Peng Gao, and Zhenyuan Jia, "Accuracy improvement in laser stripe extraction for large-scale triangulation scanning measurement system", Optical Engineering 54(10), 105108 (Oct. 2015).*

International Search Report for PCT/JP2016/062801 (PCT/ISA/210) dated Jul. 12, 2016.

Written Opinion of the International Searching Authority for PCT/JP2016/062801 (PCT/ISA/237) dated Jul. 12, 2016.

Extended European Search Report, dated Jul. 23, 2018, for corresponding European Application No. 16783284.9.

Chinese Office Action and Search Report dated Apr. 26, 2019, for corresponding Chinese Application No. 201680036936.7.

* cited by examiner

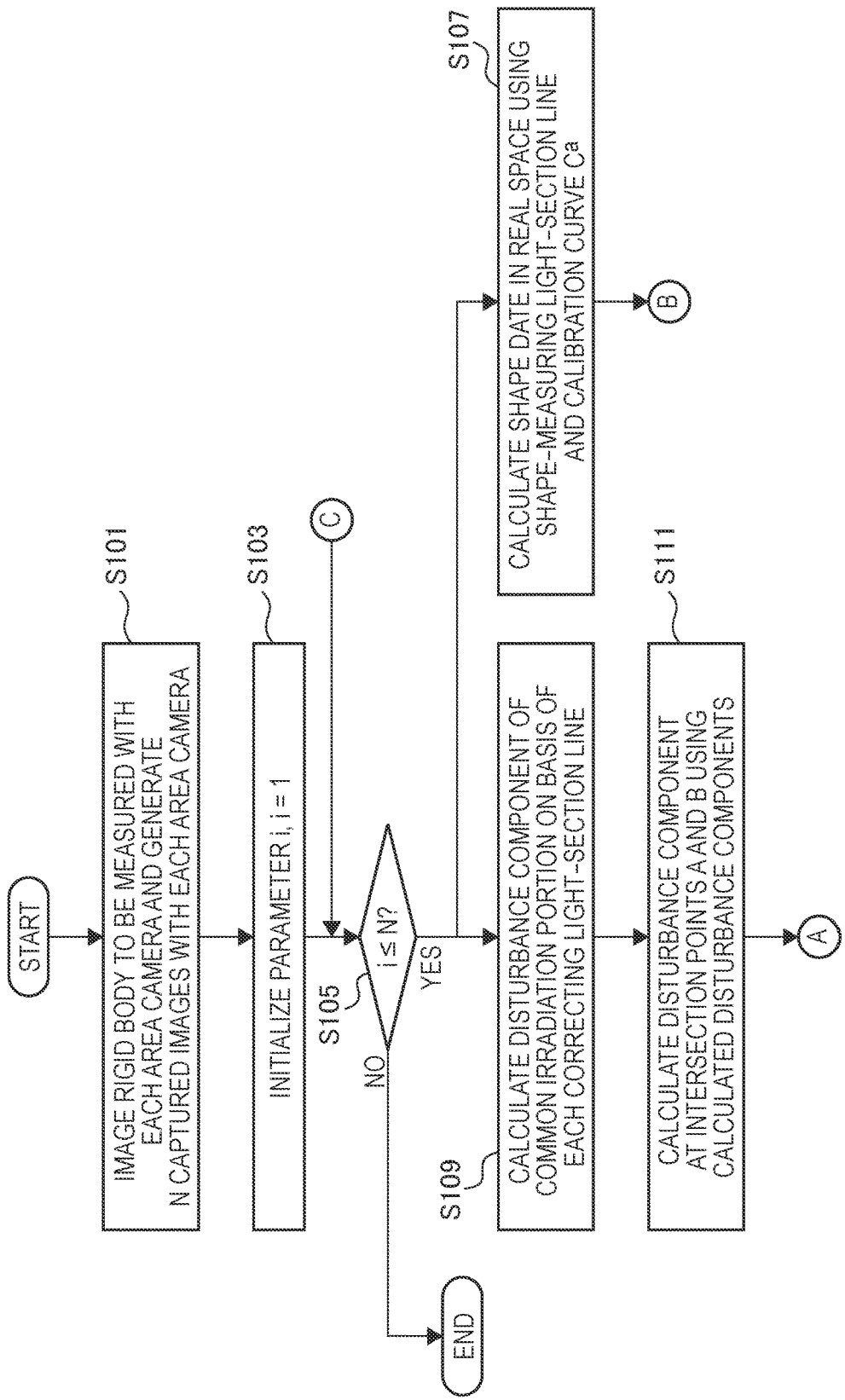

$Z(i, X^a)$ $(i=1,2,\cdots,60)$ $Z_{out}(i, X^a)$ $(i=1,2,\cdots,60)$ $Z(i, X^a)$ $(i=1,2,\cdots,60)$ $Z_{out}(i, X^a)$ $(i=1,2,\cdots,60)$ Z(i, X$^a$) (i=1,2, ⋯ , 60)

Z$_{out}$(i, X$^a$) (i=1,2, ⋯ , 60)

SHAPE MEASUREMENT APPARATUS AND SHAPE MEASUREMENT METHOD

TECHNICAL FIELD

The present invention relates to a shape measurement apparatus and a shape measurement method.

BACKGROUND ART

A slab, which is a steel semi-finished product, a thick sheet produced using the slab, and the like are conveyed on a production line composed of a plurality of rolls during the production process thereof. At this time, shape measurement using what is called a light-section method is performed in order to measure the surface height of a rigid body such as the slab or the thick sheet. However, when a rigid body such as a slab or a thick sheet is conveyed on a production line, there has been a problem that the fluctuation in the surface height derived from the vertical movement and rotation of the rigid body (hereinafter, referred to as "disturbance") is superimposed on the measured surface height, and the true surface height cannot be measured.

To address the problem mentioned above, a technology shown in Patent Literature 1 below proposes forming, in addition to a light-section line for the original shape measurement formed in the width direction of a rigid body to be measured, another light-section line in a direction oblique to the light-section line mentioned above (directions that are not mutually parallel). In the technology, the measurement of the same point of the rigid body to be measured, which is originally supposed to have the same surface height, is performed twice for each of a plurality of points of different longitudinal-direction positions and different width-direction positions. After that, the magnitude of disturbance (vertical movement and rotation) by which the surface heights of the plurality of points mentioned above coincide most favorably is obtained by optimization calculation, and the effect of disturbance is removed from the measurement result.

CITATION LIST

Patent Literature

Patent Literature 1: JP 2013-221799A

SUMMARY OF INVENTION

Technical Problem

However, in the technology shown in Patent Literature 1 above, if the measurement error is large in the surface height measurement of each measurement point, the optimization calculation may not converge correctly. Furthermore, the technology shown in Patent Literature 1 above has a problem that errors are superimposed on the measurement result in the case where three types of disturbance of vertical movement (translation in the height direction), rotation around the longitudinal-direction axis, and rotation around the width-direction axis, which may exist as disturbance, exist simultaneously.

Thus, the present invention has been made in view of the problems mentioned above, and an object of the present invention is to provide a shape measurement apparatus and a shape measurement method that can measure the surface height of a rigid body to be measured more accurately even if any one of three types of disturbance of translation in the height direction, rotation around the longitudinal-direction axis, and rotation around the width-direction axis has occurred during conveyance.

Solution to Problem

According to an aspect of the present invention in order to achieve the above-mentioned object, there is provided a shape measurement apparatus that measures a shape of a rigid body to be measured by means of a plurality of light-section lines based on a plurality of linear laser light beams applied to a surface of the rigid body to be measured from a plurality of linear laser light sources moving relative to the rigid body to be measured along a longitudinal direction of the rigid body to be measured. The shape measurement apparatus includes: an imaging apparatus that applies three beams of the linear laser light to the surface of the rigid body to be measured moving relatively along the longitudinal direction and images reflected light of the three beams of the linear laser light from the surface of the rigid body to be measured at a prescribed longitudinal-direction interval; and an arithmetic processing apparatus that performs image processing on captured images related to the light-section lines imaged by the imaging apparatus and calculates a surface shape of the rigid body to be measured. The imaging apparatus includes a first linear laser light source that emits a shape-measuring light-section line that is the light-section line extending in a width direction of the rigid body to be measured and is used to calculate the surface shape of the rigid body to be measured, a second linear laser light source that emits a first correcting light-section line that is parallel to the longitudinal direction of the rigid body to be measured and crosses the shape-measuring light-section line, and is used to correct an effect of disturbance acting on the rigid body to be measured, a third linear laser light source that emits a second correcting light-section line that is parallel to the longitudinal direction of the rigid body to be measured, crosses the shape-measuring light-section line, and exists in a width-direction position of the rigid body to be measured different from the first correcting light-section line, and is used to correct an effect of disturbance acting on the rigid body to be measured, a first camera that images the shape-measuring light-section line at each time corresponding to a prescribed longitudinal-direction interval and generates a captured image of the shape-measuring light-section line at each time, and a second camera that images the correcting light-section lines at each time corresponding to a prescribed longitudinal-direction interval and generates a captured image of the correcting light-section lines at each time, and the arithmetic processing apparatus includes a shape data calculation unit that, on the basis of the captured image of the shape-measuring light-section line at each time generated by the first camera, calculates shape data that show a three-dimensional shape of the surface of the rigid body to be measured and in which a measurement error derived from the disturbance is superimposed, a disturbance estimation unit that performs, on a plurality of points of different longitudinal-direction positions of the first correcting light-section line, height change value acquisition processing of acquiring, from height measurement values related to a surface height of the rigid body to be measured acquired at different two times for the same position of the rigid body to be measured, a height change value derived from the disturbance at the position, using captured images of the first correcting light-section line, performs the height change value acquisition processing on a plurality of points of different longitudinal-direction positions of the second correcting light-section line using captured images of the second correcting light-section line, and estimates the amount of height fluctuation derived from the disturbance superimposed in the shape data, using a plurality of height change values derived from the disturbance obtained from captured images of the first correcting light-section line and a plurality of height change values derived from the disturbance obtained from captured images of the second correcting light-section line, and a correction unit that subtracts the amount of height fluctuation from the shape data and thereby corrects the measurement error derived from the disturbance.

It is preferable that the disturbance estimation unit approximate, with a straight line, height change values derived from the disturbance at a plurality of points on the first correcting light-section line and estimates a height change value derived from the disturbance at an intersection point of the straight line and the shape-measuring light-section line, approximate, with a straight line, height change values derived from the disturbance at a plurality of points on the second correcting light-section line and estimates a height change value derived from the disturbance at an intersection point of the straight line and the shape-measuring light-section line, and estimate the amount of height fluctuation by means of a straight line connecting the height change values derived from the disturbance at the two intersection points.

It is preferable that each of the first camera and the second camera perform imaging at each time corresponding to a prescribed longitudinal-direction interval and generates N (N being an integer of 2 or more) captured images, and that the disturbance estimation unit calculate the amount of height fluctuation on the assumption that the disturbance has not occurred in a 1st captured image.

It is preferable that an imaging timing of the first camera and the second camera be controlled so that a common irradiation region that is a portion of the rigid body to be measured irradiated with the correcting light-section line in common exists in captured images of the second camera captured at mutually adjacent imaging times, and that the disturbance estimation unit calculate a height change value derived from the disturbance for the plurality of points falling under the common irradiation region of each of the first correcting light-section line and the second correcting light-section line.

It is preferable that using an apparent surface height including the height change value obtained from an i+1-th captured image (i=1, 2, . . . , N−1) of the second camera and a surface height that is obtained from an i-th captured image of the second camera and that is after the height change value in the common irradiation region of the i-th captured image is removed, the disturbance estimation unit calculate the height change value in the i+1-th captured image and a surface height after the height change value is removed.

It is preferable that the disturbance estimation unit calculate the height change value in an i-th captured image (i=2, . . . , N) of the second camera with a 1st captured image of the second camera as a reference.

It is preferable that the first linear laser light source, the second linear laser light source, and the third linear laser light source be provided such that an optical axis of each light source is perpendicular to a plane defined by a longitudinal direction and a width direction of the rigid body to be measured.

It is preferable that an angle between an optical axis of the first camera and an optical axis of the first linear laser light source, an angle between a line of sight of the second camera and an optical axis of the second linear laser light source, and an angle between the line of sight of the second camera and an optical axis of the third linear laser light source be mutually independently not less than 30 degrees and not more than 60 degrees.

According to an aspect of the present invention in order to achieve a shape measurement method that measures a shape of a rigid body to be measured by means of a plurality of light-section lines based on a plurality of linear laser light beams applied to a surface of the rigid body to be measured from a plurality of linear laser light sources moving relative to the rigid body to be measured along a longitudinal direction of the rigid body to be measured, there is provided the shape measurement method including: an imaging step of imaging reflected light of three light-section lines from the surface of the rigid body to be measured at a prescribed longitudinal-direction interval by applying the three light-section lines to the surface of the rigid body to be measured moving relatively along the longitudinal direction from an imaging apparatus including a first linear laser light source that emits a shape-measuring light-section line that is the light-section line extending in a width direction of the rigid body to be measured and is used to calculate a surface shape of the rigid body to be measured, a second linear laser light source that emits a first correcting light-section line that is parallel to the longitudinal direction of the rigid body to be measured and crosses the shape-measuring light-section line, and is used to correct an effect of disturbance acting on the rigid body to be measured, a third linear laser light source that emits a second correcting light-section line that is parallel to the longitudinal direction of the rigid body to be measured, crosses the shape-measuring light-section line, and exists in a width-direction position of the rigid body to be measured different from the first correcting light-section line, and is used to correct an effect of disturbance acting on the rigid body to be measured, a first camera that images the shape-measuring light-section line at each time corresponding to a prescribed longitudinal-direction interval and generates a captured image of the shape-measuring light-section line at each time, and a second camera that images the correcting light-section lines at each time corresponding to a prescribed longitudinal-direction interval and generates a captured image of the correcting light-section lines at each time; a shape data calculation step of, on the basis of the captured image of the shape-measuring light-section line at each time generated by the first camera, calculating shape data that show a three-dimensional shape of the surface of the rigid body to be measured and in which a measurement error derived from the disturbance is superimposed; a disturbance estimation step of performing, on a plurality of points of different longitudinal-direction positions of the first correcting light-section line, height change value acquisition processing of acquiring, from height measurement values related to a surface height of the rigid body to be measured acquired at different two times for the same position of the rigid body to be measured, a height change value derived from the disturbance at the position, using captured images of the first correcting light-section line, performing the height change value acquisition processing on a plurality of points of different longitudinal-direction positions of the second correcting light-section line using captured images of the second correcting light-section line, and estimating the amount of height fluctuation derived from the disturbance superimposed in the shape data, using a plurality of height change values derived from the disturbance obtained from captured images of the first correcting light-section line and a plurality of height change values derived from the disturbance obtained from captured images of the second correcting light-section line; and a correction step of subtracting the amount of height fluctuation from the shape data and thereby correcting the measurement error derived from the disturbance.

It is preferable that in the disturbance estimation step, height change values derived from the disturbance at a plurality of points on the first correcting light-section line be approximated with a straight line and thereby a height change value derived from the disturbance at an intersection point of the straight line and the shape-measuring light-section line be estimated, height change values derived from the disturbance at a plurality of points on the second correcting light-section line be approximated with a straight line and thereby a height change value derived from the disturbance at an intersection point of the straight line and the shape-measuring light-section line be estimated, and the amount of height fluctuation be estimated by means of a straight line connecting the height change values derived from the disturbance at the two intersection points.

It is preferable that each of the first camera and the second camera perform imaging at each time corresponding to a prescribed longitudinal-direction interval and generate N (N being an integer of 2 or more) captured images, and that in the disturbance estimation step, the amount of height fluctuation be calculated on the assumption that the disturbance has not occurred in a 1st captured image.

It is preferable that an imaging timing of the first camera and the second camera be controlled so that a common irradiation region that is a portion of the rigid body to be measured irradiated with the correcting light-section line in common exists in captured images of the second camera imaged at mutually adjacent imaging times, and in the disturbance estimation step, a height change value derived from the disturbance be calculated for the plurality of points falling under the common irradiation region of each of the first correcting light-section line and the second correcting light-section line.

It is preferable that in the disturbance estimation step, using an apparent surface height including the height change value obtained from an i+1-th captured image (i=1, 2, ..., N−1) of the second camera and a surface height that is obtained from an i-th captured image of the second camera and that is after the height change value in the common irradiation region of the i-th captured image is removed, the height change value in the i+1-th captured image and a surface height after the height change value is removed be calculated.

It is preferable that in the disturbance estimation step, the height change value in an i-th captured image (i=2, ..., N) of the second camera be calculated with a 1st captured image of the second camera as a reference.

It is preferable that the first linear laser light source, the second linear laser light source, and the third linear laser light source be provided such that an optical axis of each light source is perpendicular to a plane defined by a longitudinal direction and a width direction of the rigid body to be measured.

It is preferable that an angle between an optical axis of the first camera and an optical axis of the first linear laser light source, an angle between a line of sight of the second camera and an optical axis of the second linear laser light source, and an angle between the line of sight of the second camera and an optical axis of the third linear laser light source be mutually independently not less than 30 degrees and not more than 60 degrees.

Advantageous Effects of Invention

As described above, according to the present invention, it becomes possible to measure the surface height of a rigid body to be measured more accurately even if any one of three types of disturbance of translation in the height direction, rotation around the longitudinal-direction axis, and rotation around the width-direction axis has occurred during conveyance.

BRIEF DESCRIPTION OF DRAWINGS

FIG. 29A is a flow chart showing an example of the flow of a shape measurement method according to the embodiment.

DESCRIPTION OF EMBODIMENTS

Hereinafter, (a) preferred embodiment(s) of the present invention will be described in detail with reference to the appended drawings. In this specification and the drawings, elements that have substantially the same function and structure are denoted with the same reference signs, and repeated explanation is omitted.

(With Regard to Overall Configuration of Shape Measurement Apparatus)

Figure 1:
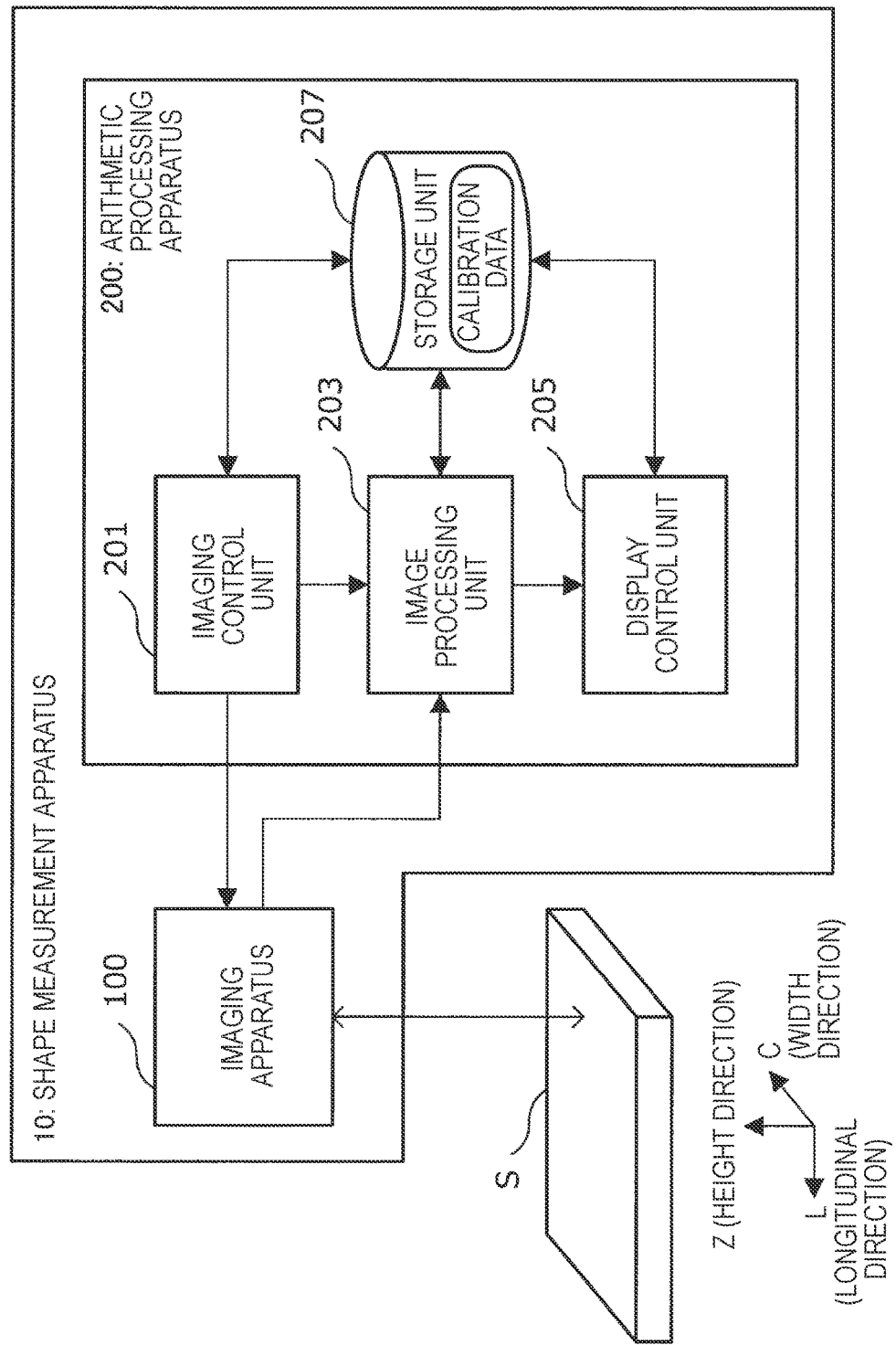
FIG. 1 is an explanatory diagram schematically showing the configuration of a shape measurement apparatus according to an embodiment of the present invention.

In the following, first, the overall configuration of a shape measurement apparatus 10 according to an embodiment of the present invention is described with reference to FIG. 1. FIG. 1 is an explanatory diagram schematically showing the configuration of a shape measurement apparatus according to the present embodiment.

The shape measurement apparatus 10 according to the present embodiment is an apparatus that, by what is called the light-section method, measures the shape of a rigid body to be measured by means of a plurality of light-section lines based on a plurality of linear laser light beams applied to a surface of the rigid body to be measured from a plurality of linear laser light sources that move relative to the rigid body to be measured along the longitudinal direction of the rigid body to be measured. In the following, a description is given using as an example the case where the rigid body to be measured is conveyed on a production line.

The following description uses, as shown in FIG. 1, a space coordinate system set in a space where the shape measurement apparatus 10 is provided. For convenience of description, the width direction of a rigid body to be measured S is defined as a C-axis direction (in the space coordinate system), the longitudinal direction, that is, the conveyance direction of the rigid body to be measured S is defined as an L-axis direction, and the height direction of the rigid body to be measured S is defined as a Z-axis direction.

Here, it is assumed that the rigid body to be measured S focused on in the present embodiment is an object that can be regarded as not changing in shape or volume during shape measurement processing like that described below. Thus, for example, a slab, a thick sheet, and the like, which are semi-finished products in the steel industry, may be treated as the rigid body to be measured S in the present embodiment. Further, not only a slab or a thick sheet in the steel industry but also, for example, a slab, a thick sheet, and the like of various metals other than iron such as titanium, copper, and aluminum, ceramics, and composite materials may be treated as the rigid body to be measured S in the present embodiment.

The shape measurement apparatus 10 according to the present embodiment includes, as shown in FIG. 1, an imaging apparatus 100 that applies a plurality of linear laser light beams to a surface of the rigid body to be measured S and images the reflected light of linear laser light at the surface of the rigid body to be measured S, and an arithmetic processing apparatus 200 that performs prescribed image processing on an image captured by the imaging apparatus 100 and calculates the three-dimensional shape of the rigid body to be measured S (that is, the surface height at each position in the L-axis-C-axis plane).

The imaging apparatus 100 is an apparatus that applies three linear laser light beams to a surface of the rigid body to be measured S, sequentially images the surface of the rigid body to be measured S along the longitudinal direction at each time corresponding to a prescribed longitudinal-direction interval, and outputs the captured image (light-section image) obtained by imaging to the arithmetic processing apparatus 200 described later. The timing of applying linear laser light to the rigid body to be measured S, the timing of imaging the surface of the rigid body to be measured S, etc. of the imaging apparatus 100 are controlled by the arithmetic processing apparatus 200 described later. The imaging apparatus 100 performs one time of imaging processing each time the rigid body to be measured S moves a prescribed distance (e.g., 1 mm or the like), on the basis of a PLG signal or the like outputted from a pulse logic generator (a PLG, a pulse-type speed detector) provided in a driving mechanism or the like that controls the conveyance of the rigid body to be measured S, in association with, for example, the change in the longitudinal-direction position of the rigid body to be measured S with respect to the imaging apparatus 100.

The arithmetic processing apparatus 200 is an apparatus that performs image processing like that described below on the light-section image at each time generated by the imaging apparatus 100 and thereby calculates the three-dimensional shape of the rigid body to be measured S.

In the following, the imaging apparatus 100 and the arithmetic processing apparatus 200 are described in detail with reference to the drawings.

<With Regard to Imaging Apparatus>

Next, the imaging apparatus 100 included in the shape measurement apparatus 10 according to the present embodiment is described in detail with reference to FIG. 2 to FIG. 7. FIG. 2 to FIG. 7 are explanatory diagrams schematically showing the configuration of an imaging apparatus according to the present embodiment.

Figure 2:
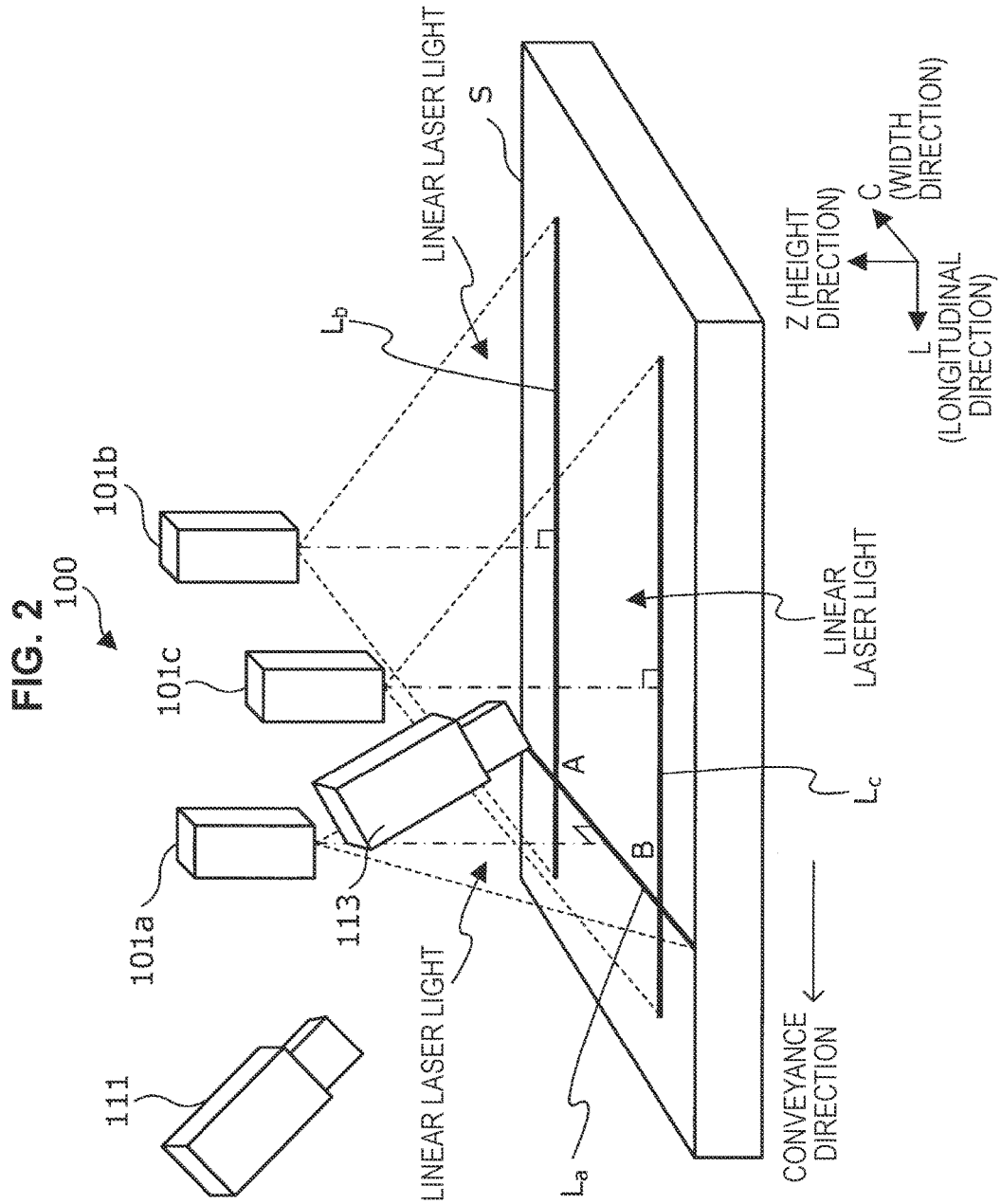
FIG. 2 is an explanatory diagram schematically showing the configuration of an imaging apparatus included in the shape measurement apparatus according to the embodiment.

The imaging apparatus 100 according to the present embodiment mainly includes, as schematically shown in FIG. 2, three linear laser light sources 101a, 101b, and 101c (hereinafter, occasionally referred to as collectively a "linear laser light source 101") each of which emits linear laser light, and two area cameras 111 and 113. Here, the linear laser light source 101a is an example of a first linear laser light source, the linear laser light source 101b is an example of a second linear laser light source, and the linear laser light source 101c is an example of a third linear laser light source. Further, the area camera 111 is an example of a first camera, and the area camera 113 is an example of a second camera.

In FIG. 2 and the subsequent drawings, a description is given using as an example of a case where the imaging apparatus 100 includes two area cameras; but the number of area cameras included in the imaging apparatus 100 according to the present embodiment is not limited to this example. A case where the imaging apparatus 100 includes three area cameras is described later.

The linear laser light source 101 is a device that applies laser light in a linear shape (linear laser light) to the surface of the rigid body to be measured (hereinafter, occasionally referred to as simply a "rigid body") S that is a measurement object. As the linear laser light source 101 according to the present embodiment, any light source may be used as long as it can apply linear laser light to the surface of the rigid body S; and the linear laser light source 101 may be configured using a laser light source and various lenses such as a rod lens.

As the laser light source, a continuous wave (CW) laser light source that performs laser oscillation continuously may be used, for example. The wavelength of the laser light oscillated by the laser light source is preferably a wavelength in the visible light range of approximately 400 nm to 800 nm, for example. The laser light source performs the oscillation of laser light on the basis of an oscillation timing control signal sent from the arithmetic processing apparatus 200 described later.

Also in the case where a pulse laser light source that performs pulsed laser oscillation is used as the laser light source, the light source can be treated in a similar manner to a CW laser light source by synchronizing the oscillation timing of the pulse laser and the imaging timing of the area cameras 111 and 113.

A rod lens is a lens that spreads the laser light emitted from the laser light source in a circular sectorial plane toward the surface of the rigid body S. Thereby, the laser light emitted from the laser light source becomes linear laser light, and this is applied to the surface of the rigid body S. From the viewpoint of image processing in the arithmetic processing apparatus 200 described later, the laser light source is preferably installed such that the circular sectorial plane obtained by the rod lens is parallel to the Z-axis. In the linear laser light source 101 according to the present embodiment, a lens other than a rod lens, such as a cylindrical lens or a Powell lens, may be used as long as it can spread laser light in a circular sectorial shape.

On the surface of the rigid body S irradiated with linear laser light, a linear bright part (in FIG. 2 etc., shown as the black line) is formed. In the imaging apparatus 100 according to the present embodiment, since the three linear laser light sources 101a, 101b, and 101c are used, three bright parts are formed. These linear bright parts are referred to as light-section lines. The reflected light of the light-section line at the surface of the rigid body S propagates up to the area camera, is formed as an image in an imaging element provided in the area camera, and is imaged by the area camera.

In the following description, the light-section line obtained by the linear laser light source 101a is referred to as a light-section line $L_a$, the light-section line obtained by the linear laser light source 101b is referred to as a light-section line $L_b$, and the light-section line obtained by the linear laser light source 101c is referred to as a light-section line $L_c$. Further, the light-section lines $L_a$, $L_b$, and $L_c$ may be collectively referred to as a "light-section line L." Here, the light-section line $L_a$ is an example of a shape-measuring light-section line. Further, the light-section line $L_b$ and the light-section line $L_c$ are examples of a correcting light-section line; for example, the light-section line $L_b$ corresponds to a first correcting light-section line, and the light-section line $L_c$ corresponds to a second correcting light-section line.

Here, the linear laser light source 101 according to the present embodiment is installed on the conveyance line so as to satisfy all the following three conditions, as illustrated in FIG. 2.

The light-section line $L_a$ and the light-section line $L_b$ have an intersection point A.

The light-section line $L_a$ and the light-section line $L_c$ have an intersection point B.

Both the light-section line $L_b$ and the light-section line $L_c$ be parallel to the L-axis, and the light-section line $L_b$ and the light-section line $L_c$ exist in mutually different width-direction positions on the surface of the rigid body S.

In what is called the light-section method, only the light-section line $L_a$ shown in FIG. 2 is used and the surface heights of longitudinal-direction positions of the rigid body S irradiated with the light-section line $L_a$ are calculated, and the obtained surface heights are arranged in a row in the longitudinal direction in accordance with the relative movement between the rigid body S and the imaging apparatus (for example, the conveyance of the rigid body S); thereby, the surface height of the whole rigid body S can be found. However, in the case where disturbance occurs during the conveyance of the rigid body S, the surface height obtained by the light-section method using one light-section line is an apparent surface height including the disturbance, and is a measurement value including an error different from the true surface height.

Thus, in the shape measurement apparatus 10 according to the present embodiment, as described in detail below, the light-section line $L_b$ extending in the longitudinal direction of the rigid body S is added, and the relationships between points of longitudinal-direction positions on the light-section line $L_b$ and surface height changes derived from disturbance are approximated with a straight line. After that, in the shape measurement apparatus 10 according to the present embodiment, the value of the approximate straight line at the longitudinal-direction position where the light-section line $L_a$ exists (that is, the intersection point A of the light-section line $L_a$ and the light-section line $L_b$) is uniquely established as the surface height change derived from disturbance of the light-section line $L_a$. Here, in the shape measurement apparatus 10 according to the present embodiment, since the measurement object is a rigid body, the change in the apparent surface height due to disturbance from the surface height after disturbance removal (that is, the change in the apparent surface height due to disturbance from the true surface height) changes in a straight line along the longitudinal direction. Thus, by approximating the measurement values at points on the light-section line $L_b$ with a straight line, there is provided an effect of absorbing the variation in the value due to measurement errors. By the addition of the light-section line $L_b$ like this, it becomes possible to uniquely find the magnitude of two kinds of disturbance of vertical movement in the Z-direction (the value of the approximate straight line takes a fixed value regardless of the longitudinal-direction position; that is, the slope of the approximate straight line is 0) and rotation around the C-axis (the approximate straight line has a fixed slope with respect to the longitudinal-direction position).

In the shape measurement apparatus 10 according to the present embodiment, the light-section line $L_c$ is further added to a width-direction position different from the light-section line $L_b$, and processing similar to the processing of the light-section line $L_b$ is performed. Thereby, in the shape measurement apparatus 10 according to the present embodiment, it becomes possible to specify a relationship between the change in the surface height derived from disturbance and the width-direction position, and it also becomes possible to obtain the magnitude of rotation around the L-axis.

Thus, in the shape measurement apparatus 10 according to the present embodiment, by using three light-section lines like the above, the surface height of the rigid body to be measured can be measured more accurately even when any one of three types of disturbance of translation in the height direction, rotation around the longitudinal-direction axis, and rotation around the width-direction axis has occurred during conveyance.

Although FIG. 2 and the subsequent drawings show the case where the light-section line $L_a$ and the light-section line $L_b$ are orthogonal and the case where the light-section line $L_a$ and the light-section line $L_c$ are orthogonal, the arrangement of light-section lines (that is, the arrangement of linear laser light sources 101) is not limited to the cases shown in these drawings. That is, the following description similarly holds also in the case where the light-section line $L_a$ and the light-section line $L_b$ and the section line $L_c$ are not orthogonal. This is because, in the present embodiment, the magnitude of disturbance at the intersection point A and the intersection point B is calculated using the approximate straight line mentioned above as described in detail below, and it is not necessary for two light-section lines to be orthogonal. Further, although FIG. 2 and the subsequent drawings show the case where the surface of the rigid body S is flat, the following description is not limited to the case shown in these drawings, and similarly holds also in the case where the surface of the rigid body S is not flat. The reason will be described separately.

The specific length of the light-section line L is not particularly limited, and the length may be determined such that the luminance distribution of the light-section line is uniform on the surface of the rigid body S, as appropriate. Further, the width-direction position of the light-section lines $L_b$ and $L_c$ is not particularly limited, either; the position may be set such that the light-section lines $L_b$ and $L_c$ exist on the surface of the rigid body S, whatever width the rigid body S conveyed on the conveyance line has.

In the area cameras 111 and 113, a lens having a prescribed focal distance and an imaging element such as a charge-coupled device (CCD) or a complementary metal oxide semiconductor (CMOS) are installed. The area cameras 111 and 113 image the light-section line that is the reflected light of linear laser light applied to the surface of the rigid body S each time the rigid body S moves a prescribed distance, and generate a light-section image. After that, the area cameras 111 and 113 output the generated light-section image to the arithmetic processing apparatus 200 described later.

Here, the area cameras 111 and 113 are controlled by the arithmetic processing apparatus 200 described later, and a trigger signal for imaging is outputted from the arithmetic processing apparatus 200 each time the rigid body S moves a prescribed distance. The area cameras 111 and 113 image the surface of the rigid body S irradiated with linear laser light in accordance with a trigger signal outputted from the arithmetic processing apparatus 200 and generate a light-section image, and output the generated light-section image to the arithmetic processing apparatus 200. Thereby, N (N being an integer of 2 or more) captured images are outputted from each of the area cameras 111 and 113 to the arithmetic processing apparatus 200.

Figure 3:
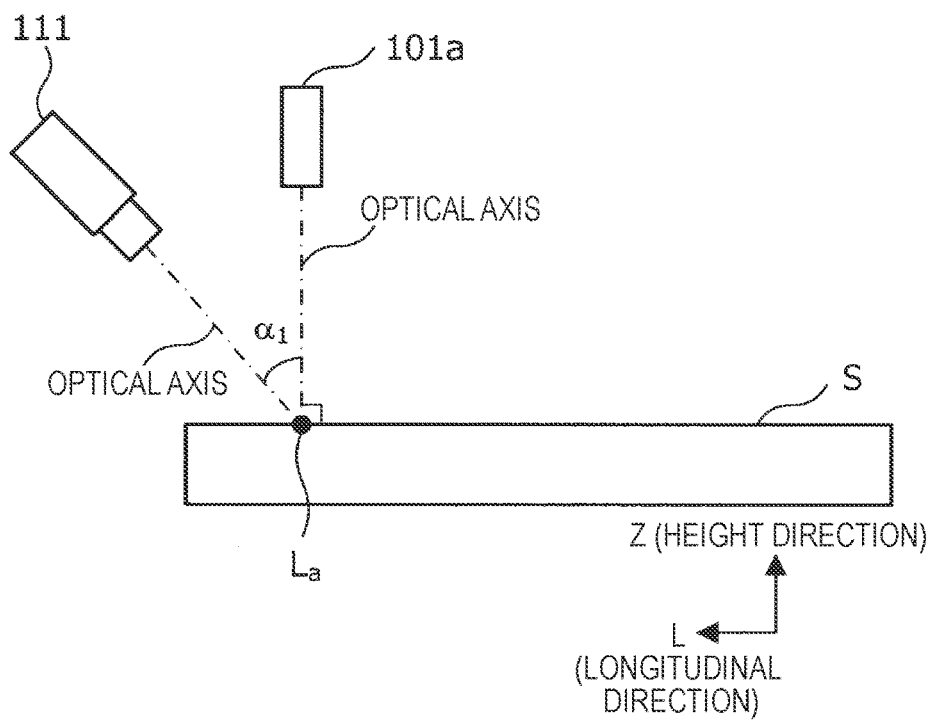
FIG. 3 is an explanatory diagram schematically showing the configuration of the imaging apparatus according to the embodiment.
Figure 4:
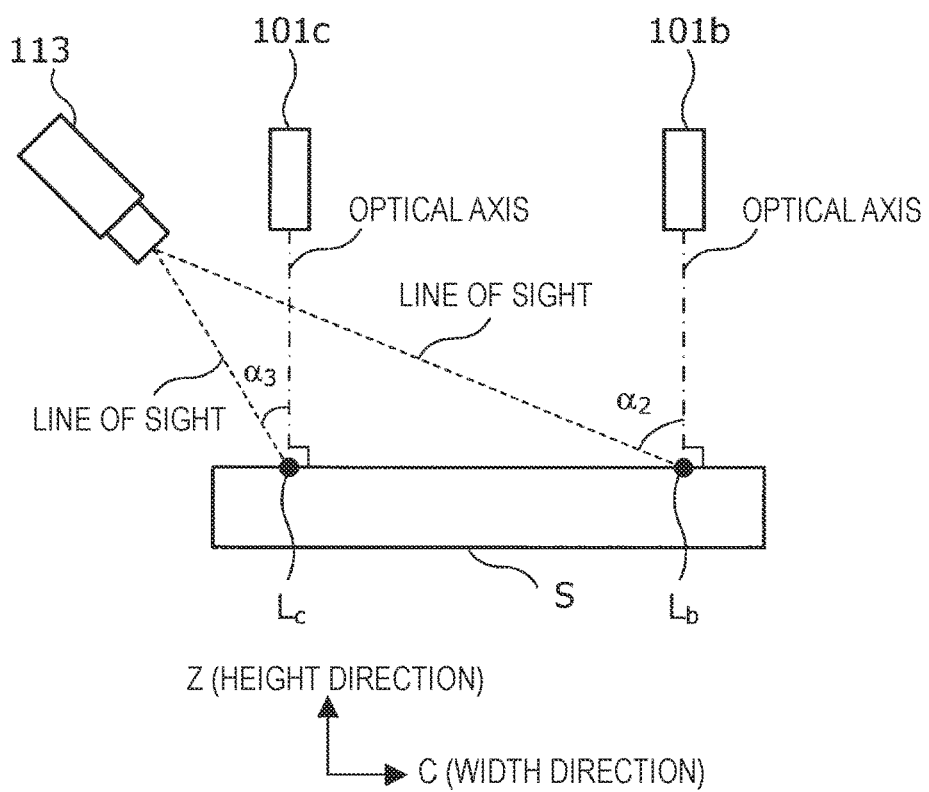
FIG. 4 is an explanatory diagram schematically showing the configuration of the imaging apparatus according to the embodiment.

As schematically shown in FIG. 3, the linear laser light source 101a is installed on the conveyance line in such a manner that a plane including the linear laser light emitted from this light source is perpendicular to the L-axis-C-axis plane (in other words, in such a manner that the optical axis of the linear laser light source 101a is substantially parallel to the Z-axis). In the case where this installation condition is not satisfied, the linear laser light illuminates a portion different in the longitudinal-direction position of the rigid body S due to disturbance described later, and it is difficult to perform accurate measurement of the surface shape. Also for the linear laser light sources 101b and 101c, for a reason similar to the above, each light source is installed on the conveyance line in such a manner that, as shown in FIG. 4, a plane including the emitted linear laser light is perpendicular to the L-axis-C-axis plane (in other words, in such a manner that the optical axis of the linear laser light sources 101b and 101c is substantially parallel to the Z-axis).

Even in the case where light sources are installed in the above manner, the irradiation position of linear laser light is not strictly the same when the rigid body S is rotated around an axis parallel to each of the light-section lines $L_a$, $L_b$, and $L_c$ by disturbance (for example, when the rigid body S is rotated around the C-axis for the light-section line $L_a$ and around the L-axis for the light-section lines $L_b$ and $L_c$). However, assuming that the true surface height of the rigid body S changes smoothly and that the amount of rotation of the rigid body S is not large, it can be surmised that linear laser light illuminates the same position of the surface of the rigid body S even when such a rotation has occurred. In particular, when attention is focused on the surface shape of a rigid body S with a large mass, such as a slab or a thick sheet, it can be said that the latter assumption is appropriate.

In regard to the optical positional relationship between the linear laser light source 101a and the area camera 111, as shown in FIG. 3, the magnitude of the angle $\alpha_1$ between the optical axis of the area camera 111 and the optical axis of the linear laser light source 101a (in other words, the Z-axis) in the L-axis-Z-axis plane may be set to an arbitrary value. However, the magnitude of the angle $\alpha_1$ is preferably set to approximately 30 degrees to 60 degrees. If the angle $\alpha_1$<30 degrees, the amount of movement of the light-section line $L_a$ in the camera's visual field is small for the same height change, and the resolution along the height direction is reduced. On the other hand, if the angle $\alpha_1$>60 degrees, the area camera 111 is distant from the regular reflection direction of the linear laser light source 101a, and the light-section line $L_a$ photographed by the area camera 111 is dark; hence, a higher power laser is needed in order to perform photographing with the same brightness.

Figure 5:
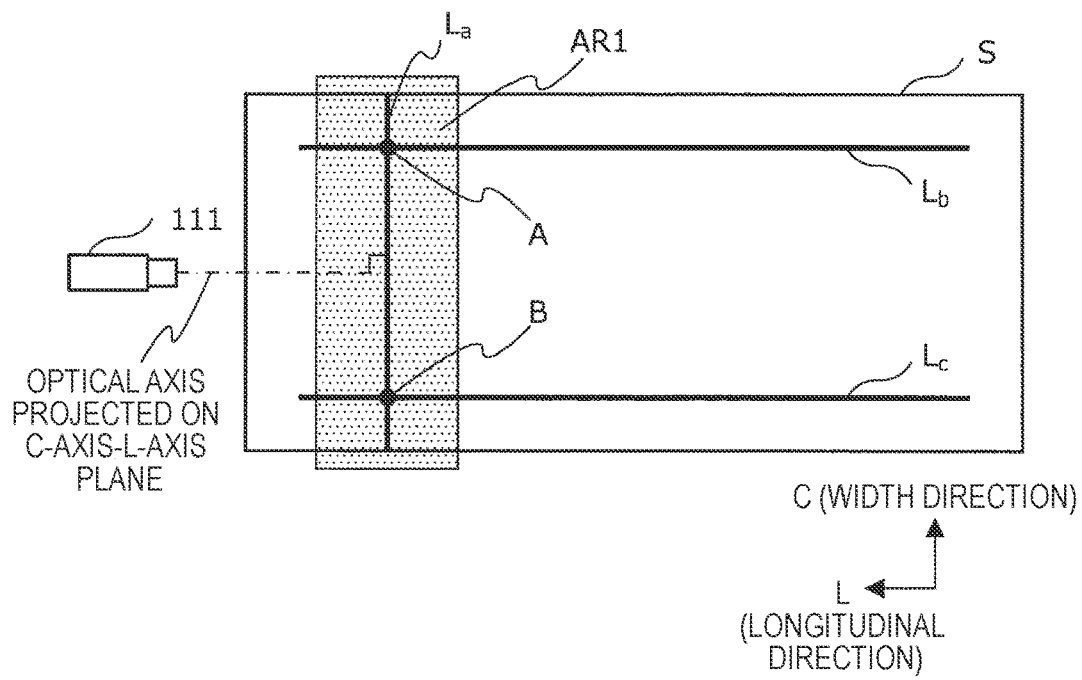
FIG. 5 is an explanatory diagram schematically showing the configuration of the imaging apparatus according to the embodiment.

The area camera 111 is preferably installed such that, as shown in FIG. 5, the optical axis of the area camera 111 projected on the L-axis-C-axis plane and the light-section line $L_a$ are orthogonal to each other. Thereby, it becomes possible to equalize the resolution (the length corresponding to one pixel (unit: mm)) in the C-axis direction of the light-section line $L_a$ viewed from the area camera 111. However, as mentioned above, the light-section line $L_a$ and the light-section lines $L_b$ and $L_c$ may not be orthogonal. That is, the light-section line $L_a$ may not be parallel to the width direction (the C-axis direction). This is because, as described above, the light-section line $L_a$, and the light-section lines $L_b$ and $L_c$ may not be orthogonal to calculate the amount of disturbance at the intersection point A and the intersection point B.

Here, as schematically shown in FIG. 5, the imaging area AR1 of the area camera 111 is set such that the entire light-section line $L_a$ is included in the imaging visual field.

In regard to the optical positional relationship between the linear laser light sources 101b and 101c and the area camera 113, as schematically shown in FIG. 4, the magnitude of the angles $\alpha_2$ and $\alpha_3$ between the line of sight of the area camera 113 to the light-section lines $L_b$ and $L_c$ in the C-axis-Z-axis plane and the optical axes of the respective linear laser light sources 101b and 101c (in other words, the Z-axis) may be set to an arbitrary value similarly to the angle $\alpha_1$. However, for a similar reason to the angle $\alpha_1$, the magnitude of each of the angles $\alpha_2$ and $\alpha_3$ is preferably set to approximately 30 degrees to 60 degrees.

Similarly to the relationship between the light-section line $L_a$ and the area camera 111, the light-section line $L_b$ in the L-axis-C-axis plane and the optical axis of the area camera 113 projected on the L-axis-C-axis plane are preferably orthogonal to each other. At this time, the light-section line $L_b$ and the light-section line $L_c$ are parallel to each other; thus, when this condition holds for the light-section line $L_b$, the condition is automatically satisfied also for the light-section line $L_c$.

Figure 6:
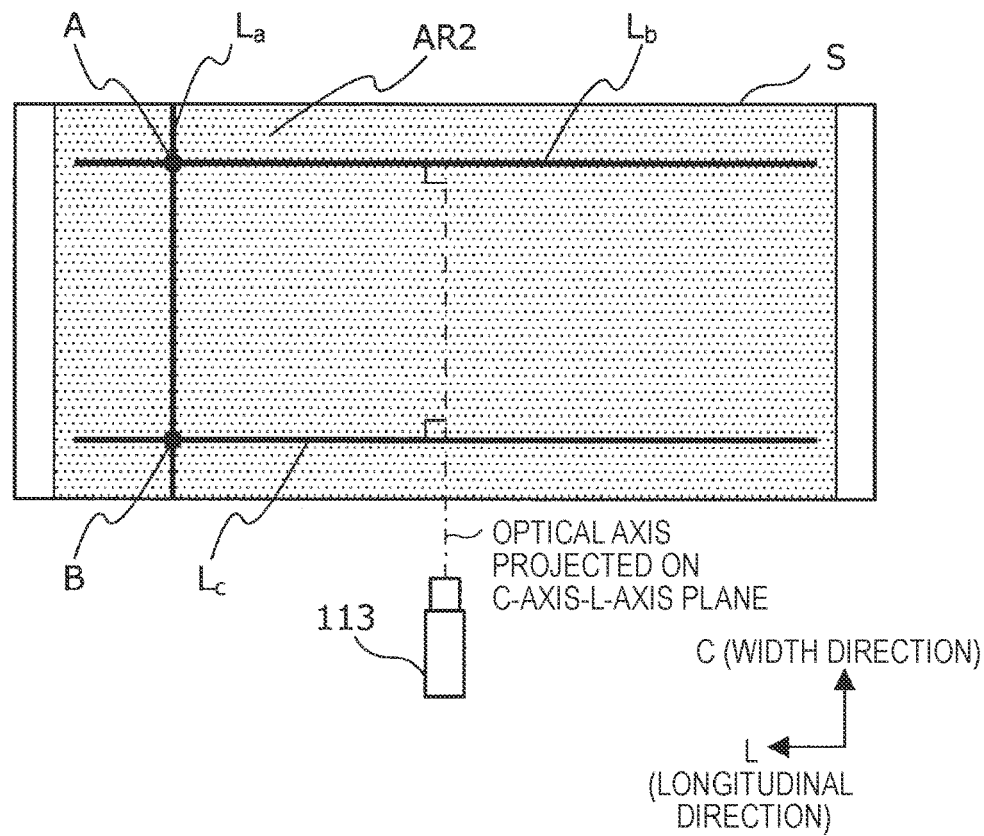
FIG. 6 is an explanatory diagram schematically showing the configuration of the imaging apparatus according to the embodiment.

Here, as schematically shown in FIG. 6, the imaging area AR2 of the area camera 113 is set such that the intersection point A and the intersection point B are included in the imaging visual field. Here, although FIG. 6 shows the case where the entire light-section lines $L_b$ and $L_c$ are included in the imaging visual field, disturbance estimation processing described later can be performed as long as at least the intersection point A and the intersection point B are included in the imaging visual field. In order to increase the accuracy of disturbance estimation processing described later, it is preferable that the entire light-section lines $L_b$ and $L_c$ be included in the imaging visual field.

Figure 7:
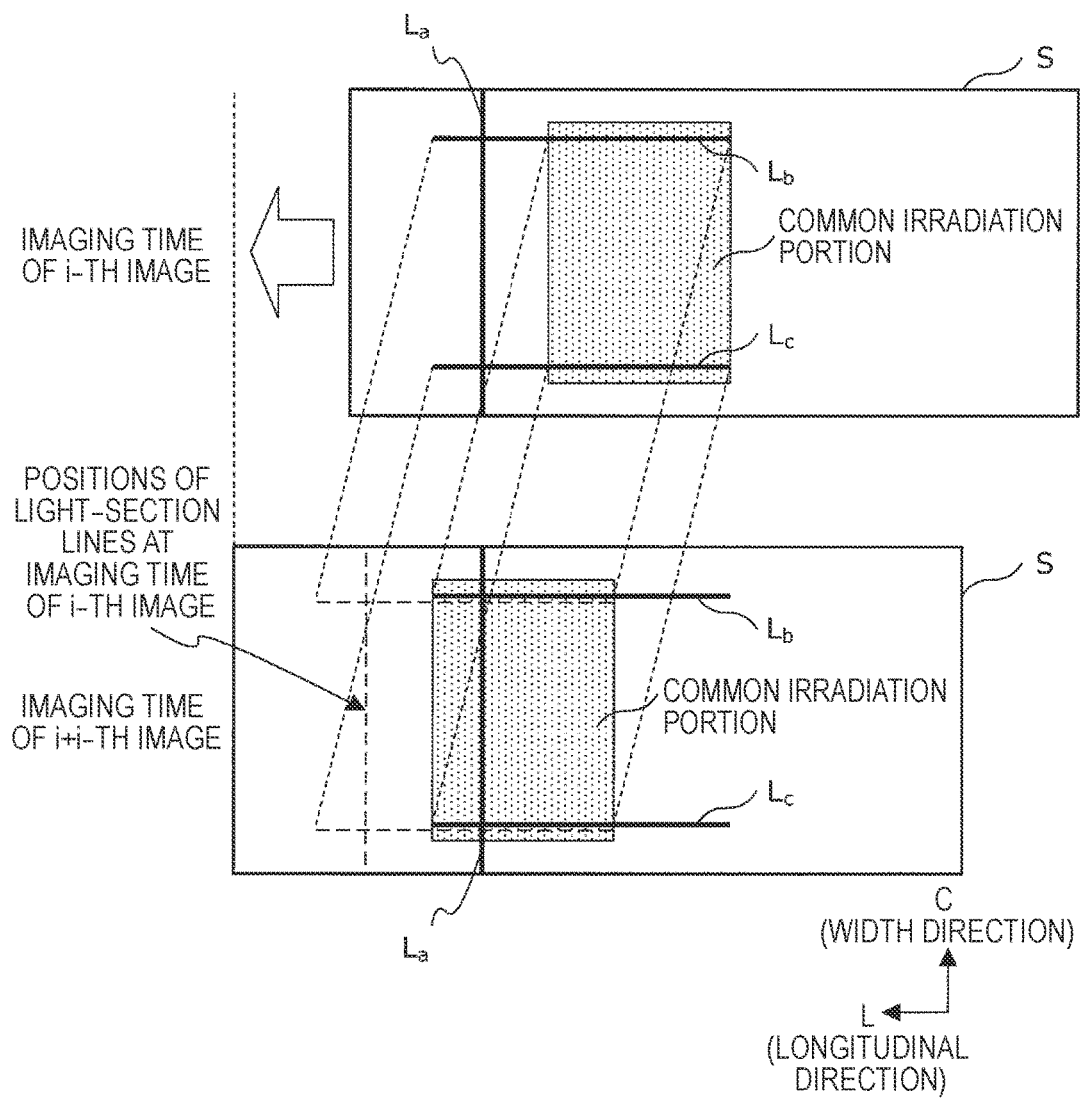
FIG. 7 is an explanatory diagram schematically showing the configuration of the imaging apparatus according to the embodiment.

The imaging timing of the area cameras 111 and 113 is set such that, for example as schematically shown in FIG. 7, a portion of the rigid body S being irradiated with light-section lines in common (hereinafter, referred to as a "common irradiation portion") exists in captured images of the area camera 113 captured at mutually adjacent times (for example, the imaging time of the i-th image (i being an integer of 1 or more) and the imaging time of the i+1-th image). This is because, in the arithmetic processing apparatus 200 according to the present embodiment, the magnitude of disturbance is calculated with a focus on the light-section lines $L_b$ and $L_c$ in the common irradiation portion, as described in detail below. Although FIG. 7 shows the case where the surface of the rigid body S is flat and disturbance has not occurred between consecutive two images, the common irradiation portion exists also in the case where the surface of the rigid body S is not flat or in the case where disturbance has occurred between consecutive two images.

Hereinabove, the configuration of the imaging apparatus 100 according to the present embodiment is described in detail with reference to FIG. 2 to FIG. 7.

<With Regard to Disturbance Occurring on Rigid Body to be Measured>

Next, disturbance occurring on the rigid body to be measured S and the captured image (light-section image) captured in association with the disturbance are specifically described with reference to FIG. 8 to FIG. 11. FIG. 8 to FIG. 11 are schematic diagrams for describing disturbance that may occur on the rigid body to be measured.

The shape measurement apparatus 10 according to the present embodiment measures the surface height of the rigid body S on the occasion when a rigid body such as a slab or a thick sheet is continuously conveyed or on other occasions. Here, during the conveyance of the rigid body S, there are various factors of measurement error, such as vibration derived from a driving mechanism provided on the conveyance line etc.

Figure 8:
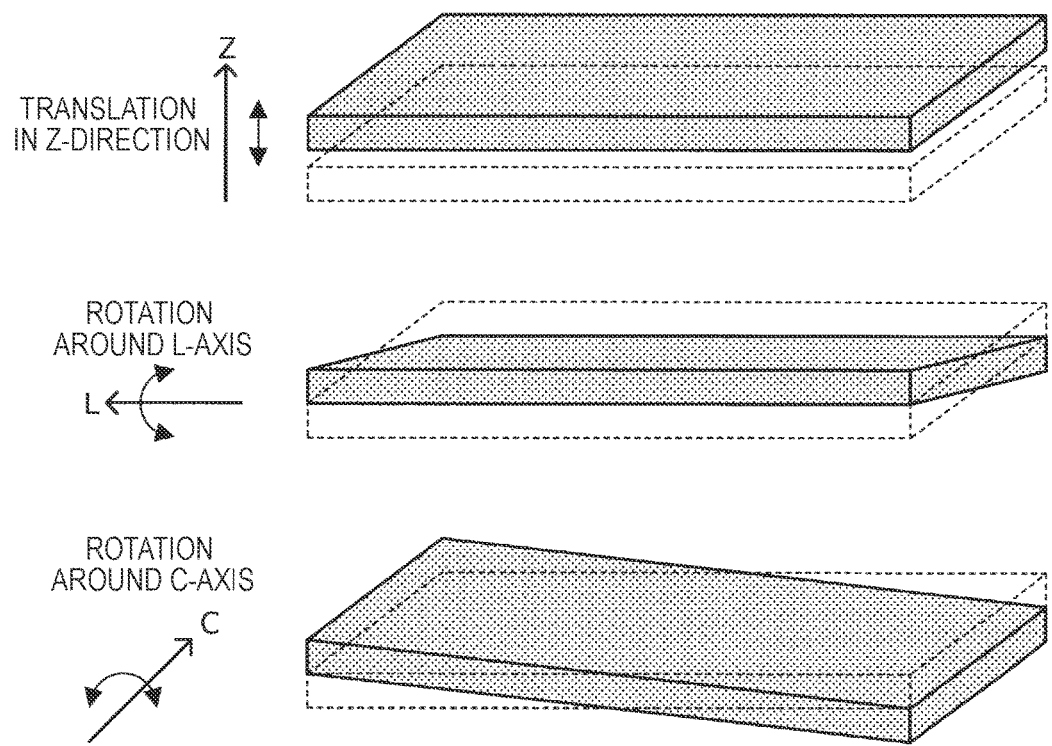
FIG. 8 is a schematic diagram for describing disturbances that may occur on a rigid body to be measured.

In the shape measurement apparatus 10 according to the present embodiment, attention is focused on the following three factors as the factor of measurement error, as shown in FIG. 8.

(1) translation in the Z-axis direction (the height direction of the rigid body S)

(2) rotation around the L-axis (the longitudinal direction of the rigid body S)

(3) rotation around the C-axis (the width direction of the rigid body S)

Hereinafter, these three factors of measurement error may be collectively referred to as disturbance.

With a rigid body S having a flat surface as an object, the change of the captured image photographed by the area camera 113 occurring depending on the presence or absence of disturbance will now be described with reference to FIG. 9 to FIG. 11.

Figure 9:
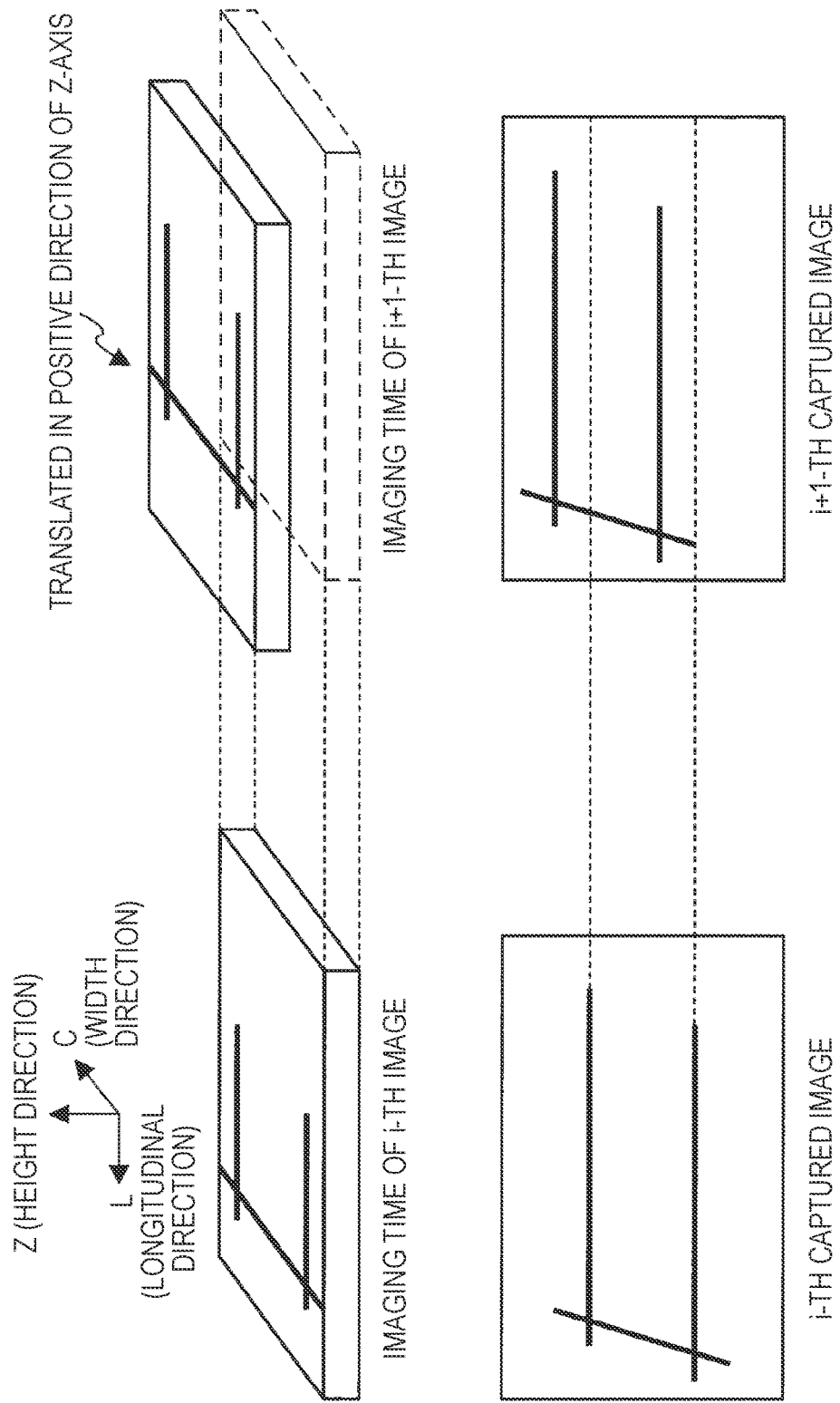
FIG. 9 is a schematic diagram for describing disturbances that may occur on a rigid body to be measured.
Figure 10:
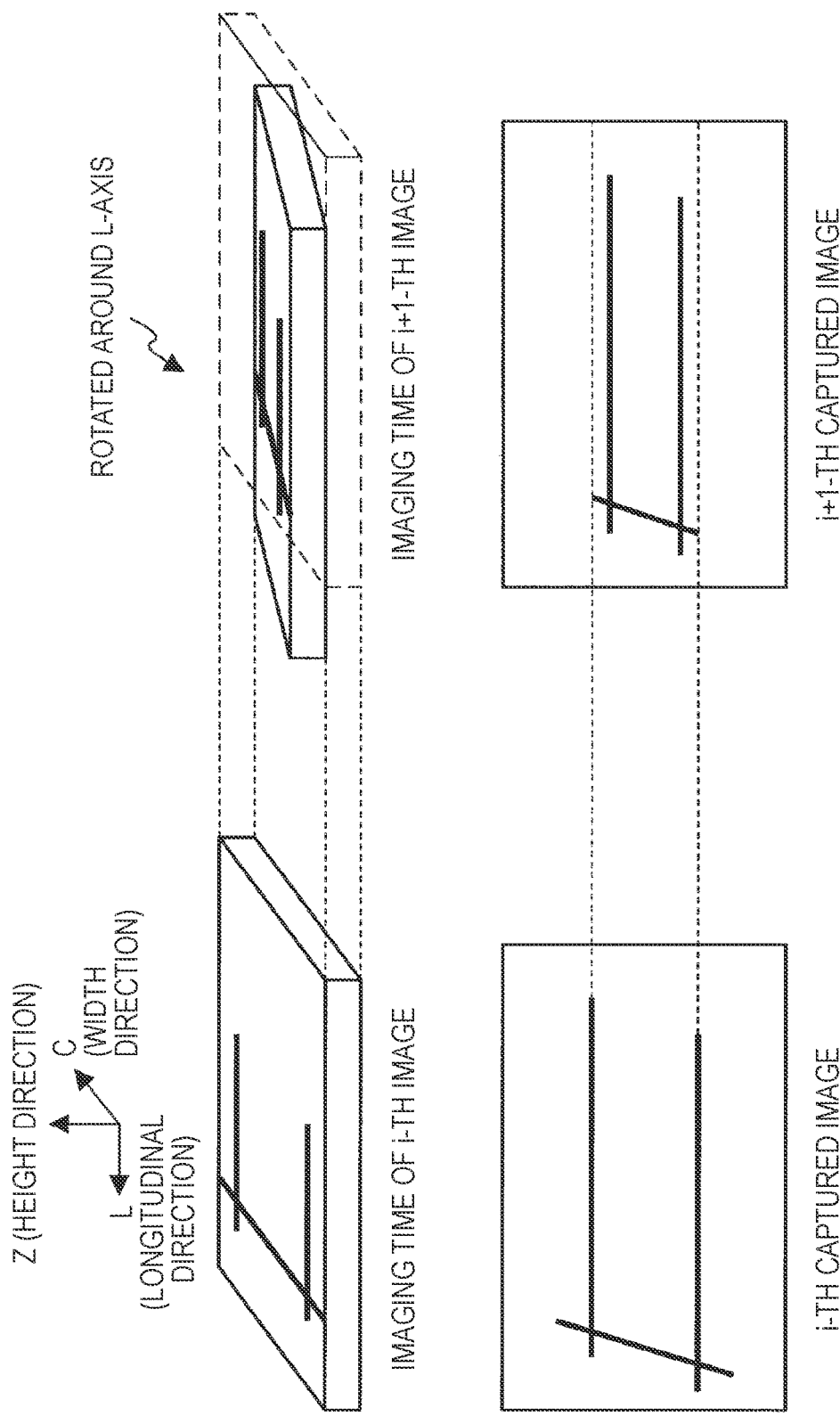
FIG. 10 is a schematic diagram for describing disturbances that may occur on a rigid body to be measured.
Figure 11:
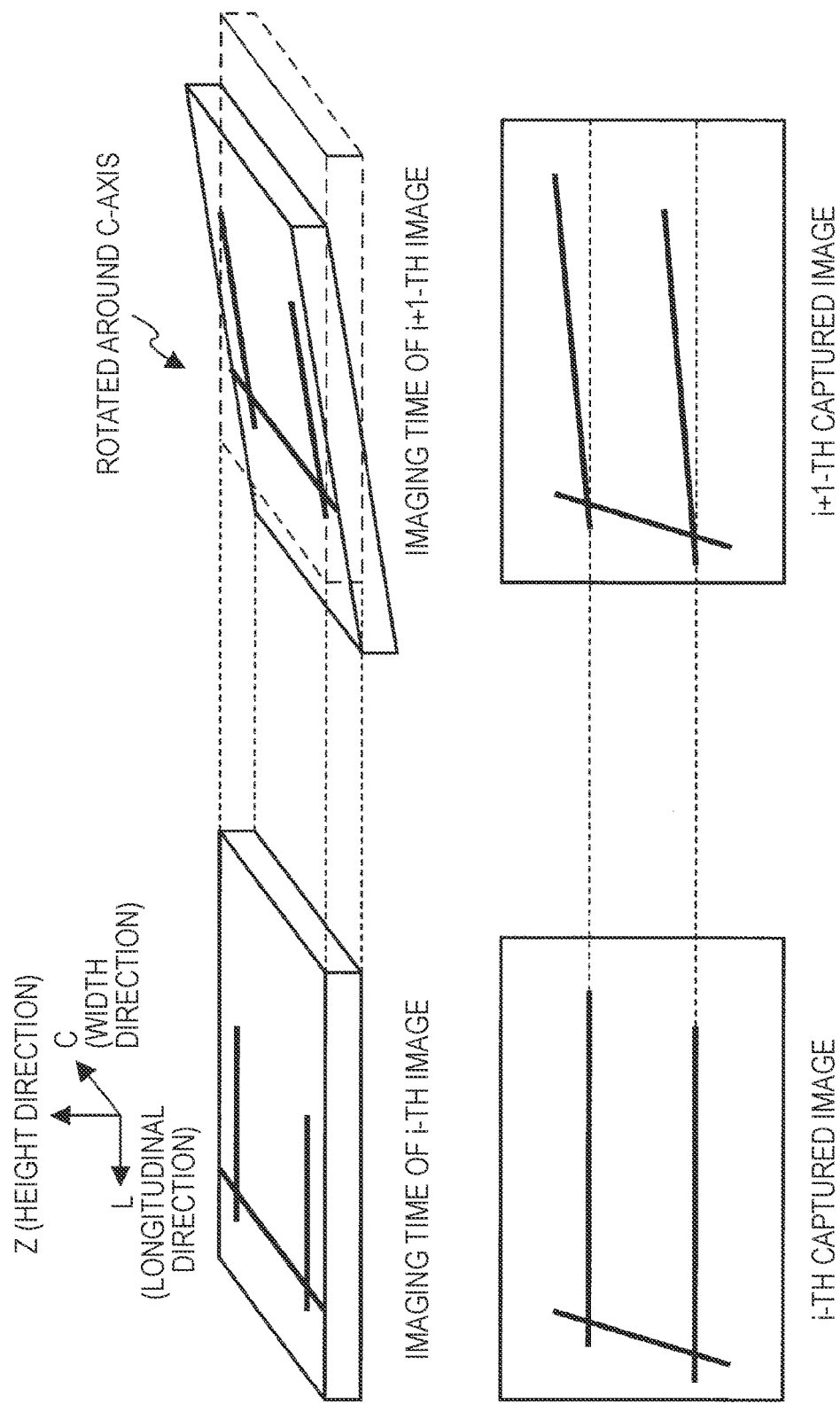
FIG. 11 is a schematic diagram for describing disturbances that may occur on a rigid body to be measured.

Although FIG. 9 to FIG. 11 make illustration with a focus on the case where the surface of the rigid body S is flat, the entire following description is not limited to the case shown in FIG. 9 to FIG. 11, and similarly holds also in the case where the surface of the rigid body S is not flat. This is because, in the case where the surface of the rigid body S is not flat, although the light-section line itself is a curved line, the change of the light-section line depending on the presence or absence of disturbance changes in a straight line along the longitudinal direction like in the case of being flat.

First, in the case where disturbance like the above has not occurred between two images at mutually different two times (for example, the i-th captured image and the i+1-th captured image), the position of each light-section line L does not change between the captured images. However, in the case where translation in the Z-axis direction has occurred as disturbance at the time of capturing the i+1-th image, as shown in FIG. 9 the light-section lines $L_a$, $L_b$, and $L_c$ translate in the vertical direction in the image by a mutually equal amount. Further, in the case where rotation around the L-axis has occurred as disturbance at the time of capturing the i+1-th image, as shown in FIG. 10, the slope and length of the light-section line $L_a$ change, and the light-section lines $L_b$ and $L_c$ translate in the image by mutually different amounts. Further, in the case where rotation around the C-axis has occurred as disturbance at the time of capturing the i+1-th image, as shown in FIG. 11 the slope of the light-section lines $L_b$ and $L_c$ changes.

Thus, in the arithmetic processing apparatus 200 described in detail below, the change in the surface height (the change in the Z-coordinate) derived from disturbance that has occurred on the rigid body S is calculated at each imaging time by comparing consecutive two images obtained by the area camera 113. After that, the surface height that is obtained from the light-section image of the area camera 111 and in which a measurement error due to disturbance is superimposed is corrected on the basis of the obtained change in the surface height derived from disturbance (in other words, the magnitude of disturbance), and the true surface height is outputted.

<With Regard to Arithmetic Processing Apparatus>

Figure 12:
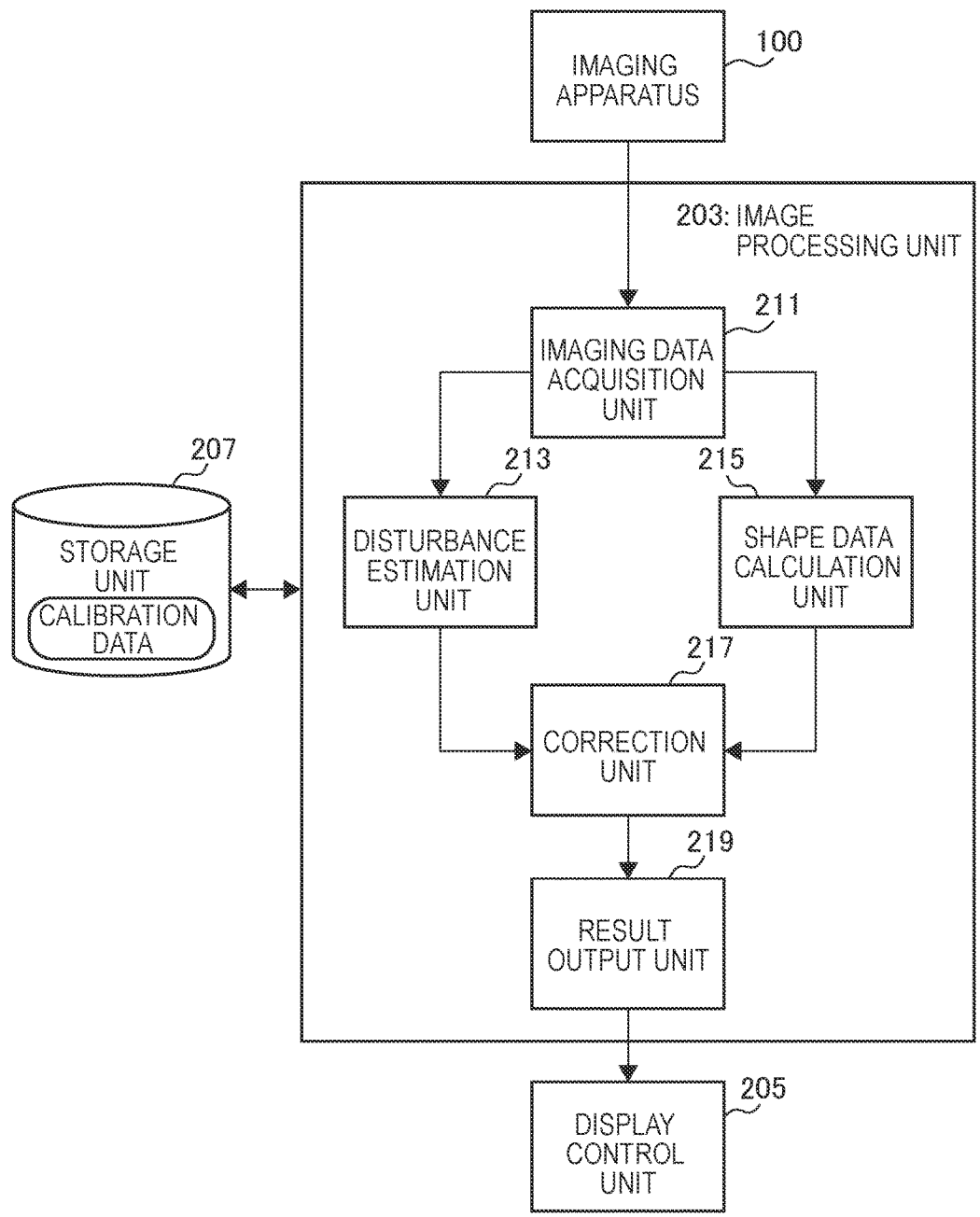
FIG. 12 is a block diagram showing an example of the configuration of an image processing unit of an arithmetic processing apparatus included in the shape measurement apparatus according to the embodiment.
Figure 14:
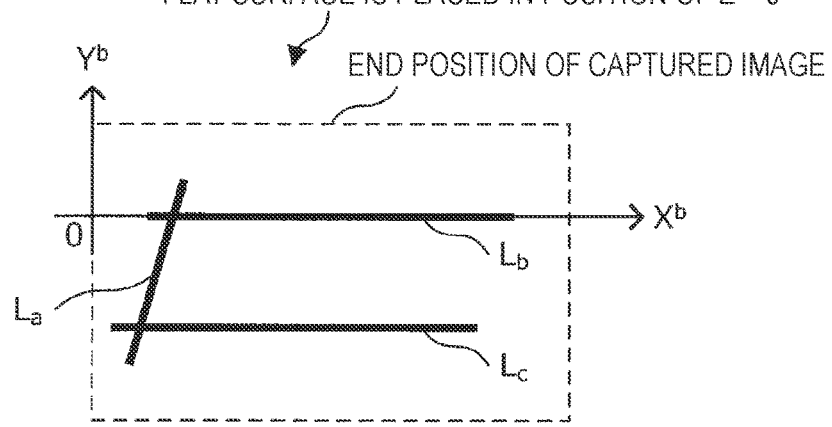
FIG. 14 is an explanatory diagram for describing disturbance estimation processing performed by a disturbance estimation unit according to the embodiment.
Figure 15:
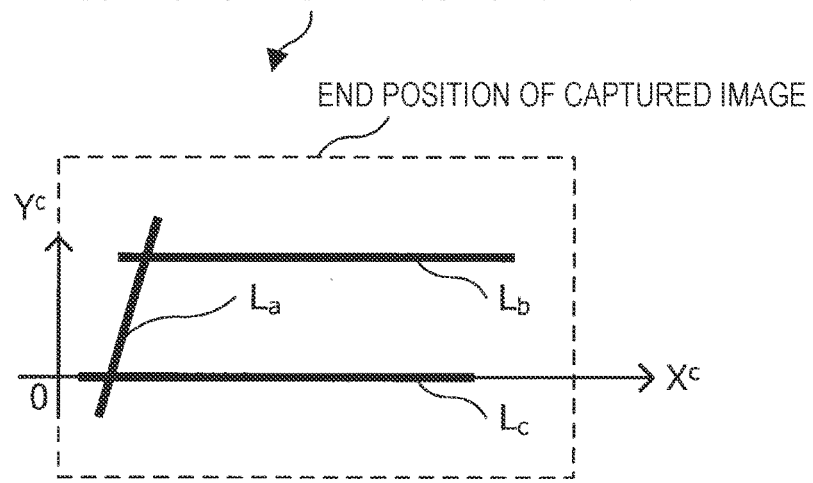
FIG. 15 is an explanatory diagram for describing disturbance estimation processing performed by a disturbance estimation unit according to the embodiment.
Figure 16:
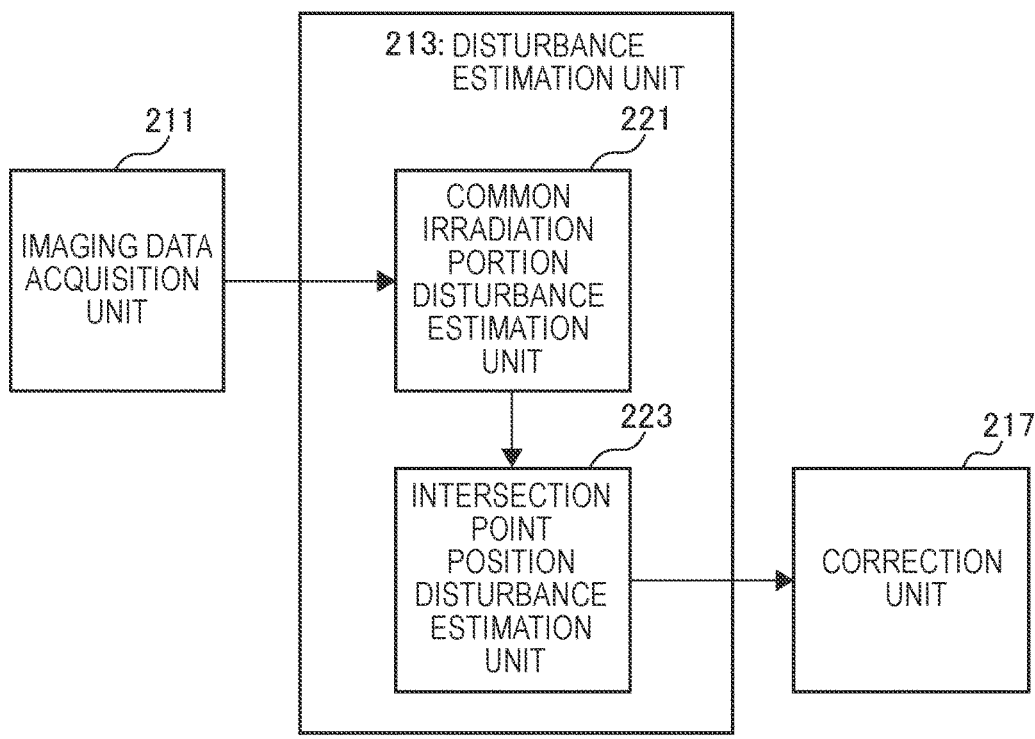
FIG. 16 is a block diagram showing an example of the configuration of a disturbance estimation unit included in the image processing unit according to the embodiment.
Figure 23:
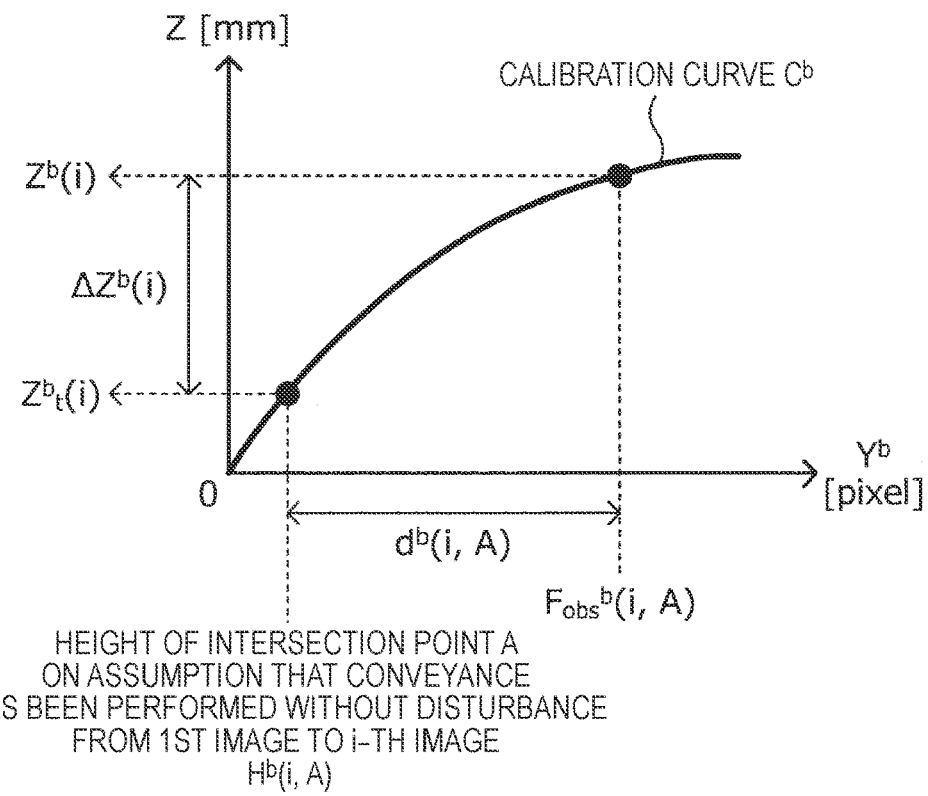
FIG. 23 is a block diagram showing an example of the configuration of a disturbance estimation unit included in the image processing unit according to the embodiment.
Figure 24:
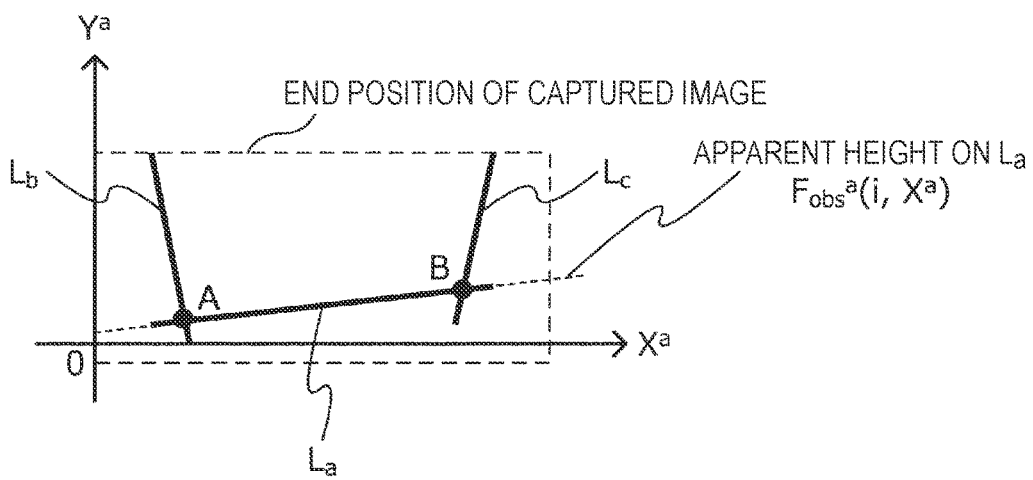
FIG. 24 is an explanatory diagram for describing shape data calculation processing performed by a shape data calculation unit according to the embodiment.
Figure 25:
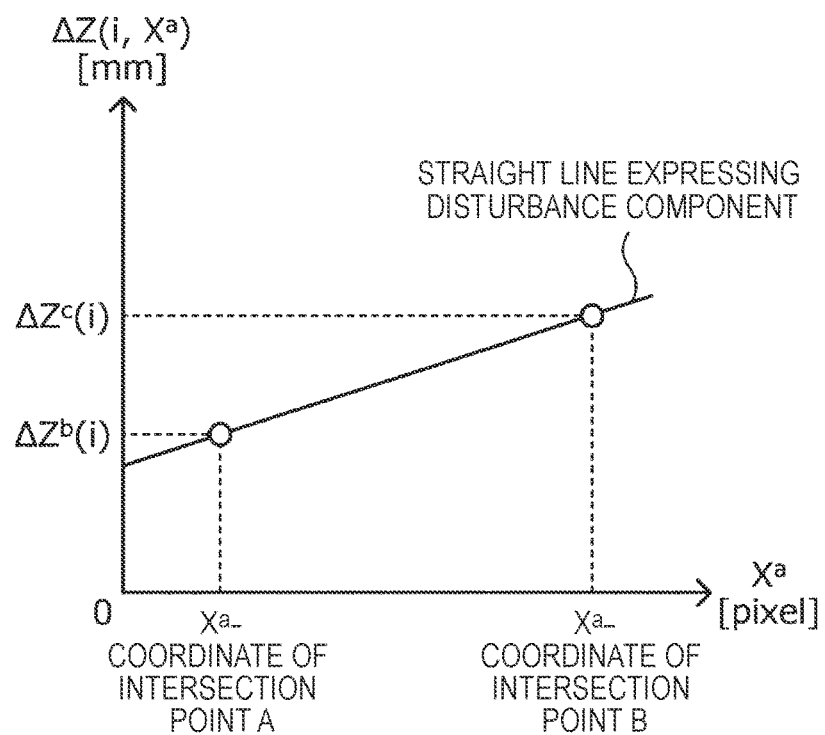
FIG. 25 is an explanatory diagram for describing correction processing performed by a correction processing unit according to the embodiment.
Figure 26:
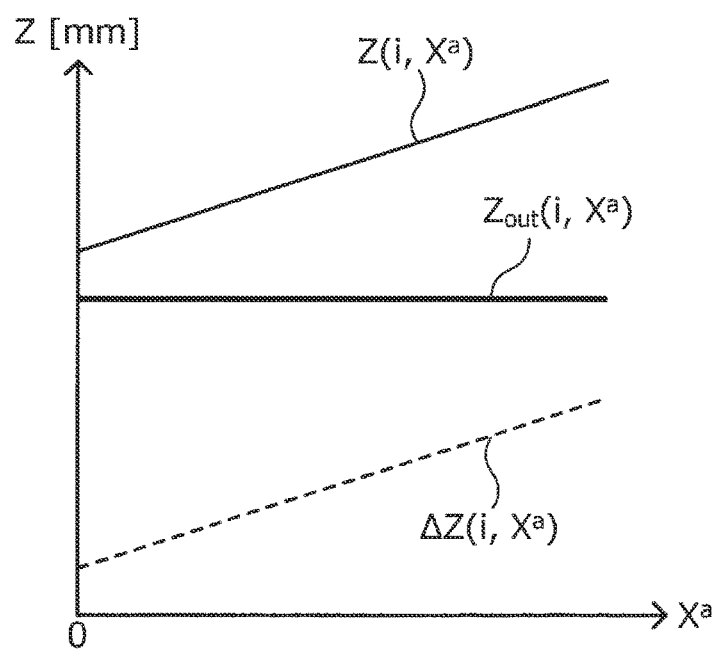
FIG. 26 is an explanatory diagram for describing correction processing performed by a correction processing unit according to the embodiment.

Next, the arithmetic processing apparatus 200 included in the shape measurement apparatus 10 according to the present embodiment is described in detail with reference to FIG. 1 and FIG. 12 to FIG. 26. FIG. 12 is a block diagram showing an example of the configuration of an image processing unit of an arithmetic processing apparatus included in a shape measurement apparatus according to the present embodiment. FIG. 14 and FIG. 15, and FIG. 17 to FIG. 23 are explanatory diagrams for describing disturbance estimation processing performed by a disturbance estimation unit according to the present embodiment. FIG. 16 is a block diagram showing an example of the configuration of a disturbance estimation unit included in an image processing unit according to the present embodiment. FIG. 24 is an explanatory diagram for describing shape data calculation processing performed by a shape data calculation unit according to the present embodiment. FIG. 25 and FIG. 26 are explanatory diagrams for describing correction processing performed by a correction processing unit according to the present embodiment.

[With Regard to Overall Configuration of Arithmetic Processing Apparatus]

Returning to FIG. 1 again, the overall configuration of the arithmetic processing apparatus 200 included in the shape measurement apparatus 10 according to the present embodiment is described.

The arithmetic processing apparatus 200 according to the present embodiment mainly includes, as shown in FIG. 1, an imaging control unit 201, an image processing unit 203, a display control unit 205, and a storage unit 207.

The imaging control unit 201 is configured with, for example, a central processing unit (CPU), a read-only memory (ROM), a random access memory (RAM), a communication device, etc. The imaging control unit 201 comprehensively controls the processing of imaging the rigid body S performed by the imaging apparatus 100 according to the present embodiment.

More specifically, when starting the imaging of the rigid body S, the imaging control unit 201 sends to the imaging apparatus 100 a control signal for starting the oscillation of the linear laser light source 101. When the imaging apparatus 100 starts the imaging of the rigid body S, the imaging control unit 201 sends a trigger signal for starting imaging to the area cameras 111 and 113 each time it acquires a PLG signal sent at regular intervals from a driving mechanism or the like that controls the conveyance of the rigid body S (for example, a PLG signal outputted each time the rigid body S moves 1 mm or at other times).

The image processing unit 203 is configured with, for example, a CPU, a ROM, a RAM, a communication device, etc. The image processing unit 203 acquires imaging data generated by the area cameras 111 and 113 (that is, captured image data related to the light-section image), performs image processing described below on the imaging data, and calculates the height of the entire surface of the rigid body S as three-dimensional shape data. On finishing the processing of calculating the surface height of the rigid body S, the image processing unit 203 transmits information on the obtained calculation result to the display control unit 205 and the storage unit 207, or transmits the information to various devices etc. provided outside the shape measurement apparatus 10.

The image processing unit 203 is described in detail later.

The display control unit 205 is configured with, for example, a CPU, a ROM, a RAM, an output device, a communication device, etc. The display control unit 205 performs display control at the time of displaying the measurement result of the rigid body S transmitted from the image processing unit 203 on an output device such as a display included in the arithmetic processing apparatus 200, an output device provided outside the arithmetic processing apparatus 200, or the like. Thereby, the user of the shape measurement apparatus 10 can grasp the measurement result concerning the three-dimensional shape of the rigid body S on the spot.

The storage unit 207 is an example of a memory device included in the arithmetic processing apparatus 200, and is configured with, for example, a ROM, a RAM, a storage device, etc. In the storage unit 207, calibration data related to the light-section line L used for image processing performed in the image processing unit 203 are stored. Further, in the storage unit 207, information on design parameters of the shape measurement apparatus 10, such as information showing the optical positional relationship between the linear laser light source 101 and the area cameras 111 and 113 included in the imaging apparatus 100 and information transmitted from a higher-level computer provided outside the shape measurement apparatus 10 (for example, a management computer that generally manages the conveyance line, or the like), is also stored. Further, in the storage unit 207, various parameters and reports on processing still in progress that need to be saved when the arithmetic processing apparatus 200 according to the present embodiment performs some kind of processing (for example, measurement results transmitted from the image processing unit 203, and calibration data, various databases, programs, etc. stored beforehand) are recorded, as appropriate. The imaging control unit 201, the image processing unit 203, the display control unit 205, a higher-level computer, etc. can freely perform data read/write processing on the storage unit 207.

Details of calibration data stored in the storage unit 207 are described later.

[With Regard to Configuration of Image Processing Unit]

Next, the configuration of the image processing unit 203 included in the arithmetic processing apparatus 200 is described with reference to FIG. 12 to FIG. 26.

The image processing unit 203 according to the present embodiment includes, as shown in FIG. 12, an imaging data acquisition unit 211, a disturbance estimation unit 213, a shape data calculation unit 215, a correction unit 217, and a result output unit 219.

The imaging data acquisition unit 211 is configured with, for example, a CPU, a ROM, a RAM, a communication device, etc. The imaging data acquisition unit 211 acquires the imaging data of the light-section line outputted from the area cameras 111 and 113 of the imaging apparatus 100 (that is, image data related to the light-section image). When the imaging data acquisition unit 211 acquires, from the area camera 113, imaging data related to the light-section lines $L_b$ and $L_c$ used as the correcting light-section line (in other words, imaging data in which the imaging area AR2 in FIG. 6 is imaged), the imaging data acquisition unit 211 outputs the imaging data to the disturbance estimation unit 213 described later. Further, the imaging data acquisition unit 211 outputs imaging data related to the light-section line $L_a$ used as the shape-measuring light-section line (in other words, imaging data in which the imaging area AR1 in FIG. 5 is imaged) from the area camera 111 to the shape data calculation unit 215 described later.

Further, the imaging data acquisition unit 211 may associate, with imaging data related to the light-section line acquired from the imaging apparatus 100, time information on the date and time at which the imaging data are acquired and on other matters, and may store these pieces of information as history information in the storage unit 207 or the like.

The disturbance estimation unit 213 is configured with, for example, a CPU, a ROM, a RAM, etc. The disturbance estimation unit 213 is a processing unit that estimates the magnitude of disturbance that has occurred on the rigid body S using the imaging data of the correcting light-section line imaged by the area camera 113 (that is, the light-section lines $L_b$ and $L_a$).

More specifically, the disturbance estimation unit 213 performs, on the captured image obtained from the area camera 113, height change value acquisition processing of acquiring, from height measurement values related to the surface height of the rigid body S acquired at different two times for the same position of the rigid body S, a height change value derived from disturbance at the position. At this time, the disturbance estimation unit 213 performs the height change value acquisition processing mentioned above on a plurality of points of different longitudinal-direction positions of the light-section line $L_b$, and performs the height change value acquisition processing mentioned above on a plurality of points of different longitudinal-direction positions of the light-section line $L_c$. After that, the disturbance estimation unit 213 estimates the amount of height fluctuation superimposed on shape data calculated by the shape data calculation unit 215 described later, using the height change value at the intersection point A obtained from the light-section line $L_b$ and the height change value at the intersection point B obtained from the light-section line $L_c$.

Disturbance estimation processing in the disturbance estimation unit 213 is described in detail later.

On finishing disturbance estimation processing described in detail below, the disturbance estimation unit 213 outputs the obtained result of disturbance estimation to the correction unit 217 described later. Further, the disturbance estimation unit 213 may associate, with data showing the obtained result concerning disturbance estimation, time information on the date and time at which the data are generated and on other matters, and may store these pieces of information as history information in the storage unit 207 or the like.

The shape data calculation unit 215 is configured with, for example, a CPU, a ROM, a RAM, etc. The shape data calculation unit 215 expresses the three-dimensional shape of the surface of the rigid body S on the basis of the captured image concerning the light-section line $L_a$ at each time generated by the area camera 111, and calculates shape data in which a measurement error derived from disturbance is superimposed.

The processing of calculating shape data in the shape data calculation unit 215 is described later.

On finishing the processing of calculating shape data described below, the shape data calculation unit 215 outputs the obtained shape data to the correction unit 217 described later. Further, the shape data calculation unit 215 may associate, with the obtained shape data, time information on the date and time at which the shape data are generated and on other matters, and may store these pieces of information as history information in the storage unit 207 or the like.

The correction unit 217 is configured with, for example, a CPU, a ROM, a RAM, etc. The correction unit 217 subtracts the amount of height fluctuation calculated by the disturbance estimation unit 213 mentioned above from the shape data calculated by the shape data calculation unit 215, and thereby corrects the measurement error derived from disturbance. Thus, the true shape data related to the rigid body S in which the measurement error associated with disturbance that may occur on the rigid body S is removed are generated.

Correction processing in the correction unit 217 is described later.

On finishing correction processing described below, the correction unit 217 outputs the corrected shape data to the result output unit 219 described later.

The result output unit 219 is configured with, for example, a CPU, a ROM, a RAM, an output device, a communication device, etc. The result output unit 219 outputs to the display control unit 205 information on the surface shape of the rigid body S outputted from the correction unit 217. Thereby, information on the surface shape of the rigid body S is outputted to a display unit (not shown). Further, the result output unit 219 may output the obtained result concerning surface shape measurement to an external device such as a process computer system for production management, or may use the obtained measurement result to create various record files. Further, the result output unit 219 may associate information on the surface shape of the rigid body S with time information on the date and time at which the information is calculated and on other matters, and may store these pieces of information as history information in the storage unit 207 or the like.

With Regard to Disturbance Estimation Processing in Disturbance Estimation Unit 213

In the following, disturbance estimation processing performed in the disturbance estimation unit 213 is described in detail with reference to FIG. 13 to FIG. 23.

First, before describing disturbance estimation processing, calibration data used in the disturbance estimation processing are described.

With Regard to Calibration Data

As mentioned above, calibration data related to the light-section line L used for disturbance estimation processing in the disturbance estimation unit 213 and shape calculation processing in the shape data calculation unit 215 are stored beforehand in the storage unit 207. The calibration data stored beforehand in the storage unit 207 include two kinds of calibration data of first calibration data and second calibration data.

The first calibration data are calibration data necessary to convert the amount of change in the position of the light-section line on the captured image captured by the area cameras 111 and 113 (unit: pixels) to the amount in the real space (unit: a unit of length such as mm or m; in the following, a description is given using the unit of mm).

The first calibration data are data calculated from the normal imaging resolution (mm/pixel) of the area camera and the angles $\alpha_1$, $\alpha_2$, and $\alpha_3$ between the line of sights to the light-section lines $L_a$, $L_b$, and $L_c$ and the Z-axis direction. However, in the present invention, the rigid body S that is the measurement object gets nearer or farther on the optical axis of the camera; therefore, the imaging resolution and the angles $\alpha_1$, $\alpha_2$, and $\alpha_3$ are not strictly a constant but are a value varying with the height of the rigid body S. Thus, in the case where the height change of the rigid body S that is the measurement object is large, a calibration curve expressing a relationship between the position of the light-section line in the captured image and the height in the real space is needed. Hereinafter, the first calibration data are referred to as a calibration curve. The calibration curve is set for each of the light-section lines $L_a$, $L_b$, and $L_c$.

The first calibration data can be calculated by calculation, or can be obtained by actual measurement.

In the case where the first calibration data are calculated by calculation, the focal distance f of the lens installed in the area cameras 111 and 113, the distance a from the lens to the measurement object (that is, the rigid body S), and the distance b from the imaging element provided in the area cameras 111 and 113 to the lens are used. More specifically, the first calibration data can be calculated by finding a magnification m expressed by Formula 103 by an image formation formula expressed by Formula 101 below using the above parameters.

Image formation formula: $1/f=1/a+1/b$     (Formula 101)

Magnification: $m=b/a$     (Formula 103)

Here, when the pixel size of the imaging element provided in the area cameras 111 and 113 is denoted by d (mm), the imaging resolution D (mm/pixel) is a value expressed by Formula 105 below. The imaging resolution D is an imaging resolution in a plane perpendicular to the line of sight; thus, when the angle between the line of sight and the normal direction is a degrees, the amount of vertical movement H (mm) of the measurement object corresponding to one pixel is a value expressed by Formula 107 below.

$D=d/m$     (Formula 105)

$H=D/\sin \alpha$     (Formula 107)

The amount of vertical movement H of the measurement object corresponding to one pixel obtained in the above manner serves as a conversion factor for converting the amount of change of the light-section line (unit: pixels) on the captured image captured by the area cameras 111 and 113 to the amount in the real space (unit: e.g., mm). Thus, values given by Formula 107 above on the basis of the optical positional relationships between the area cameras 111 and 113 and the light-section lines $L_a$, $L_b$, and $L_c$ corresponding to the area cameras 111 and 113 can be used as calibration curves $C^a$, $C^b$, and $C^c$ (that is, the first calibration data) related to the light-section lines $L_a$, $L_b$, and $L_c$, respectively.

In the case where the first calibration data are actually measured, a calibration plate is prepared and installed in a reference plane with a coordinate in the height direction of Z=0, and light-section images are captured by each of the area cameras 111 and 113 while the calibration plate is translated in the Z-axis direction by $\Delta Z$ [mm]. After that, the amount of movement $\Delta Z_{img}$ [unit: pixels] of the light-section line L on a pixel basis in the obtained captured image of each of the area cameras 111 and 113 may be actually measured for a plurality of points, and a calibration curve $\Delta Z=C(\Delta Z_{img})$ may be created (provided that $C(\Delta Z_{img})$ expresses a function with $\Delta Z_{img}$ as a variable). Thereby, calibration curves $C^a$, $C^b$, and $C^c$ related to the light-section lines $L_a$, $L_b$, and $L_c$, respectively, can be obtained.

Next, the second calibration data are described with reference to FIG. 13.

Figure 13:
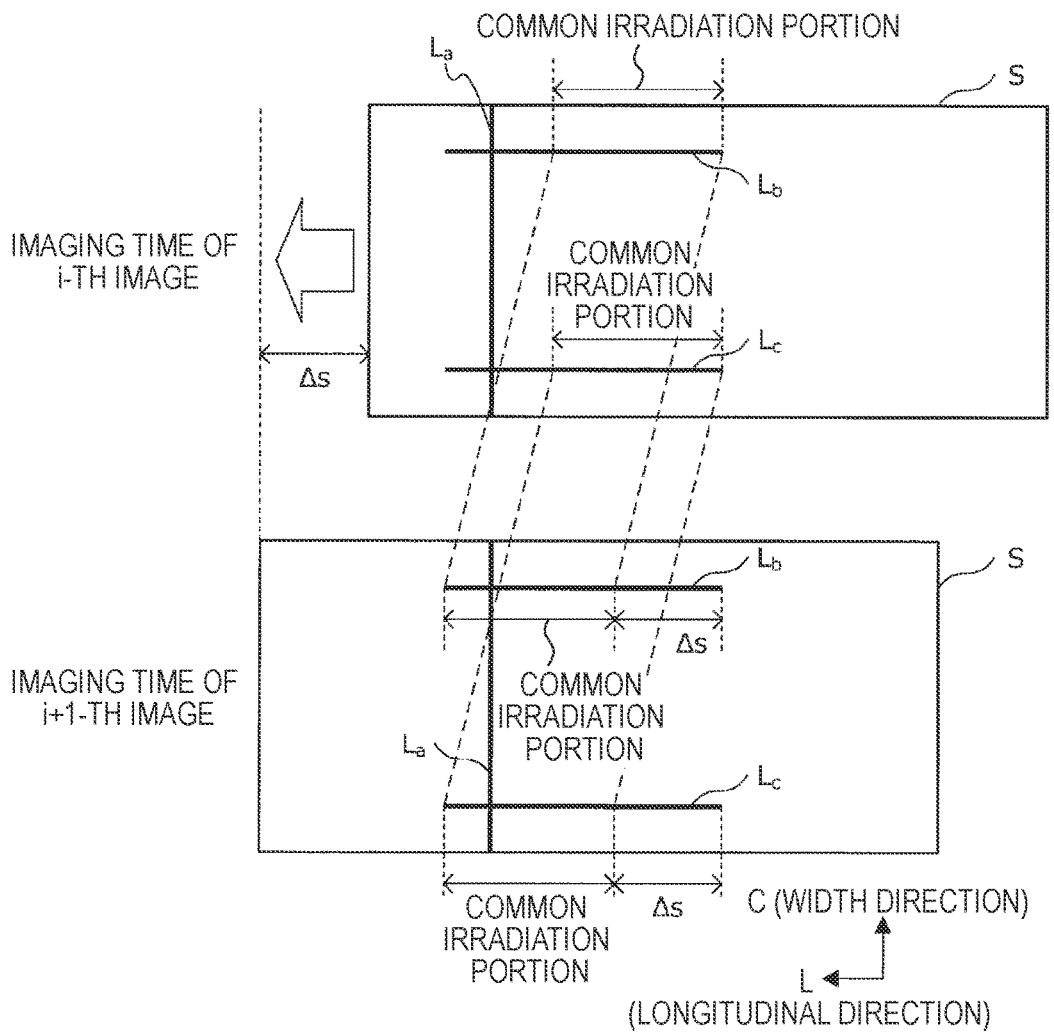
FIG. 13 is an explanatory diagram for describing disturbance estimation processing performed by a disturbance estimation unit according to the embodiment.

The second calibration data are data showing the amount of movement (unit: pixels) in the horizontal direction in the image corresponding to the conveyance distance (unit: a unit of length such as mm or m) of the rigid body S in the real space between consecutive two imaging times on the real space shown in FIG. 13. The second calibration data are set for each of the light-section lines $L_b$ and $L_c$. As described later, the amount of movement in the vertical direction of the same point on the rigid body S can be compared between consecutive two photographed images by translating the captured image captured by the area camera 113 in the horizontal direction (a direction corresponding to the L-axis direction in the real space) to the extent of the amount of movement mentioned above. Thus, the second calibration data are calibration data used to estimate the magnitude of disturbance.

The second calibration data also can be calculated by calculation, or can be obtained by actual measurement.

As described above, the second calibration data are data showing how many pixels the conveyance distance $\Delta s$ ($\Delta s$ shown in FIG. 13) in the real space of the rigid body S in the period when consecutive two photographed images are generated corresponds to in the generated captured image. Thus, in the case where the second calibration data are calculated by calculation, the imaging resolution D calculated by Formula 105 above may be calculated for both of the light-section lines $L_b$ and $L_c$, and the set value of the conveyance distance $\Delta s$ in the real space may be divided using the obtained imaging resolutions $D^b$ and $D^c$. That is, when the amount of movement in the horizontal direction related to the light-section line $L_b$ is denoted by $\Delta L^b$ and the amount of movement in the horizontal direction related to the light-section line $L_c$ is denoted by $\Delta L^c$, these values can be calculated by Formula 109 and Formula 111 below.

$\Delta L^b = \Delta s/D^b$     (Formula 109)

$\Delta L^c = \Delta s/D^c$     (Formula 111)

In the case where the second calibration data are actually measured, a calibration plate may be installed in a reference plane of Z=0, like in the case where the first calibration data are actually measured, and captured images may be generated while the calibration plate is translated by $\Delta s$ [mm] in the L-axis direction. After that, the obtained captured images may be analyzed to measure the amounts of movement $\Delta L^b$ and $\Delta L^c$ in the horizontal direction in the captured image.

Hereinabove, two kinds of calibration data used in the image processing unit 203 according to the present embodiment are described.

With Respect to Coordinate System Used in Disturbance Estimation Processing

Next, a coordinate system used in disturbance estimation processing is specifically described with reference to FIG. 14 and FIG. 15.

In disturbance estimation processing performed in the disturbance estimation unit 213 according to the present embodiment, image processing is performed using a coordinate system fixed to the captured image captured by the area camera 113. That is, in the light-section image generated by the area camera 113, a direction corresponding to the longitudinal direction of the rigid body S (that is, the horizontal direction of the light-section image) is defined as an X-axis direction, and a direction orthogonal to the X-axis direction (that is, the height direction of the light-section image) is defined as a Y-axis direction.

Further, a position in the height direction that is in a captured image of the area camera 113 captured while a flat surface of a calibration plate or the like is placed in a position of Z=0 and where the light-section line $L_b$ is imaged is taken as a reference position of a Y-coordinate $Y^b$ for the light-section line $L_b$ (that is, a position of $Y^b$=0), and a reference position of an X-coordinate $X^b$ is set at the left end of the captured image. As a result, the X-coordinate $X^b$ for the light-section line $L_b$ is defined along the extending direction of the light-section line $L_b$, and the X-axis direction $X^b$ and the Y-axis direction $Y^b$ for the light-section line $L_b$ are defined as shown in FIG. 14.

Similarly, a position in the height direction that is in a captured image of the area camera 113 captured while a flat surface of a calibration plate or the like is placed in a position of Z=0 and where the light-section line $L_c$ is imaged is taken as a reference position of a Y-coordinate $Y^c$ for the light-section line $L_c$ (that is, a position of $Y^c$=0), and a reference position of an X-coordinate $X^c$ is set at the left end of the captured image. As a result, the X-coordinate $X^c$ for the light-section line $L_c$ is defined along the extending direction of the light-section line $L_c$, and the X-axis direction $X^c$ and the Y-axis direction $Y^c$ for the light-section line $L_c$ are defined as shown in FIG. 15.

A coordinate system can be defined similarly also in a captured image of the area camera 111 captured while a flat surface of a calibration plate or the like is placed in a position of Z=0. That is, a position in the height direction where the light-section line $L_a$ is imaged is taken as a reference position of a Y-coordinate $Y^a$ for the light-section line $L_a$ (that is, a position of $Y^a$=0), and an X-coordinate $X^a$ for the light-section line $L_a$ is defined along the extending direction of the light-section line $L_a$, with the left end of the captured image as a reference. A specific example of the coordinate system for the light-section line $L_a$ is mentioned later with reference to FIG. 24.

In the following description, the case where "height" is mentioned expresses a value in the vertical direction in the captured image, that is, the $Y^a$, $Y^b$, and $Y^c$-coordinates (unit: pixels), and the value in the case where the "height" in the captured image is converted to the real space (unit: mm) by the calibration curves $C^a$, $C^b$, and $C^c$ is expressed as "the height in the Z-coordinate" or the like.

With Regard to Details of Disturbance Estimation Processing

Next, disturbance estimation processing performed in the disturbance estimation unit 213 is described in detail with reference to FIG. 16 to FIG. 23.

In the disturbance estimation unit 213 according to the present embodiment, the height change value derived from disturbance (that is, the amount of change in the Z-coordinate in the real space) in a portion of the surface of the rigid body S existing on the light-section lines $L_b$ and $L_c$ is calculated on the basis of the captured image captured by the area camera 113 in which the light-section lines $L_b$ and $L_c$ are present.

Overview of Disturbance Estimation Processing

In a light-section method like that proposed by Patent Literature 1 above, surface height measurement is performed at different times for a plurality of points of different longitudinal-direction positions on the light-section line, the difference in surface height measurement result between points (that is, a change derived from disturbance) is used as it is for the calculation of the magnitude of disturbance. However, in the light-section method performed in the shape measurement apparatus 10 according to the present embodiment, the relationship between the longitudinal-direction position of each point on the light-section line $L_b$ (that is, the value of the $X^b$-coordinate) and the change in the value of the $Y^b$-coordinate derived from disturbance at each of these points is specified by disturbance estimation processing performed by the disturbance estimation unit 213, using a plurality of captured images captured at different times. After that, the disturbance estimation unit 213 approximates the distribution along the $X^b$-direction of the amounts of change in the $Y^b$-coordinate with a straight line. By using the approximate straight line, the disturbance estimation unit 213 can accurately calculate the amount of change in the value of the $Y^b$-coordinate at the $X^b$-coordinate corresponding to the intersection point A shown in FIG. 2, while suppressing the variation in the value due to the measurement error at each point on the light-section line $L_b$. After that, the disturbance estimation unit 213 converts the amount of change in the value of the $Y^b$-coordinate expressed on a pixel basis to the amount of change in the Z-coordinate in the real space (that is, the amount of height fluctuation derived from disturbance), by using a calibration curve $C^b$ like that described above.

Also the change in the Z-coordinate derived from disturbance at the intersection point B shown in FIG. 2 can be found similarly to the above by focusing on the light-section line $L_c$ in place of the light-section line $L_b$.

Next, assuming that the C-coordinate in the real space (that is, the width direction of the rigid body S) is a reference, the amounts of change in the Z-coordinate at the intersection point A and the intersection point B calculated in the above manner may be plotted on a plane, with the C-coordinate on the horizontal axis and the amount of change in the Z-coordinate on the vertical axis. Since the measurement object focused on in the shape measurement apparatus 10 according to the present embodiment is a rigid body, the amounts of change in the Z-coordinate at points in the width direction of the rigid body S located between the intersection point A and the intersection point B are supposed to change in a straight line in the real space. Therefore, when a straight line passing through the amounts of change in the Z-coordinate at the intersection point A and the intersection point B is imagined on the C-axis-Z-axis plane like the above, the amounts of change in the Z-coordinate at points in the width direction of the rigid body S located between the intersection point A and the intersection point B can be expressed in the real space. Thus, by finding a straight line like the above on the C-axis-Z-axis plane, the disturbance estimation unit 213 can find the change in the Z-coordinate derived from disturbance at width-direction positions connecting the two intersection points.

The above is an overview of disturbance estimation processing performed in the disturbance estimation unit 213; the disturbance estimation unit 213 that performs disturbance estimation processing includes, as shown in FIG. 16, a common irradiation portion disturbance estimation unit 221 and an intersection point position disturbance estimation unit 223.

With Regard to Common Irradiation Portion Disturbance Estimation Unit 221

The common irradiation portion disturbance estimation unit 221 is configured with, for example, a CPU, a ROM, a RAM, etc. The common irradiation portion disturbance estimation unit 221 is a processing unit that specifies, of the processing briefly mentioned in the overview of disturbance estimation processing mentioned above, the relationship between the longitudinal-direction position of each point on the light-section lines $L_b$ and $L_c$ (that is, the value of the $X^b$-coordinate and the $X^C$-coordinate) and the change in the value of the $Y^b$-coordinate and the $Y^C$-coordinate derived from disturbance at each of these points, using a plurality of captured images captured at different times.

The common irradiation portion disturbance estimation unit 221 performs the processing of calculating the change value of the value of the $Y^b$-coordinate and the $Y^C$-coordinate derived from disturbance like the above, on the common irradiation portion shown in FIG. 7. In the following, the processing performed by the common irradiation portion disturbance estimation unit 221 is described in detail with reference to FIG. 17 to FIG. 20.

As described with reference to FIG. 7, when a moving rigid body S is imaged by the area camera 113, a region imaged in common (that is, the common irradiation portion shown in FIG. 7) exists in consecutive two captured images (for example, the i-th captured image and the i+1-th captured image). Therefore, when the i-th captured image captured by the area camera 113 is translated by $\Delta L^b$ in the negative direction of the $X^b$-axis on the basis of the second calibration data, the $X^b$-coordinate of the common irradiation portion of the i-th image and the $X^b$-coordinate of the common irradiation portion of the i+1-th image can be caused to coincide. Similarly, also for the light-section line $L_c$, when the i-th captured image captured by the area camera 113 is translated by $\Delta L^c$ in the negative direction of the $X^C$-axis on the basis of the second calibration data, the $X^C$-coordinate of the common irradiation portion of the i-th image and the $X^C$-coordinate of the common irradiation portion of the i+1-th image can be caused to coincide. Since the common irradiation portion is the same position on the rigid body S, the true surface height of the common irradiation portion in the real space is the same. Therefore, by equalizing the X-coordinate and then comparing the Y-coordinate of the common irradiation portion in the i-th image and the Y-coordinate of the common irradiation portion in the i+1-th image, it becomes possible to estimate the magnitude of disturbance that has occurred on the rigid body S at the time of capturing the i+1-th image.

More specifically, the common irradiation portion disturbance estimation unit 221 calculates the surface height after disturbance removal in the i+1-th captured image and a height change (hereinafter, referred to as a "disturbance component") due to a disturbance component in the i+1-th image, using an apparent surface height (hereinafter, referred to as an "apparent height") including a disturbance component that is obtained from the i+1-th captured image and the surface height after disturbance removal in the common irradiation portion in the i-th captured image.

Figure 17:
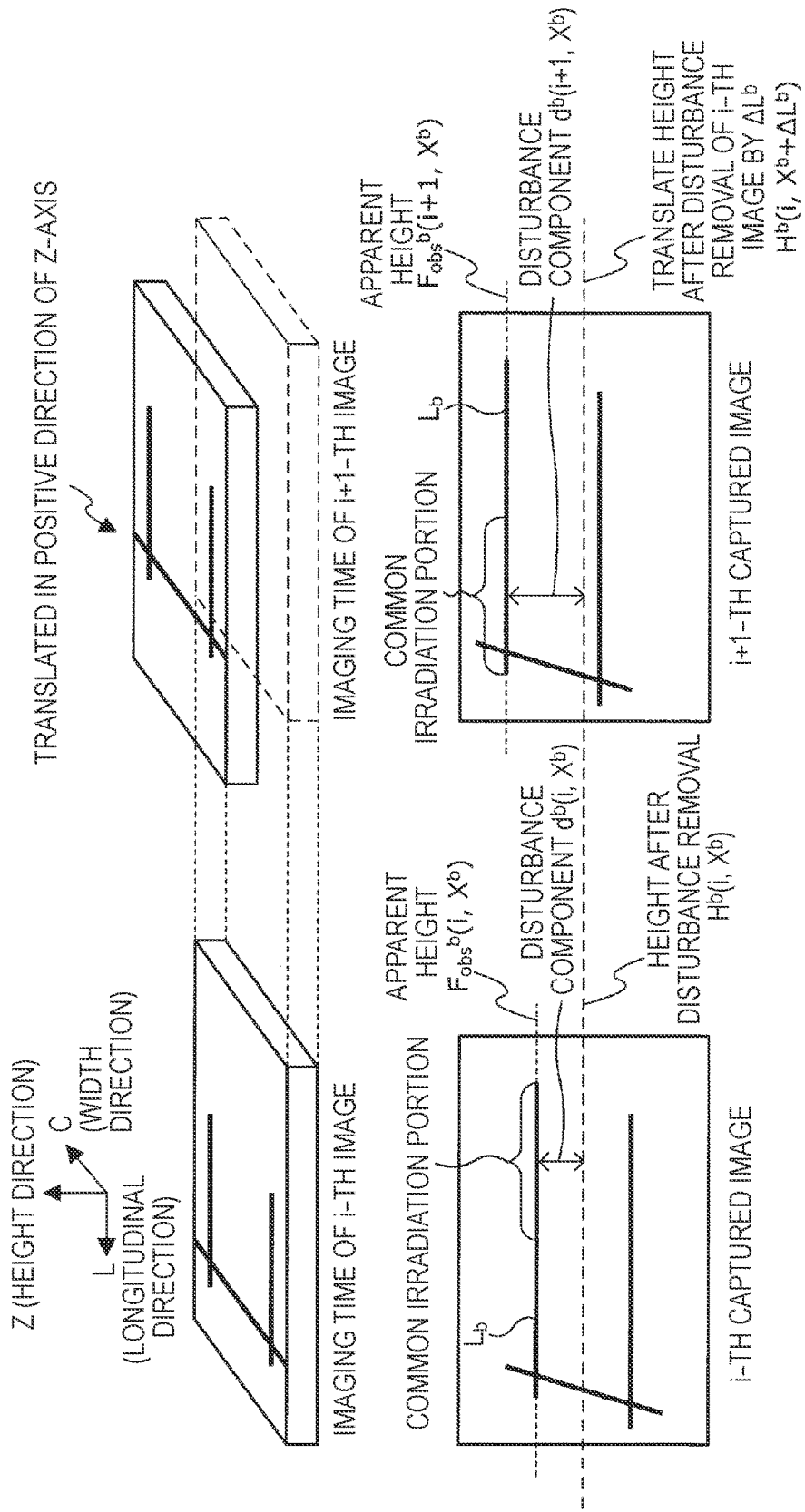
FIG. 17 is a block diagram showing an example of the configuration of a disturbance estimation unit included in the image processing unit according to the embodiment.

When disturbance has occurred on the rigid body S, the $Y^b$-coordinate of the light-section line $L_b$ and the $Y^C$-coordinate of the light-section line $L_c$ that are present in the captured image obtained by the area camera 113 change in the manner illustrated in FIG. 9 to FIG. 11. FIG. 17 is an explanatory diagram for describing a method for calculating a change value in the $Y^b$-coordinate derived from disturbance in the common irradiation portion disturbance estimation unit 221. Although FIG. 17 shows the case where translation in the Z-axis direction has occurred as disturbance between consecutive two images, the entire following description is not limited to the case where translation in the Z-axis direction has occurred as disturbance, and similarly holds also in the case where rotation around the L-axis has occurred and the case where rotation around the C-axis has occurred. The reason is that, in all of the three disturbances, the change in the $Y^b$-coordinate and the $Y^C$-coordinate derived from disturbance can be approximated with a straight line because the focused-on measurement object is a rigid body.

The common irradiation portion disturbance estimation unit 221 performs processing similar to the processing performed on the light-section line $L_b$ also on the light-section line $L_c$. Hence, in the following drawings and description, a description is given using the processing performed on the light-section line $L_b$ representatively.

The common irradiation portion disturbance estimation unit 221 first executes the following processing on two captured images of the i-th image and the i+1-th image photographed by the area camera 113 for the $X^b$-coordinate belonging to the respective common irradiation portions.

In the following description, the light-section line $L_b$ in the i-th captured image in the $(X^b, Y^b)$ coordinate system is seen as a function of $X^b$, and is expressed as $Y^b = F_{obs}^b(i, X^b)$. Further, in the following, $F_{obs}^b(i, X^b)$ is referred to as an "apparent height" of the light-section line $L_b$.

As shown in FIG. 9 to FIG. 11, the position of the light-section line in the captured image changes due to disturbance; the vertical movement of the light-section line derived from disturbance of the i-th captured image with the captured image of i=1st as a reference is expressed as a disturbance component of $d^b(i, X^b)$. Here, assuming that a common light-section method is used, this can be seen as a method in which the magnitude of disturbance is estimated by specifying the vertical movement of the position of the light-section line in the i+1-th captured image with the position of the light-section line in the i-th captured image as a reference (that is, disturbance is estimated between captured image frames). However, note that the light-section method according to the present embodiment is, as mentioned above and described in detail below, a method in which the magnitude of disturbance is estimated with the position of the light-section line in the 1st captured image as a reference.

In view of FIG. 9 to FIG. 11 and the like for reference, the apparent height of the light-section line $L_b$ in the i-th captured image can be sees as "a value in which a change in the position of the light-section line derived from a disturbance component is added to the surface height that is supposed to be observed in the case where disturbance does not exist." That is, as schematically shown in FIG. 17, the apparent height of the light-section line $L_b$ of the i-th captured image can be seen as the sum total of the disturbance component and the surface height after the disturbance is removed (that is, the surface height that is supposed to be observed in the case where disturbance does not exist; hereinafter, occasionally referred to as simply "a surface height after disturbance removal"). Since the measurement object is a rigid body as mentioned from above, the disturbance component $d^b(i, X^b)$ can be seen as a linear function, that is, a straight line for $X^b$.

Here, in the disturbance estimation processing according to the present embodiment, it is assumed that "the disturbance component in the 1st captured image is zero." That is, it is assumed that Formula 121 below holds for all the $X^b$-coordinates belonging to the common irradiation portion in the 1st captured image and the 2nd and subsequent captured images in which the common irradiation portion in the 1st captured image exists.

$$d^b(1, X^b) = 0 \qquad \text{(Formula 121)}$$

There may be a case where disturbance has been added in the 1st image; in this case, the surface height outputted by the image processing according to the present embodiment in the end is a value in which a plane determined by the magnitude of a disturbance component that had already been added at the time of capturing the 1st image is uniformly added to the original surface height. However, in the case where a reference plane is determined in a rigid body S like a slab of a steel semi-finished product, the surface height viewed from the reference plane can be obtained by performing a correction in which a plane is subtracted so that the surface height of the total length and the total width outputted in the end coincides with the reference plane. Hence, in the following, a description is given on the assumption that Formula 121 above holds.

At this moment, as shown in FIG. 17, the surface height after disturbance removal of the portion irradiated with the light-section line $L_b$ at the photographing time of the i-th image can be obtained by subtracting the disturbance component from the apparent surface height. That is, the surface height after disturbance removal $H^b(i, X^b)$ of the rigid body S irradiated with the light-section line $L_b$ in the i-th captured image can be found in accordance with Formula 123 below.

$$H^b(i, X^b) = F_{obs}^b(i, X^b) - d^b(i, X^b) \qquad \text{(Formula 123)}$$

Further, the disturbance component in the i+1-th captured image can be found by subtracting the surface height after disturbance removal from the apparent height in the i+1-th captured image. That is, Formula 125 below holds.

$$d^b(i+1, X^b) = F_{obs}^b(i+1, X^b) - H^b(i+1, X^b) \qquad \text{(Formula 125)}$$

Here, the surface height after disturbance removal $H^b(i+1, X^b)$ in the i+1-th captured image cannot be measured from the i+1-th image alone. However, since the common irradiation portion is the same position on the rigid body S, the surface height after disturbance removal in the i+1-th captured image is equal to the surface height after disturbance removal in the i-th captured image. Thus, the common irradiation portion disturbance estimation unit 221 according to the present embodiment uses, as the surface height after disturbance removal $H^b(i+1, X^b)$ in the i+1-th captured image, a value obtained by translating the surface height after disturbance removal $H^b(i, X^b)$ in the i-th image that has already been found by Formula 123 by $\Delta L^b$ in the conveyance direction (that is, the negative direction of the $X^b$-axis) and equalizing the common irradiation portion. That is, the fact that the relationship expressed by Formula 127 below holds is utilized.

$$H^b(i+1, X^b) = H^b(i, X^b + \Delta L^b) \qquad \text{(Formula 127)}$$

Therefore, by substituting Formula 127 in Formula 125, the disturbance component $d^b(i+1, X^b)$ of the i+1-th image can be found by Formula 129 below using the apparent height obtained from the i+1-th image and the surface height after disturbance removal of the i-th image.

$$d^b(i+1, X^b) = F_{obs}^b(i+1, X^b) - H^b(i, X^b + \Delta L^b) \qquad \text{(Formula 129)}$$

Further, in Formula 123 above, the parameter i is incremented by one into i=i+1, and the disturbance component of the i-th image obtained by Formula 129 above is substituted in the portion of $d^b(i+1, X^b)$; thereby, the surface height after disturbance removal $H^b(i+1, X^b)$ in the i+1-th captured image can be found.

Thus, the common irradiation portion disturbance estimation unit 221 uses Formula 129 and Formula 123 alternately, with Formula 121 at i=1 taken as the initial value, and sequentially increments the value of the parameter i by one; and thereby can sequentially calculate the surface height after disturbance removal in the i-th image and the disturbance component in the i+1-th image.

Figure 18:
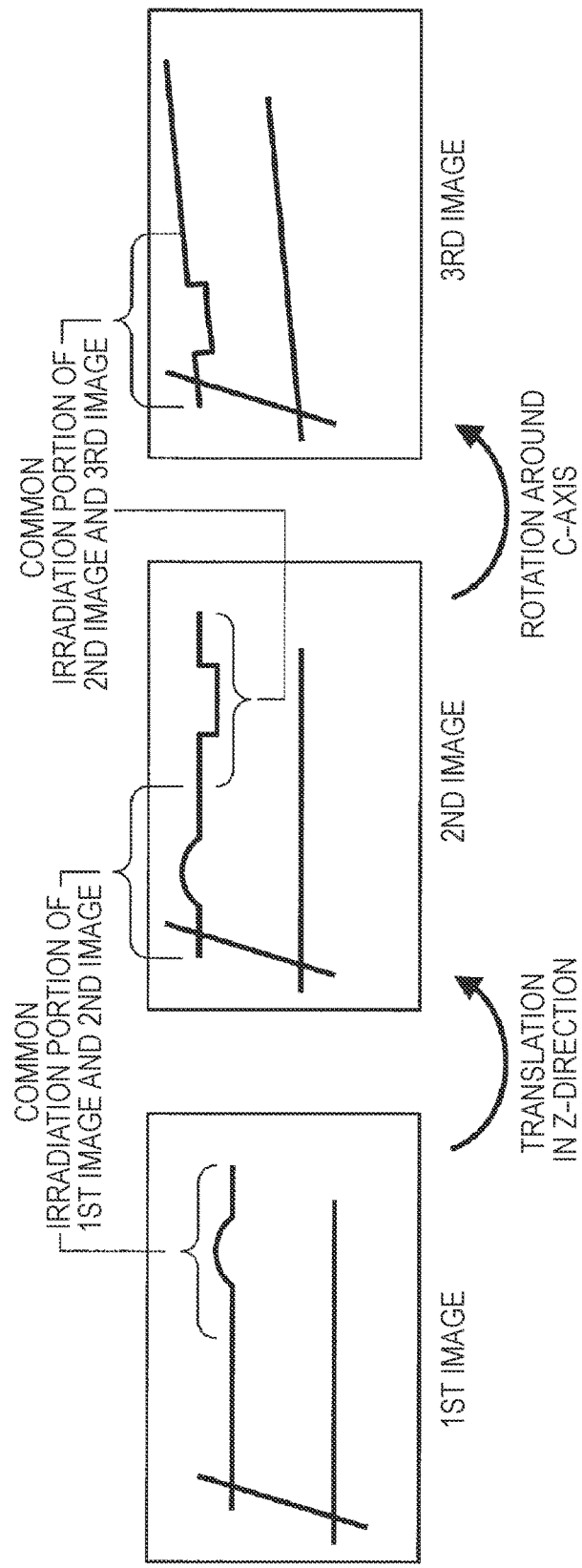
FIG. 18 is a block diagram showing an example of the configuration of a disturbance estimation unit included in the image processing unit according to the embodiment.

In the following, how the processing of specifying the disturbance component in the common irradiation portion by the common irradiation portion disturbance estimation unit 221 mentioned above is performed in the case where it is used for a situation like that shown in FIG. 18 is specifically described.

In the following, a description is given only for the light-section line $L_b$; but this similarly applies also to the light-section line $L_c$.

In FIG. 18, a rigid body S in which a part of the portion to be irradiated with the light-section line $L_b$ has unevenness is used as a measurement object. At this moment, it is assumed that, as shown in the left half of FIG. 18, translation in the Z-direction has occurred as disturbance while the 1st and 2nd captured images are captured.

Figure 19:
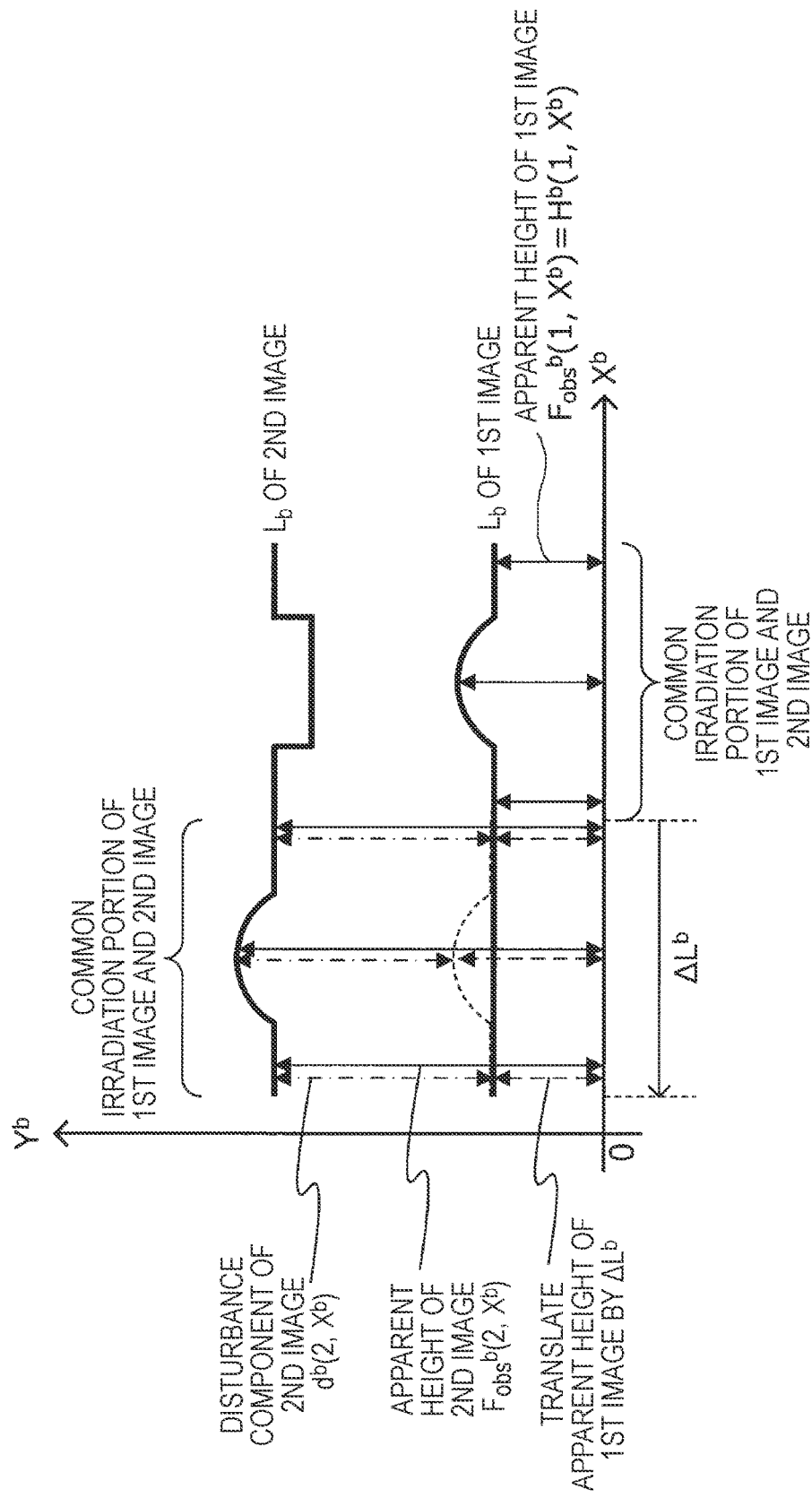
FIG. 19 is a block diagram showing an example of the configuration of a disturbance estimation unit included in the image processing unit according to the embodiment.

FIG. 19 is an explanatory diagram for describing processing based on Formula 129 in the common irradiation portion in the 1st captured image and the 2nd captured image. As shown in Formula 125 above, the disturbance component $d^b(2, X^b)$ in the 2nd captured image is the difference between the apparent height $F_{obs}^b(2, X^b)$ and the surface height after disturbance removal $H^b(2, X^b)$ in the 2nd captured image. On the other hand, as described from above, the surface height after disturbance removal $H^b(2, X^b)$ in the 2nd captured image is a value obtained by translating the surface height after disturbance removal $H^b(1, X^b)$ in the 1st captured image by $\Delta L^b$ as shown by the broken line in FIG. 19 (that is, $H^b(1, X^b + \Delta L^b)$). Here, from Formula 121 above, $H^b(1, X^b)$ is equal to $F_{obs}^b(1, X^b)$. Therefore, $H^b(1, X^b + \Delta L^b)$ is equal to $F_{obs}^b(1, X^b + \Delta L^b)$. Thus, referring to FIG. 19, the disturbance component $d^b(2, X^b)$ in the 2nd captured image is equal to a value obtained by subtracting, from the apparent height $F_{obs}^b(2, X^b)$, a value obtained by translating the apparent height of the 1st image by $\Delta L^b$. That is, the situation shown in FIG. 19 corresponds to the formula shown as Formula 129 above expressed as a drawing.

In the case of FIG. 18, since the disturbance that has occurred on the rigid body S is translation in the Z-direction, the disturbance component (the magnitude shown by the alternate long and short dash line in FIG. 19) $d^b(2, X^b)$ found by Formula 129 is fixed regardless of the $X^b$-coordinate.

Next, it is assumed that, as shown in the right half of FIG. 18, rotation around the C-axis has occurred while the 2nd and 3rd captured images are captured. In this case, as is clear when the 1st captured image and the 3rd captured image are compared in FIG. 18, translation in the Z-direction and rotation around the C-axis have occurred as disturbance on the rigid body S, assuming that the 1st captured image is a reference.

Figure 20:
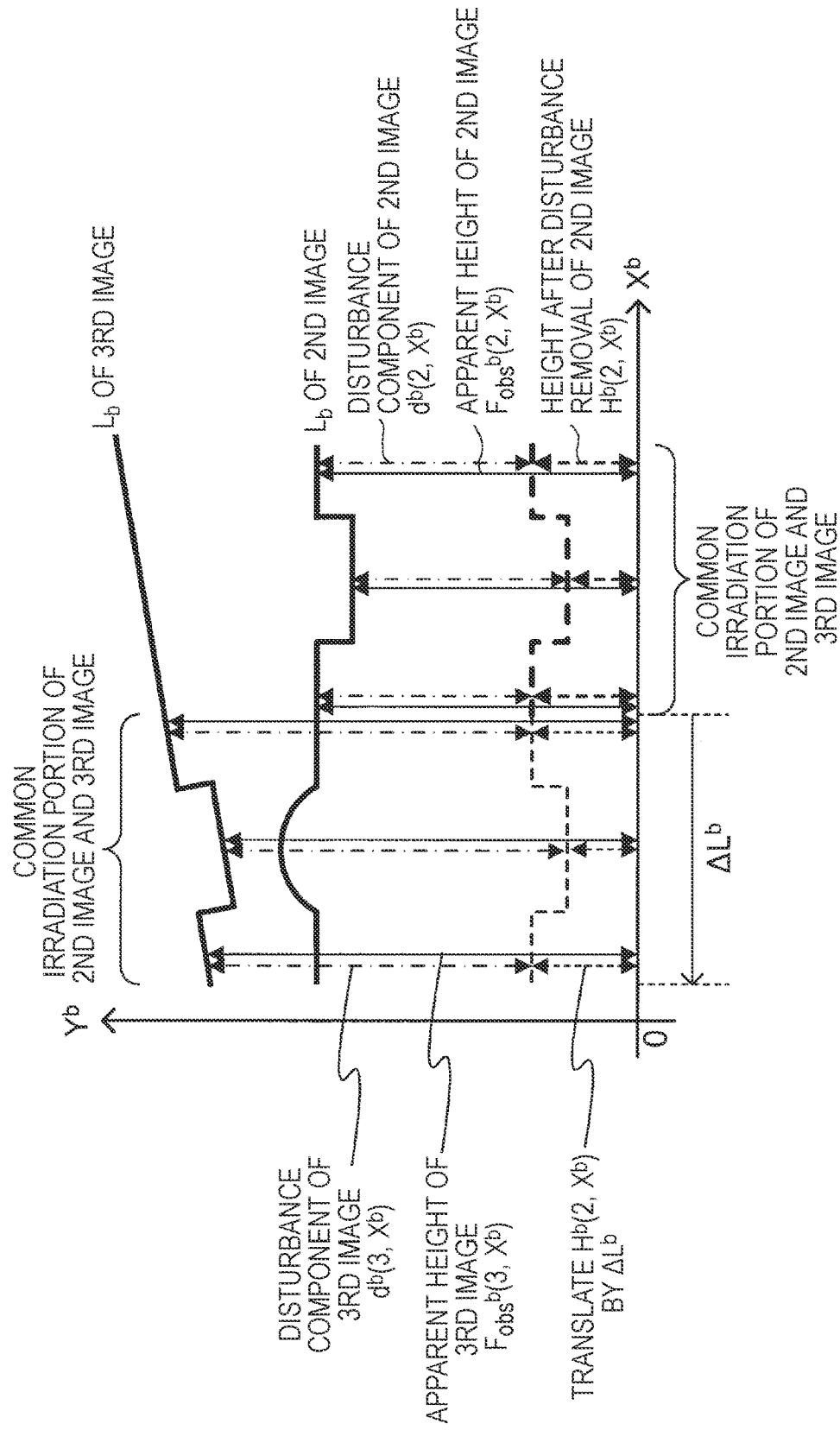
FIG. 20 is a block diagram showing an example of the configuration of a disturbance estimation unit included in the image processing unit according to the embodiment.

FIG. 20 is an explanatory diagram for describing processing based on Formula 123 and Formula 129 in the common irradiation portion of the 2nd captured image and the 3rd captured image.

As shown in the portion of the right half of FIG. 20, the surface height after disturbance removal $H^b(2, X^b)$ can be calculated by subtracting, from the apparent height $F_{obs}^b(2, X^b)$ obtained from the 2nd image, the disturbance component $d^b(2, X^b)$ that has already been calculated on the basis of FIG. 19. This relationship is the relationship expressed by Formula 123 above expressed as a drawing.

Next, as shown in the portion of the left half of FIG. 20, the surface height after disturbance removal $H^b(2, X^b)$ in the common irradiation portion of the 2nd captured image is translated by $\Delta L^b$ so that the common irradiation portion coincides with the 3rd captured image, and is subtracted from the apparent height obtained from the 3rd captured image; thus, the disturbance component $d^b(3, X^b)$ in the 3rd captured image can be calculated.

Here, rotation around the C-axis has been added between the 2nd captured image and the 3rd captured image; when the length of the alternate long and short dash line shown in the left half of FIG. 20 (that is, $d^b(3, X^b)$) is plotted against the X-coordinate $X^b$, $d^b(3, X^b)$ forms a straight line having a certain slope.

Here, as is clear also from FIG. 20, the disturbance component $d^b(3, X^b)$ of the 3rd captured image is a value obtained by subtracting the surface height after disturbance removal $H^b(2, X^b)$ in the 2nd captured image from the apparent height $F_{obs}^b(3, X^b)$ of the 3rd captured image, and the surface height after disturbance removal $H^b(2, X^b)$ in the 2nd captured image is a value obtained by subtracting the disturbance component $d^b(2, X^b)$ of the 2nd captured image from the apparent height $F_{obs}^b(2, X^b)$ of the 2nd captured image. Therefore, the disturbance component $d^b(3, X^b)$ of the 3rd captured image can also be seen as an amount based on the disturbance component $d^b(2, X^b)$ of the 2nd captured image. Similarly, the disturbance component $d^b(2, X^b)$ of the 2nd captured image can be grasped as an amount based on the disturbance component $d^b(1, X^b)$ of the 1st captured image. As is clear from such relationships, the disturbance estimation processing according to the present embodiment specifies the disturbance component $d^b(i, X^b)$ in the i-th captured image as a result of the accumulation of all the disturbances from the disturbance in the 1st captured image to the disturbance in the (i−1)st captured image.

In the case where rotation around the L-axis has occurred as disturbance, the magnitude of the disturbance component on the light-section line $L_b$ is fixed regardless of the $X^b$-coordinate like in the case where translation in the Z-direction has occurred. The disturbance component $d^c(i, X^c)$ on the light-section line $L_c$ existing in a different width-direction position in the real space is also fixed regardless of the coordinate $X^c$. However, the values of the disturbance component $d^b$ and the disturbance component $d^c$ are different; thus, the fact that rotation around the L-axis exists can be grasped.

By the common irradiation portion disturbance estimation unit 221 performing processing like the above, the magnitude of the disturbance component $d^b(i, X^b)$ on the light-section line $L_b$ can be calculated using two consecutive captured images. By using processing like the above also for the light-section line $L_c$ similarly, the common irradiation portion disturbance estimation unit 221 can calculate the magnitude of the disturbance component $d^c(i, X^c)$ on the light-section line $L_c$.

The common irradiation portion disturbance estimation unit 221 outputs information on the magnitude of the disturbance component on each of the light-section lines $L_b$ and $L_c$ thus calculated to the intersection point position disturbance estimation unit 223 described later.

With Regard to Intersection Point Position Disturbance Estimation Unit 223

The intersection point position disturbance estimation unit 223 is configured with, for example, a CPU, a ROM, a RAM, etc. The intersection point position disturbance estimation unit 223 is a processing unit that performs, of the processing briefly mentioned in the overview of disturbance estimation processing mentioned above, the processing of approximating the distribution along the $X^b$-direction of the amount of change in the $Y^b$-coordinate with a straight line for the light-section line $L_b$ and approximating the distribution along the $X^c$-direction of the amount of change in the $Y^C$-coordinate with a straight line for the light-section line $L_c$, and thus estimates the magnitude of disturbance at the positions of the intersection points A and B.

More specifically, the intersection point position disturbance estimation unit 223 approximates the distribution of the magnitude of disturbance along the X-coordinate with a straight line using the magnitude of disturbance in the common irradiation portion calculated by the common irradiation portion disturbance estimation unit 221, and extrapolates (depending on circumstances, interpolates) the obtained approximate straight line up to the position of the intersection point; thereby, calculates the magnitude of disturbance at the intersection point A and the intersection point B. By the approximation with a straight line, the variation occurring between points on the light-section lines $L_b$ and $L_c$ can be absorbed, and the value of disturbance at the intersection point A and the intersection point B can be found with better accuracy, as compared to conventional light-section methods including the invention described in Patent Literature 1 above. After that, the intersection point position disturbance estimation unit 223 converts the surface height expressed on a pixel basis to a value in the Z-coordinate (unit: mm) using the calibration curves $C^b$ and $C^c$ that are the first calibration data, and calculates the magnitude of disturbance in the Z-coordinate of the intersection points A and B.

As mentioned above, the intersection point position disturbance estimation unit 222 is a processing unit that calculates each of the change in the Z-coordinate $\Delta Z^b(i)$ (unit: mm) derived from the disturbance component at the intersection point A, and the change in the Z-coordinate $\Delta Z^c(i)$ (unit: mm) derived from the disturbance component at the intersection point B, in the i-th image.

The reason for finding the disturbance components at the two intersection points A and B is the following two reasons. The first reason is that the measurement object is a rigid body, and therefore the disturbance components $d^a(i, X^a)$ along the light-section line $L_a$ in the captured image captured by the area camera 111 and the disturbance components in the Z-coordinate obtained by converting the disturbance components $d^a(i, X^a)$ with the calibration curve $C^a$ are a straight line like in the case of the light-section lines $L_b$ and $L_c$. The second reason is that the values of the disturbance components at two points on a straight line related to the light-section line $L_a$ can be specified, and thereby the value of the disturbance component in a place other than the intersection points can be estimated for the light-section line $L_a$.

In the following, processing performed by the intersection point position disturbance estimation unit 223 is described in detail with reference to FIG. 21 to FIG. 23. Although FIG. 21 shows the case where translation in the Z-axis direction has occurred as disturbance between consecutive two captured images, the following description is not limited to the case shown in FIG. 21, and can similarly apply also to the case where rotation around the L-axis has occurred and the case where rotation around the C-axis has occurred.

At this moment, at the imaging time of the i-th captured image, an apparent Z-coordinate including a disturbance component is expressed as $Z^b(i)$ for the intersection point A of the light-section line $L_a$ and the light-section line $L_b$, and an apparent Z-coordinate including a disturbance component is expressed as $Z^c(i)$ for the intersection point B of the light-section line $L_a$ and the light-section line $L_c$.

Figure 21:
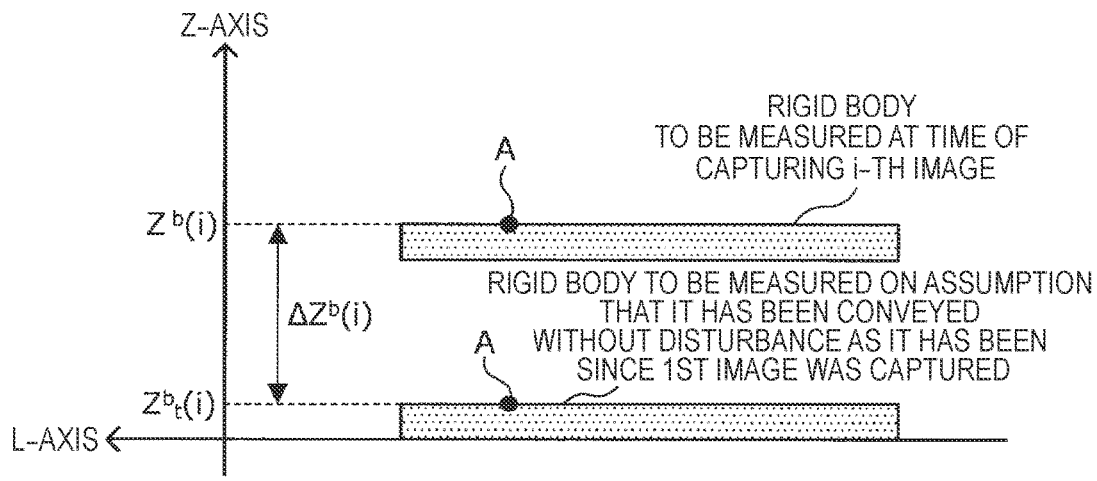
FIG. 21 is a block diagram showing an example of the configuration of a disturbance estimation unit included in the image processing unit according to the embodiment.

Further, as shown in FIG. 21, with the imaging time of the 1st captured image as a reference, the surface height in the Z-coordinate (that is, the surface height in the Z-coordinate after disturbance removal) on the assumption that disturbance does not occur until the i-th image is expressed as $Z^b_r(i)$ for the intersection point A, and is expressed as $Z^c_r(i)$ for the intersection point B.

As shown in FIG. 21 and Formula 131 below, the difference between the apparent surface height $Z^b(i)$ at the intersection point A in the Z-coordinate and the surface height after disturbance removal $Z^b_r(i)$ in the Z-coordinate is defined as a change in the Z-coordinate $\Delta Z^b(i)$ due to a disturbance component. Similarly, as shown in Formula 133 below, the difference between the apparent surface height $Z^c(i)$ at the intersection point B in the Z-coordinate and the surface height after disturbance removal $Z^c_r(i)$ in the Z-coordinate is defined as a change in the Z-coordinate $\Delta Z^c(i)$ due to a disturbance component.

$$\Delta Z^b(i) = Z^b(i) - Z^b_r(i) \quad \text{(Formula 131)}$$

$$\Delta Z^c(i) = Z^c(i) - Z^c_r(i) \quad \text{(Formula 133)}$$

Figure 22:
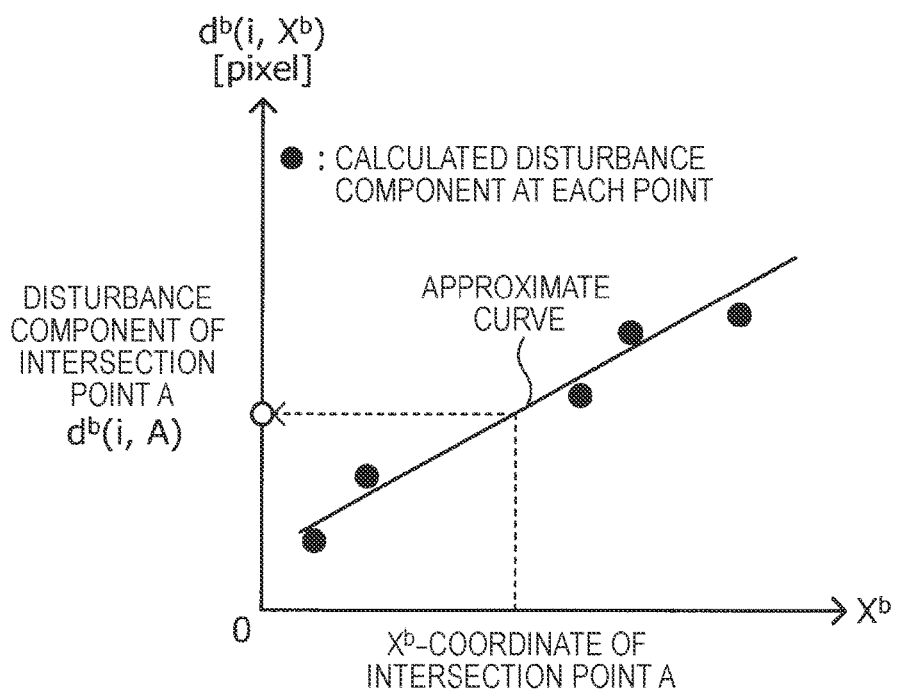
FIG. 22 is a block diagram showing an example of the configuration of a disturbance estimation unit included in the image processing unit according to the embodiment.

To calculate the change in the Z-coordinate $\Delta Z^b(i)$ due to a disturbance component, as shown in FIG. 22, the intersection point position disturbance estimation unit 223 takes into account how the magnitude of the disturbance component $d^b(i, X^b)$ outputted from the common irradiation portion disturbance estimation unit 221 is distributed along the $X^b$ direction. After that, the intersection point position disturbance estimation unit 223 approximates the distribution of the disturbance component $d^b(i, X^b)$ along the $X^b$ direction with a straight line by known statistical treatment such as the method of least squares. After that, the intersection point position disturbance estimation unit 223 calculates a disturbance component $d^b(i, A)$ (unit: pixels) that is the magnitude of the disturbance component at the intersection point A, using the $X^b$-coordinate of the intersection point A and the calculated approximate straight line.

After calculating the disturbance component $d^b(i, A)$ (unit: pixels) at the intersection point A, the intersection point position disturbance estimation unit 223 converts the magnitude of the disturbance component on a pixel basis to the disturbance component in the Z-coordinate $\Delta Z^b(i)$ (unit: mm), using the calibration curve $C^b$ that is the first calibration data.

Here, when calculating the disturbance component in the Z-coordinate $\Delta Z^b(i)$ in the real space, it is important to take into account the fact that the calibration curve $C^b$ is a curved line and the disturbance component $d^b(i, A)$ is, as mentioned from above, a disturbance component with the 1st captured image as a reference. Specifically, to find $\Delta Z^b(i)$ using a calibration curve $C^b$ like that shown in FIG. 23, it is necessary to perform conversion from the pixel unit to the mm unit at two points on the calibration curve and take a difference in the Z-coordinate.

Here, as mentioned from above, the value obtained by adding the disturbance component $d^b(i, A)$ to the surface height after disturbance removal $H^b(i, A)$ is the apparent height $F_{obs}^b(i, A)$ of the intersection point A in the i-th captured image. Thus, as shown in FIG. 23, the intersection point position disturbance estimation unit 223 calculates the apparent surface height $Z^b(i)$ of the intersection point A in the Z-coordinate of the i-th image using the apparent height $F_{obs}^b(i, A)$ of the intersection point A and the calibration curve $C^b$. Further, the intersection point position disturbance estimation unit 223 calculates the surface height after disturbance removal $Z^b_r(i)$ in the Z-coordinate of the i-th image using the surface height after disturbance removal $H^b(i, A)$ and the calibration curve $C^b$. After that, the intersection point position disturbance estimation unit 223 calculates the difference between the obtained two surface heights, and thereby calculates the disturbance component in the Z-coordinate $\Delta Z^b(i)$ at the intersection point A. Further, the intersection point position disturbance estimation unit 223 completely similarly calculates also the disturbance component in the Z-coordinate $\Delta Z^c(i)$ at the intersection point B.

The intersection point position disturbance estimation unit 223 outputs information on the magnitude of the disturbance component at the intersection point A and the intersection point B thus calculated to the correction unit 217.

Hereinabove, disturbance estimation processing performed in the disturbance estimation unit 213 is described in detail with reference to FIG. 16 to FIG. 23.

With Regard to Shape Data Calculation Processing in Shape Data Calculation Unit 215

Next, shape data calculation processing performed in the shape data calculation unit 215 is described in detail with reference to FIG. 24. Although FIG. 24 shows the case where rotation around the L-axis has occurred as disturbance, similarly to the above description, the following description is not limited to the case shown in FIG. 24.

In the shape data calculation unit 215, first as shown in FIG. 24, an apparent height $F_{obs}^a(i, X^a)$ (unit: pixels) for the light-section line $L_a$ in the i-th captured image is specified with reference to captured image data captured by the area camera 111 that is outputted from the imaging data acquisition unit 211. Here, as described above, a coordinate system in the captured image shown in FIG. 24 can be defined using a captured image of the area camera 111 captured while a flat surface of a calibration plate or the like is placed in a position of Z=0. That is, a position in the height direction where the light-section line $L_a$ is imaged may be defined as a reference position of a Y-coordinate $Y^a$ for the light-section line $L_a$ (that is, a position of $Y^a=0$), and an X-coordinate $X^a$ for the light-section line $L_a$ may be defined along the extending direction of the light-section line $L_a$, with the left end of the captured image as a reference.

Next, the shape data calculation unit 215 converts the apparent height $F_{obs}^a(i, X^a)$ (unit: pixels) obtained from the i-th captured image to an apparent height in the Z-coordinate $Z(i, X^a)$ (unit: a unit of length such as mm), using the calibration curve $C^a$ that is the first calibration data stored in the storage unit 207.

The apparent height in the Z-coordinate $Z(i, X^a)$ thus calculated is a value in which a change in the Z-coordinate derived from disturbance (that is, a measurement error) is superimposed. The shape data calculation unit 215 outputs information on the apparent height in the Z-coordinate $Z(i, X^a)$ thus calculated to the correction unit 217 described later.

With Regard to Correction Processing in Correction Unit 217

Next, correction processing performed in the correction unit 217 is described in detail with reference to FIG. 25 and FIG. 26.

The correction unit 217 according to the present embodiment performs correction processing using shape data including a measurement error calculated by the shape data calculation unit 215 (the apparent height in the Z-coordinate $Z(i, X^a)$) and a disturbance component calculated by the disturbance estimation unit 213 (the disturbance component in the Z-coordinate $\Delta Z^b(i)$), and calculates the true surface height of the rigid body S that is the measurement object. The correction processing is repeated for all the images captured by the area camera 111, and thereby the true surface height is placed one upon another in the longitudinal direction; as a result, it becomes possible to calculate the true surface height in the whole rigid body S.

More specifically, the correction unit 217 first calculates a straight line like that shown in FIG. 25, using the disturbance components in the Z-coordinate $\Delta Z^b(i)$ and $\Delta Z^c(i)$ at the intersection point A and the intersection point B calculated by the disturbance estimation unit 213. As mentioned above, the disturbance component in the Z-coordinate $\Delta Z(i, X^a)$ along the light-section line $L_a$ is a linear function (that is, a straight line) with respect to the coordinate $X^a$ because the measurement object is a rigid body. Therefore, the disturbance component in the Z-coordinate $\Delta Z(i, X^a)$ along the light-section line $L_a$ can be specified by calculating a straight line connecting the disturbance components in the Z-coordinate $\Delta Z^b(i)$ and $\Delta Z^c(i)$ at the intersection point A and the intersection point B.

Subsequently, as shown in FIG. 26 and Formula 141 below, the correction unit 217 subtracts the change in the Z-coordinate due to disturbance (that is, the disturbance component $\Delta Z(i, X^a)$) from $Z(i, X^a)$ obtained by the shape data calculation unit 215, and thereby calculates the true surface height in the Z-coordinate $Z_{out}(i, X^a)$.

$$Z_{out}(i, X^a) = Z(i, X^a) - \Delta Z(i, X^a) \qquad \text{(Formula 141)}$$

The correction unit 217 repeats the above processing for all the images captured by the area camera 111 (that is, assuming that the number of images photographed by each of the area cameras 111 and 113 is N, repeats the processing of finding $Z_{out}(i, X^a)$ for $i=1, 2, \ldots, N$), and sequentially arranges the true surface heights in the longitudinal direction; and can thereby calculate the true surface height of the whole rigid body S.

Hereinabove, correction processing performed in the correction unit 217 according to the present embodiment is described with reference to FIG. 25 and FIG. 26.

An example of the function of the arithmetic processing apparatus 200 according to the present embodiment has been illustrated. Each of the above structural elements may be configured with a general-purpose member or circuit, and may be configured with hardware specialized for the function of each structural element. A CPU or the like may perform all of the functions of respective structural elements. Thus, a utilized configuration can be changed as appropriate, according to the technology level at the time of performing the present embodiment.

Note that the computer program for providing each function of the arithmetic processing apparatus according to the above present embodiment can be created and implemented in a personal computer or the like. Moreover, a computer-readable recording medium that contains this computer program can be provided as well. For example, the recording medium is a magnetic disk, an optical disc, a magneto-optical disk, a flash memory, or the like. The above computer program may be delivered via a network for example, without using the recording medium.

(Modification Examples of Imaging Apparatus)

Figure 27:
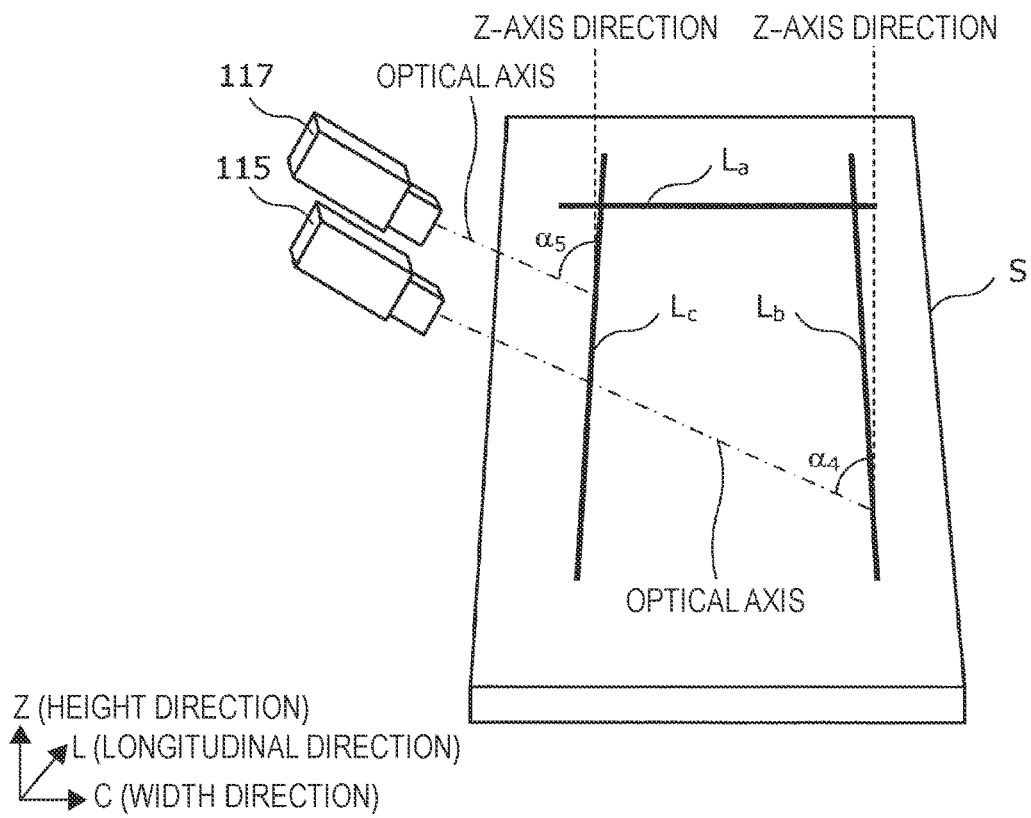
FIG. 27 is an explanatory diagram schematically showing a modification example of the imaging apparatus according to the embodiment.
Figure 28:
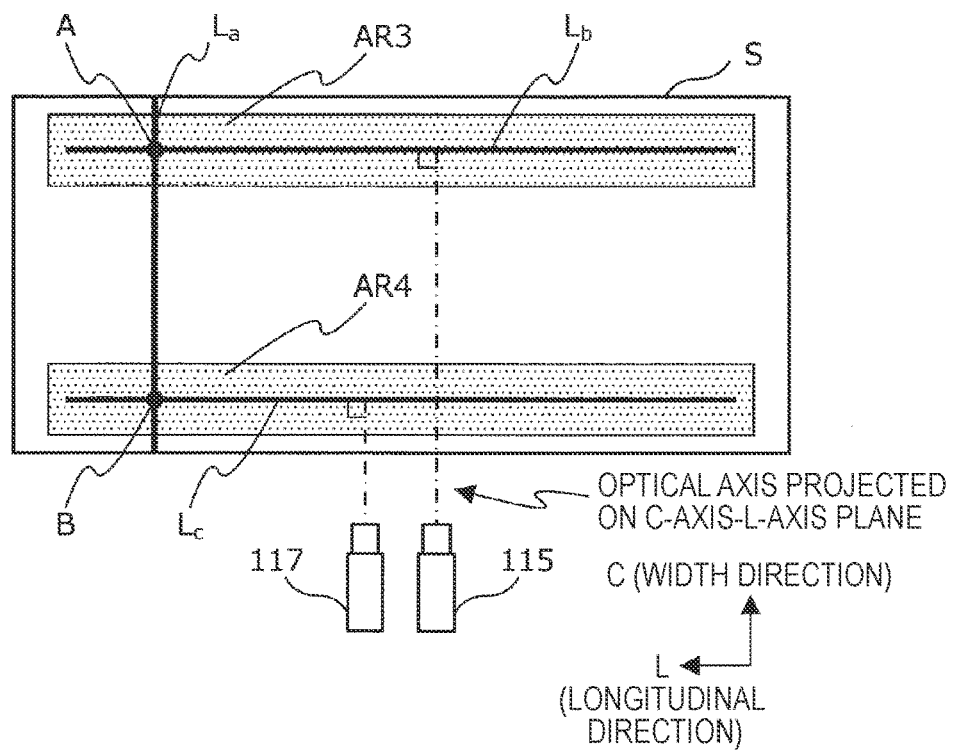
FIG. 28 is an explanatory diagram schematically showing a modification example of the imaging apparatus according to the embodiment.

Next, modification examples of the imaging apparatus 100 according to the present embodiment are briefly described with reference to FIG. 27 and FIG. 28. FIG. 27 and FIG. 28 are explanatory diagrams schematically showing a modification example of the imaging apparatus according to the present embodiment.

Although the above description shows the case where the two area cameras 111 and 113 are provided in the imaging apparatus 100, the configuration of the imaging apparatus 100 according to the present embodiment is not limited to this example.

For example, as shown in FIG. 27, three area cameras may be used such that the light-section line $L_b$ is imaged by an area camera 115 and the light-section line $L_c$ is imaged by an area camera 117, in combination with the area camera 111.

Like in the case where the two area cameras 111 and 113 are used as the imaging apparatus 100, each of the area cameras 115 and 117 is installed such that, as shown in FIG. 28, the light-section line $L_b$ and the optical axis of the area camera 115 projected on the L-axis-C-axis plane are orthogonal, and the light-section line $L_c$ and the optical axis of the area camera 117 projected on the L-axis-C-axis plane are orthogonal. Like in the case where the two area cameras 111 and 113 are used as the imaging apparatus 100, the imaging area AR3 of the area camera 115 and the imaging area AR4 of the area camera 117 may be set so as to include the intersection point A and the intersection point B, respectively, in their imaging visual fields, as appropriate; but it is preferable that the entire light-section lines $L_b$ and $L_c$ be included in the imaging visual field.

Each of the angles $\alpha_4$ and $\alpha_5$ between the optical axes of the area cameras and the Z-axis is preferably set to, for example, approximately 30 degrees to 60 degrees for a similar reason to the case where the number of area cameras is two. The angles $\alpha_4$ and $\alpha_5$ may be the same value, or may be mutually different values. In either case, the shape to be found can be measured by the same calculation processing as the case where one area camera is used.

Although FIG. 27 and FIG. 28 show the case where the two area cameras 115 and 117 are provided on one side in the width direction of the rigid body S, it is also possible to place the area camera 115 on the lateral side of the light-section line $L_b$ side of the rigid body S and place the area camera 117 on the lateral side of the light-section line $L_c$ side of the rigid body S as long as attention is given to the direction of translation in the disturbance estimation unit 213.

Further, four or more area cameras may be used by dividing the photographing visual field for the light-section lines $L_a$, $L_b$, and $L_c$.

Hereinabove, modification examples of the imaging apparatus 100 according to the present embodiment are described with reference to FIG. 27 and FIG. 28.

(With Regard to Flow of Shape Measurement Method)

Figure 29B:
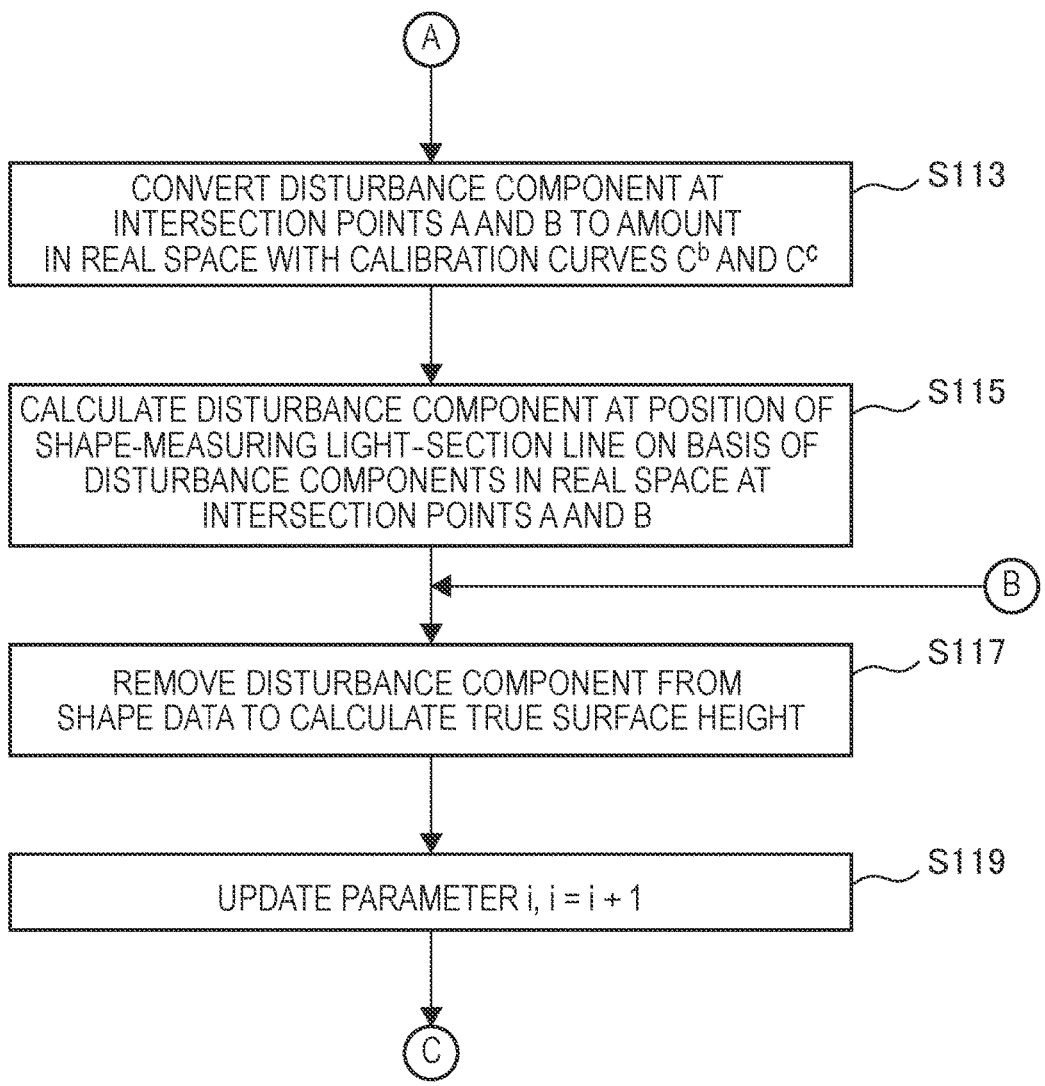
FIG. 29B is a flow chart showing an example of the flow of a shape measurement method according to the embodiment.

Next, a flow of a shape measurement method performed in the shape measurement apparatus 10 according to the present embodiment is briefly described with reference to FIG. 29A and FIG. 29B. FIG. 29A and FIG. 29B are flow charts showing an example of the flow of a shape measurement method according to the present embodiment.

Before the following description, it is assumed that the first calibration data and the second calibration data are appropriately generated and are stored in the storage unit 207 using various methods like the above.

First, under the control of the imaging control unit 201 in the arithmetic processing apparatus 200, the imaging apparatus 100 of the shape measurement apparatus 10 according to the present embodiment images a rigid body to be measured S being conveyed with each of the area cameras 111 and 113, and each camera generates N captured images (step S101). The area cameras 111 and 113 of the imaging apparatus 100, each time they generate one captured image, output imaging data of the generated captured image to the arithmetic processing apparatus 200.

On acquiring imaging data from the imaging apparatus 100, the imaging data acquisition unit 211 of the arithmetic processing apparatus 200 outputs the imaging data generated by the area camera 111 to the shape data calculation unit 215, and outputs the imaging data generated by the area camera 113 to the disturbance estimation unit 213.

The disturbance estimation unit 213, the shape data calculation unit 215, and the correction unit 217 initialize the parameter i used for processing performed in these processing units to i=1 (step S103). Subsequently, the disturbance estimation unit 213, the shape data calculation unit 215, and the correction unit 217 assess whether the value of the parameter i is not more than N, which is the number of captured images (step S105). In the case where the value of the parameter i is not more than N, the disturbance estimation unit 213 starts disturbance estimation processing like the above, and the shape data calculation unit 215 starts shape data calculation processing like the above. Further, the correction unit 217 starts the standby of the output of data sent from the disturbance estimation unit 213 and the shape data calculation unit 215. On the other hand, in the case where the value of the parameter i is more than N, the shape measurement apparatus 10 finishes the shape measurement processing.

The disturbance estimation processing in the disturbance estimation unit 213 and the shape data calculation processing in the shape data calculation unit 215 may be performed in parallel, or the processing in either one processing unit may be performed prior to the processing in the other processing unit, as a matter of course.

By a method like that described above, the shape data calculation unit 215 calculates shape data in the real space (the surface height in the Z-coordinate), using the shape-measuring light-section line (that is, the light-section line $L_a$) and the calibration curve $C^a$ with reference to the i-th captured image (step S107). After calculating shape data in the real space in relation to the i-th captured image, the shape data calculation unit 215 outputs information on the obtained shape data to the correction unit 217.

On the other hand, by a method like that described above, the disturbance estimation unit 213 calculates disturbance components of the common irradiation portion on the basis of the correcting light-section lines (that is, the light-section lines $L_b$ and $L_c$) with reference to the i-th captured image (step S109). After that, the disturbance estimation unit 213 calculates an approximate straight line using the calculated disturbance components, and then calculates the disturbance components at the intersection point A and the intersection point B (step S111). Subsequently, the disturbance estimation unit 213 converts the disturbance components at the intersection point A and the intersection point B to the amounts in the real space using the calibration curves $C^b$ and $C^c$ (step S113). After that, the disturbance estimation unit 213 outputs information on the magnitude of the obtained disturbance component in the real space to the correction unit 217.

The correction unit 217 calculates the disturbance components at positions of the shape-measuring light-section line by a method like that described above on the basis of the disturbance components in the real space at the intersection point A and the intersection point B outputted from the disturbance estimation unit 213 (step S115). After that, the correction unit 217 subtracts the disturbance component in the real space from the shape data in the real space outputted from the shape data calculation unit 215, and calculates the true surface height (step S117).

After that, the disturbance estimation unit 213, the shape data calculation unit 215, and the correction unit 217 update the value of the parameter i to i=i+1 (step S119), and perform the processing of step S105 again.

Hereinabove, a flow of a shape measurement method according to the present embodiment is briefly described with reference to FIG. 29A and FIG. 29B.

(Hardware Configuration)

Figure 30:
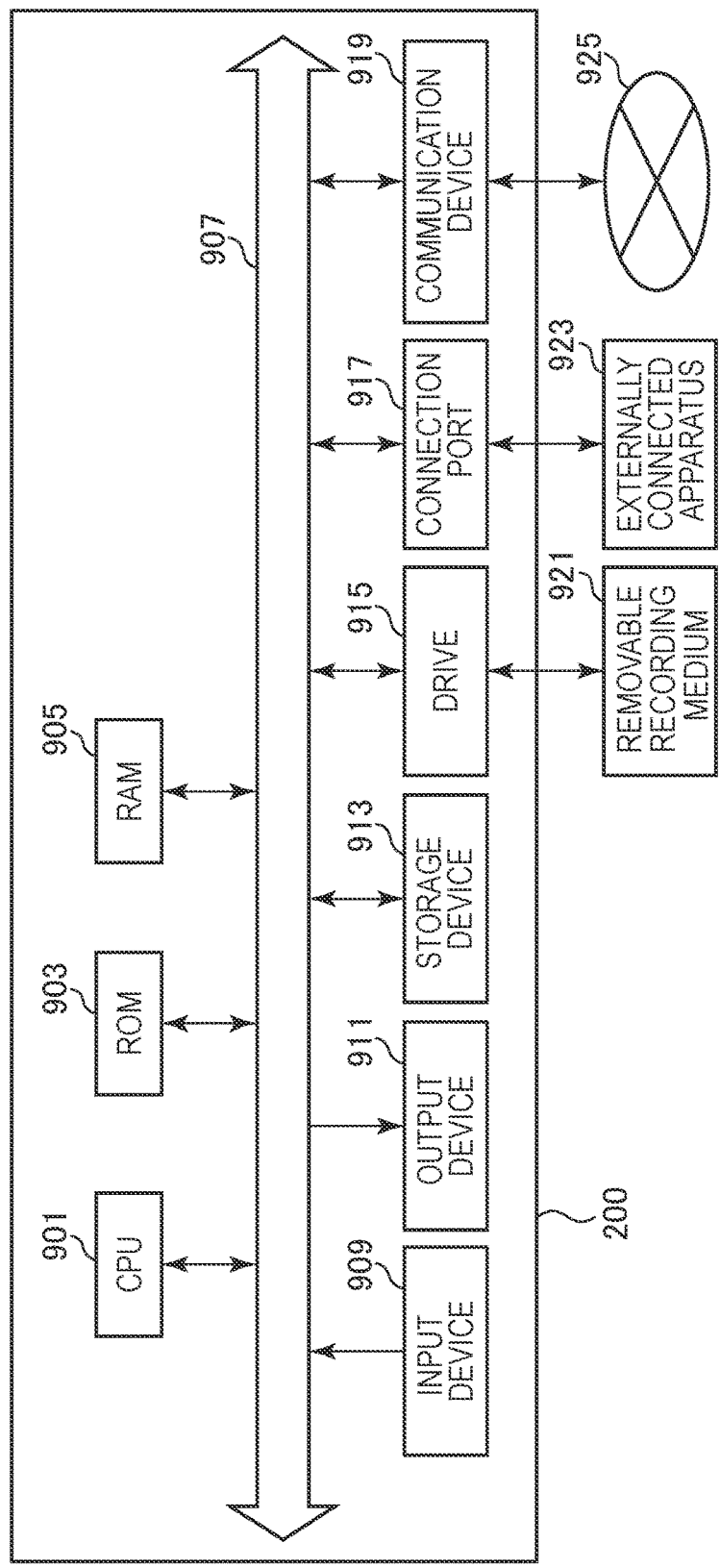
FIG. 30 is a block diagram showing an example of the hardware configuration of the arithmetic processing apparatus according to the embodiment.

Next, the hardware configuration of the arithmetic processing apparatus 200 according to an embodiment of the present invention will be described in detail with reference to FIG. 30. FIG. 30 is a block diagram for explaining the hardware configuration of the arithmetic processing apparatus 200 according to an embodiment of the present invention.

The arithmetic processing apparatus 200 mainly includes a CPU 901, a ROM 903, and a RAM 905. Furthermore, the arithmetic processing apparatus 200 also includes a bus 907, an input device 909, an output device 911, a storage device 913, a drive 915, a connection port 917, and a communication device 919.

The CPU 901 serves as a central processing apparatus and a control device, and controls the overall operation or a part of the operation of the arithmetic processing apparatus 200 according to various programs recorded in the ROM 903, the RAM 905, the storage device 913, or a removable recording medium 921. The ROM 903 stores programs, operation parameters, and the like used by the CPU 901. The RAM 905 primarily stores programs that the CPU 901 uses and parameters and the like varying as appropriate during the execution of the programs. These are connected with each other via the bus 907 configured from an internal bus such as a CPU bus or the like.

The bus 907 is connected to the external bus such as a PCI (Peripheral Component Interconnect/Interface) bus via the bridge.

The input device 909 is an operation means operated by a user, such as a mouse, a keyboard, a touch panel, buttons, a switch and a lever. The input device 909 may be a remote control means (a so-called remote control) using, for example, infrared light or other radio waves, or may be an externally connected apparatus 923 such as a PDA conforming to the operation of the arithmetic processing apparatus 200. Furthermore, the input device 909 generates an input signal based on, for example, information which is input by a user with the above operation means, and is configured from an input control circuit for outputting the input signal to the CPU 901. The user can input various data to the shape measurement apparatus 10 and can instruct the shape inspection apparatus 10 to perform processing by operating this input device 909.

The output device 911 is configured from a device capable of visually or audibly notifying acquired information to a user. Examples of such device include display devices such as a CRT display device, a liquid crystal display device, a plasma display device, an EL display device and lamps, audio output devices such as a speaker and a headphone, a printer, a mobile phone, a facsimile machine, and the like. For example, the output device 911 outputs a result obtained by various processes performed by the arithmetic processing apparatus 200. More specifically, the display device displays, in the form of texts or images, a result obtained by various processes performed by the arithmetic processing apparatus 200. On the other hand, the audio output device converts an audio signal such as reproduced audio data and sound data into an analog signal, and outputs the analog signal.

The storage device 913 is a device for storing data configured as an example of a storage unit of the arithmetic processing apparatus 200 and is used to store data. The storage device 913 is configured from, for example, a magnetic storage device such as a HDD (Hard Disk Drive), a semiconductor storage device, an optical storage device, or a magneto-optical storage device. This storage device 913 stores programs to be executed by the CPU 901, various data, and various data obtained from the outside.

The drive 915 is a reader/writer for recording medium, and is embedded in the arithmetic processing apparatus 200 or attached externally thereto. The drive 915 reads information recorded in the attached removable recording medium 921 such as a magnetic disk, an optical disk, a magneto-optical disk, or a semiconductor memory, and outputs the read information to the RAM 905. Furthermore, the drive 915 can write in the attached removable recording medium 921 such as a magnetic disk, an optical disk, a magneto-optical disk, or a semiconductor memory. The removable recording medium 921 is, for example, a CD medium, a DVD medium, or a Blu-ray (registered trademark) medium. The removable recording medium 921 may be a Compact-Flash (CF; registered trademark), a flash memory, an SD memory card (Secure Digital Memory Card), or the like. Alternatively, the removable recording medium 921 may be, for example, an IC card (Integrated Circuit Card) equipped with a non-contact IC chip or an electronic device.

The connection port 917 is a port for allowing devices to directly connect to the arithmetic processing apparatus 200. Examples of the connection port 917 include a USB (Universal Serial Bus) port, an IEEE1394 port, a SCSI (Small Computer System Interface) port, an RS-232C port, and the like. By the externally connected apparatus 923 connecting to this connection port 917, the arithmetic processing apparatus 200 directly obtains various data from the externally connected apparatus 923 and provides various data to the externally connected apparatus 923.

The communication device 919 is a communication interface configured from, for example, a communication device for connecting to a communication network 925. The communication device 919 is, for example, a wired or wireless LAN (Local Area Network), Bluetooth (registered trademark), a communication card for WUSB (Wireless USB), or the like. Alternatively, the communication device 919 may be a router for optical communication, a router for ADSL (Asymmetric Digital Subscriber Line), a modem for various communications, or the like. This communication device 919 can transmit and receive signals and the like in accordance with a predetermined protocol such as TCP/IP on the Internet and with other communication devices, for example. The communication network 925 connected to the communication device 919 is configured from a network and the like, which is connected via wire or wirelessly, and may be, for example, the Internet, a home LAN, an in-house LAN, infrared communication, radio wave communication, satellite communication, or the like.

Heretofore, an example of the hardware configuration capable of realizing the functions of the arithmetic processing apparatus 200 according to an embodiment of the present invention has been shown. Each of the structural elements described above may be configured using a general-purpose material, or may be configured from hardware dedicated to the function of each structural element. Accordingly, the hardware configuration to be used can be changed as appropriate according to the technical level at the time of carrying out the present embodiment.

EXAMPLES

In the following, the shape measurement apparatus and the shape measurement method according to the present invention are specifically described with reference to Examples. Examples shown below are only examples of the shape measurement apparatus and the shape measurement method according to the present invention, and the shape measurement apparatus and the shape measurement method according to the present invention are not limited to Examples shown below.

In Example 1 to Example 3 shown below, an aluminum sheet in which it is known that a surface thereof is flat was used as the rigid body to be measured S. The shape measurement apparatus used for shape measurement is the shape measurement apparatus 10 according to the present embodiment like that shown in FIG. 1 and FIG. 2.

In Example 1 to Example 3, while an aluminum sheet like that mentioned above was conveyed 60 mm at a constant speed of 5 mm/second, one image was captured per 0.2 seconds with two area cameras, and 60 captured images were obtained by each area camera. Before the above, the calibration curves $C^a$, $C^b$, and $C^c$, and $\Delta L^b$ and $\Delta L^c$ were created, and the obtained data were stored in the storage unit.

In Examples shown below, during the conveyance of the aluminum sheet, three kinds of disturbance (movement in the Z-axis direction, rotation around the L-axis, and rotation around the C-axis) were added respectively, and the value $Z(i, X^a)$ in which a change in the Z-coordinate derived from disturbance was included and the true surface height $Z_{out}(i, X^a)$ (i=1, 2, . . . , 60) outputted from the arithmetic processing apparatus 200 were compared. The following shows results obtained by converting the $X^a$-coordinate (unit: pixels) to the C-coordinate (unit: mm) that is in the width direction of the rigid body S.

Example 1

Figure 31A:
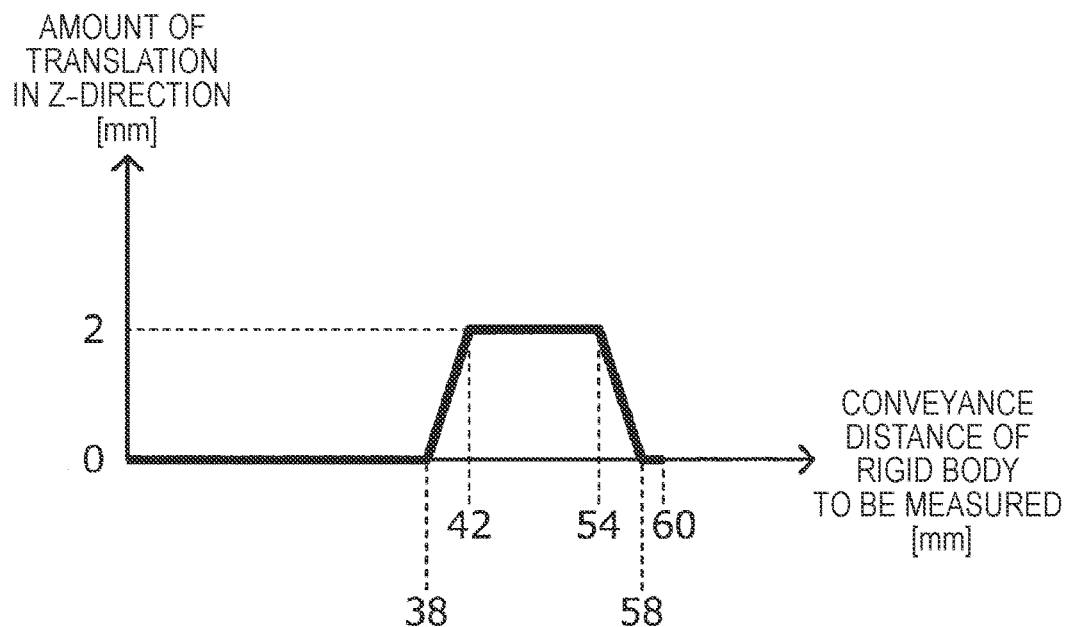
FIG. 31A is an explanatory diagram for describing Experimental Example 1.
Figure 31B:
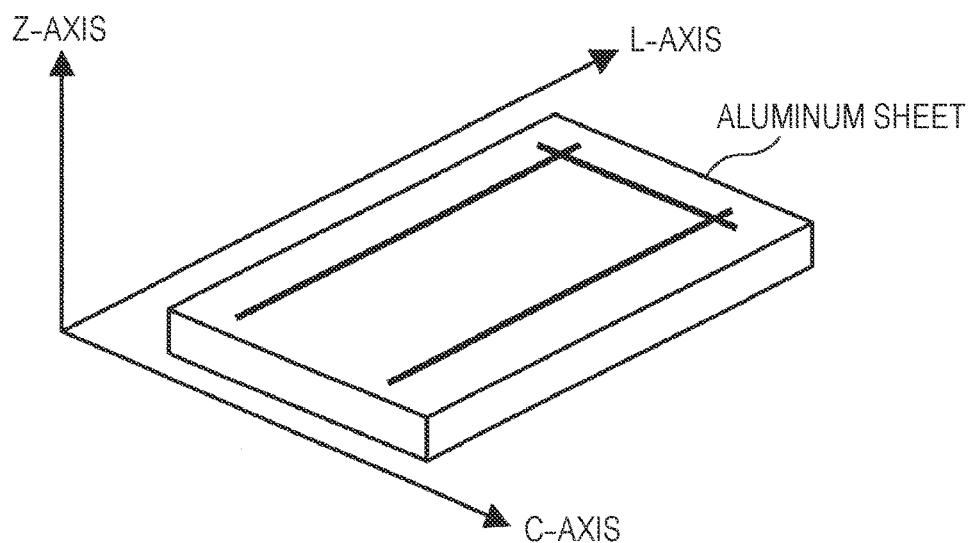
FIG. 31B is an explanatory diagram for describing Example 1.
Figure 31C:
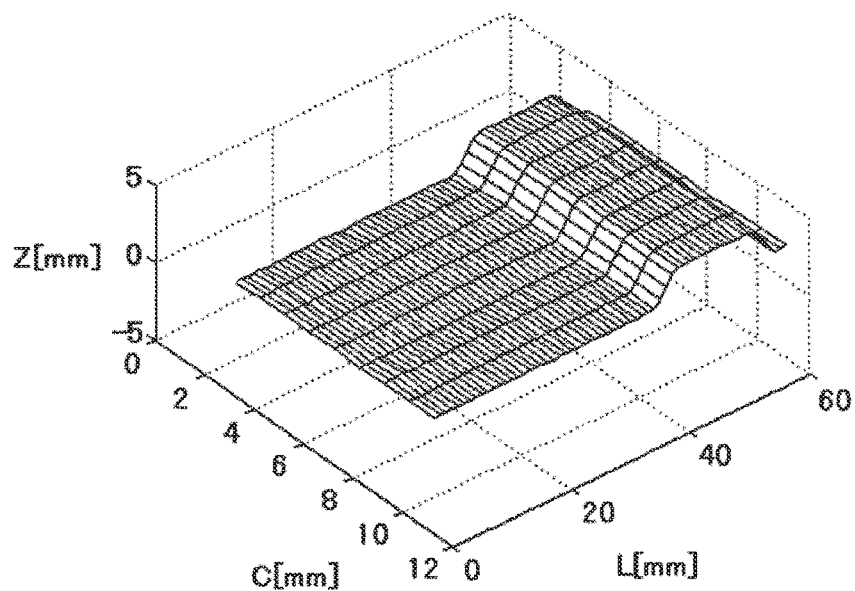
FIG. 31C is a graph showing a result of Experimental Example 1.
Figure 31D:
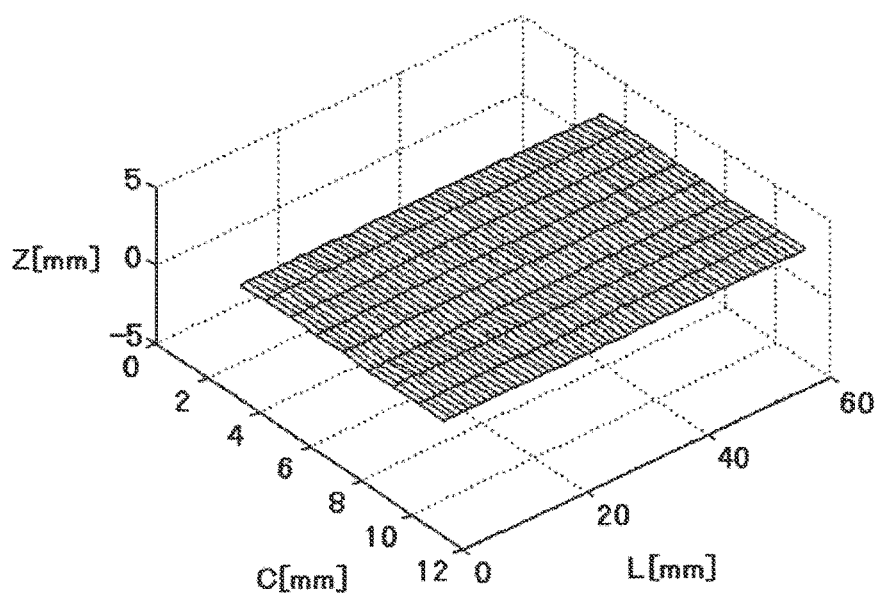
FIG. 31D is a graph showing a result of Experimental Example 1.

In Example 1, translation in the Z-direction like that shown in FIG. 31A was added as disturbance during the conveyance of the aluminum sheet. The positions of the light-section lines are as shown in FIG. 31B. As a result, as shown in FIG. 31C, it can be seen that changes in the Z-axis direction due to the disturbance have been superimposed in $Z(i, X^a)$, and the surface height of the corresponding portion is not flat. This result indicates that $Z(i, X^a)$ has failed to express an accurate surface height. On the other hand, as shown in FIG. 31D, it has been found that $Z_{out}(i, X^a)$ (i=1, 2, ..., 60) is flat and an accurate surface height has been measured.

Example 2

Figure 32A:
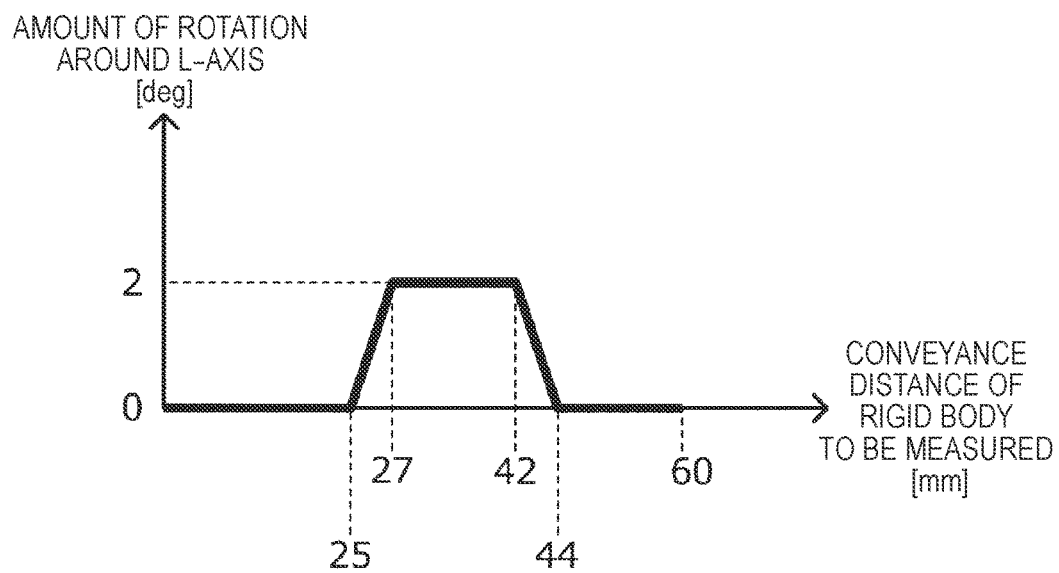
FIG. 32A is an explanatory diagram for describing Experimental Example 2.
Figure 32B:
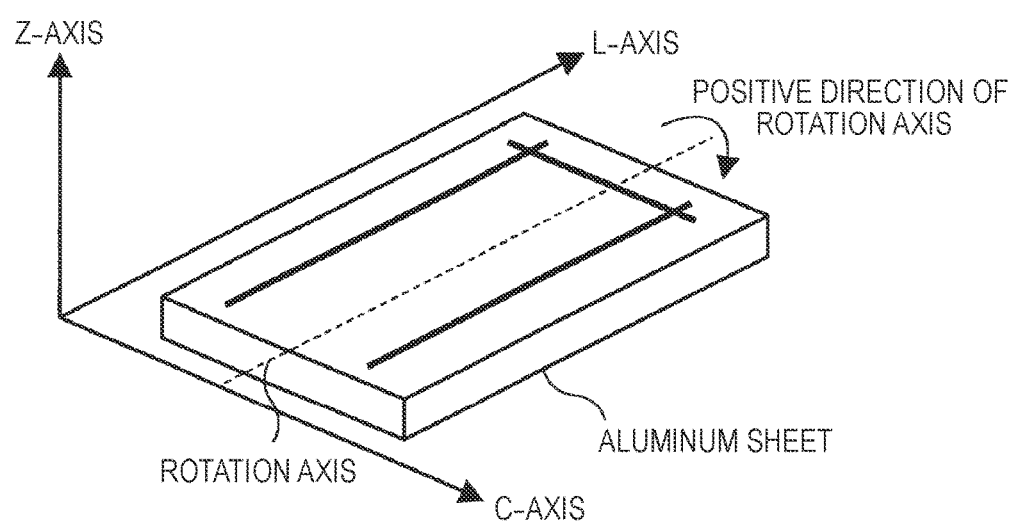
FIG. 32B is an explanatory diagram for describing Example 2.
Figure 32C:
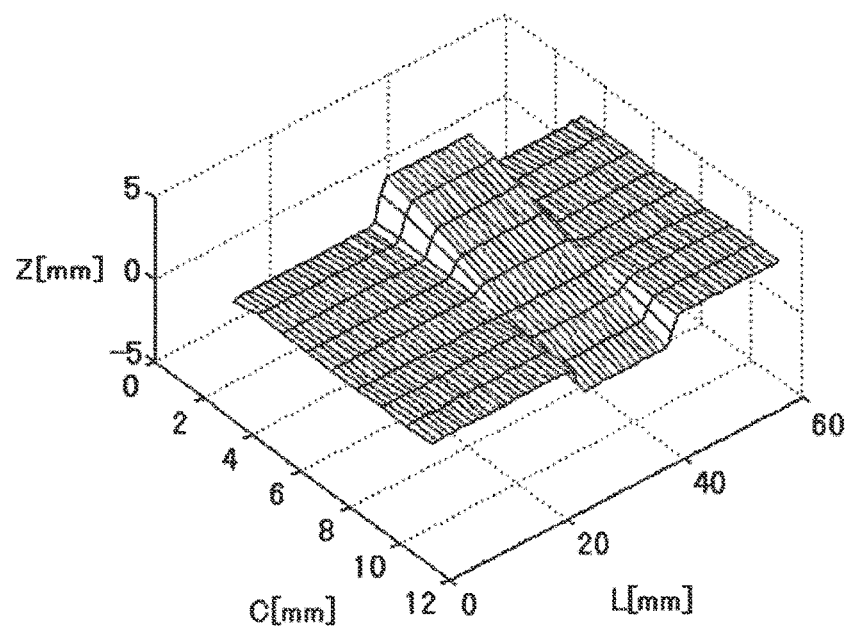
FIG. 32C is a graph showing a result of Experimental Example 2.
Figure 32D:
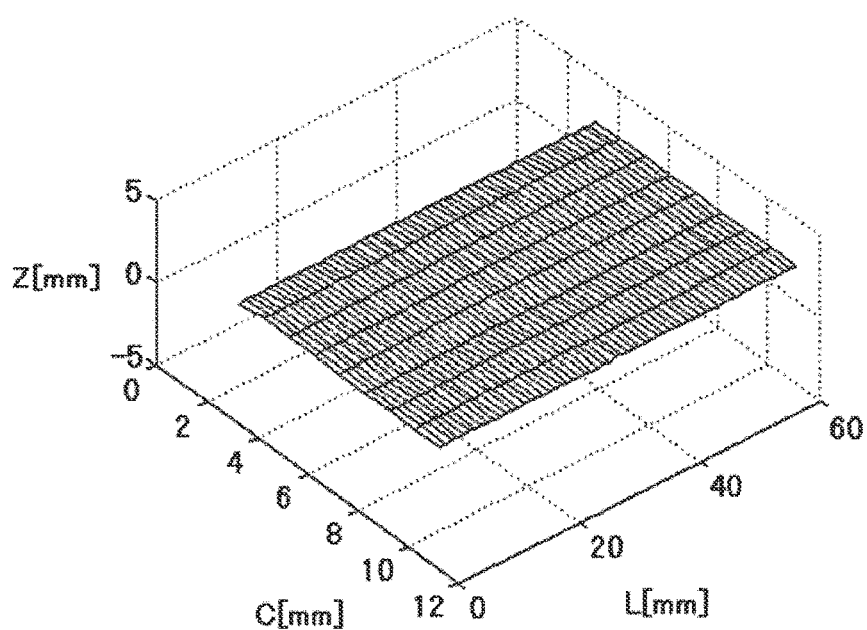
FIG. 32D is a graph showing a result of Experimental Example 2.

In Example 2, rotation around the L-axis like that shown in FIG. 32A (the rotation axis was set to the center position in the width direction of the aluminum sheet, and the positive direction of the rotation angle was set to clockwise along the positive direction of the L-axis) was added as disturbance during the conveyance of the aluminum sheet. The positional relationship between the positions of the light-section lines and the rotation axis is as shown in FIG. 32B. As a result, as shown in FIG. 32C, it can be seen that changes in the Z-axis direction due to the rotation around the L-axis have been superimposed in $Z(i, X^a)$, and the surface height of the corresponding portion is not flat. This result indicates that $Z(i, X^a)$ has failed to express an accurate surface height. On the other hand, as shown in FIG. 32D, it has been found that $Z_{out}(i, X^a)$ (i=1, 2, ..., 60) is flat and an accurate surface height has been measured.

Example 3

Figure 33A:
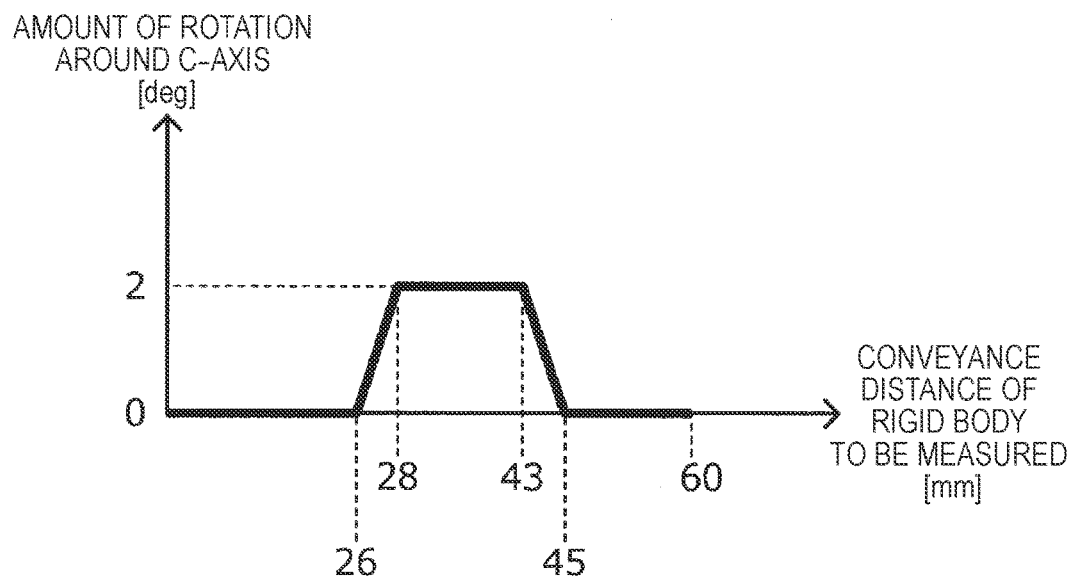
FIG. 33A is an explanatory diagram for describing Experimental Example 3.
Figure 33B:
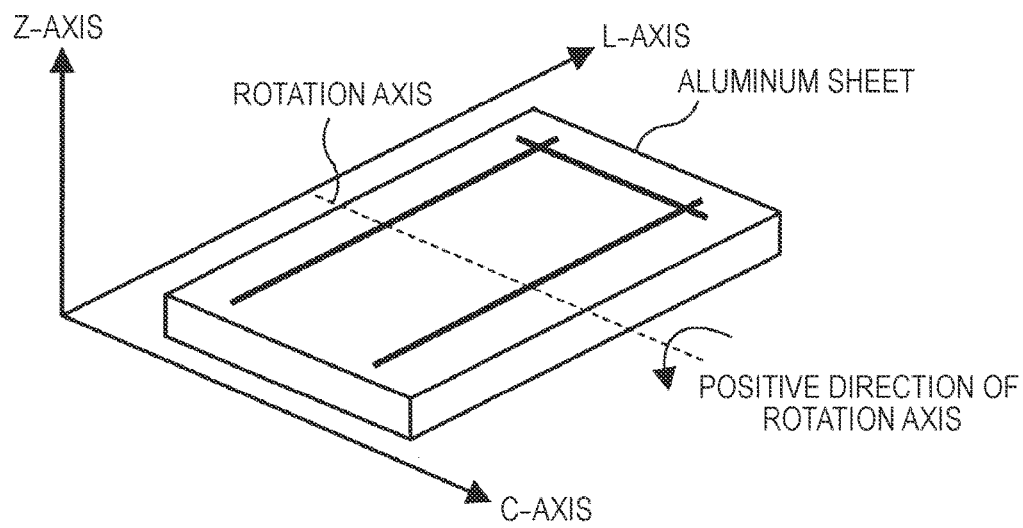
FIG. 33B is an explanatory diagram for describing Example 3.
Figure 33C:
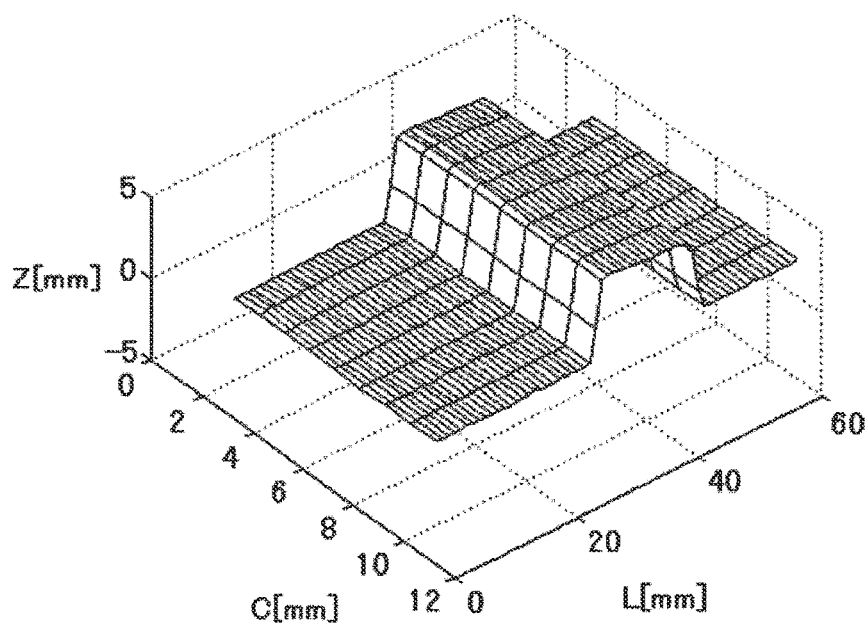
FIG. 33C is a graph showing a result of Experimental Example 3.
Figure 33D:
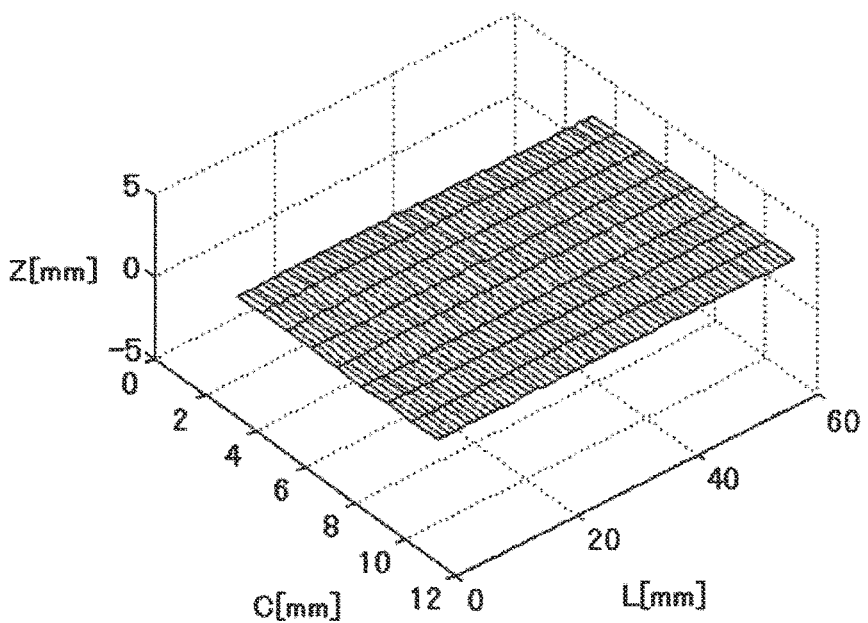
FIG. 33D is a graph showing a result of Experimental Example 3.

In Example 3, rotation around the C-axis like that shown in FIG. 33A (the rotation axis was set to the center position in the longitudinal direction of the aluminum sheet, and the positive direction of the rotation angle was set to clockwise along the positive direction of the C-axis) was added as disturbance during the conveyance of the aluminum sheet. The positional relationship between the positions of the light-section lines and the rotation axis is as shown in FIG. 33B. As a result, as shown in FIG. 33C, it can be seen that changes in the Z-axis direction due to the rotation around the C-axis have been superimposed in $Z(i, X^a)$, and the surface height of the corresponding portion is not flat. This result indicates that $Z(i, X^a)$ has failed to express an accurate surface height. On the other hand, as shown in FIG. 33D, it has been found that $Z_{out}(i, X^a)$ (i=1, 2, ..., 60) is flat, and an accurate surface height has been measured.

The preferred embodiment(s) of the present invention has/have been described above with reference to the accompanying drawings, whilst the present invention is not limited to the above examples. A person skilled in the art may find various alterations and modifications within the scope of the appended claims, and it should be understood that they will naturally come under the technical scope of the present invention.

REFERENCE SIGNS LIST 10 shape measurement apparatus
100 imaging apparatus
101a, 101b, and 101c linear laser light source
111, 113, 115, 117 area camera
200 arithmetic processing apparatus
201 imaging control unit
203 image processing unit
205 display control unit
207 storage unit
211 imaging data acquisition unit
213 disturbance estimation unit
215 shape data calculation unit
217 correction unit
219 result output unit
221 common irradiation portion disturbance estimation unit
223 intersection point position disturbance estimation unit

The invention claimed is:

1. A shape measurement apparatus that measures a shape of a rigid body to be measured by means of a plurality of light-section lines based on a plurality of linear laser light beams applied to a surface of the rigid body to be measured from a plurality of linear laser light sources moving relative to the rigid body to be measured along a longitudinal direction of the rigid body to be measured, the shape measurement apparatus comprising:
an imaging apparatus that applies three beams of the linear laser light to the surface of the rigid body to be measured moving relatively along the longitudinal direction and images reflected light of the three beams of the linear laser light from the surface of the rigid body to be measured at a prescribed longitudinal-direction interval; and
an arithmetic processing apparatus that performs image processing on captured images related to the light-section lines imaged by the imaging apparatus and calculates a surface shape of the rigid body to be measured, wherein the imaging apparatus includes
a first linear laser light source that emits a shape-measuring light-section line that is the light-section line extending in a width direction of the rigid body to be measured and is used to calculate the surface shape of the rigid body to be measured,
a second linear laser light source that emits a first correcting light-section line that is parallel to the longitudinal direction of the rigid body to be measured and crosses the shape-measuring light-section line, and is used to correct an effect of disturbance acting on the rigid body to be measured,
a third linear laser light source that emits a second correcting light-section line that is parallel to the longitudinal direction of the rigid body to be measured, crosses the shape-measuring light-section line, and exists in a width-direction position of the rigid body to be measured different from the first correcting light-section line, and is used to correct an effect of disturbance acting on the rigid body to be measured,
a first camera that images the shape-measuring light-section line at each time corresponding to a prescribed longitudinal-direction interval and generates a captured image of the shape-measuring light-section line at each time, and
a second camera that images the correcting light-section lines at each time corresponding to a prescribed longitudinal-direction interval and generates a captured image of the correcting light-section lines at each time, and the arithmetic processing apparatus includes
a shape data calculation unit that, on the basis of the captured image of the shape-measuring light-section line at each time generated by the first camera, calculates shape data that show a three-dimensional shape of the surface of the rigid body to be measured and in which a measurement error derived from the disturbance is superimposed,
a disturbance estimation unit that
performs, on a plurality of points of different longitudinal-direction positions of the first correcting light-section line, height change value acquisition processing of acquiring, from height measurement values related to a surface height of the rigid body to be measured acquired at different two times for the same position of the rigid body to be measured, a height change value derived from the disturbance at the position, using captured images of the first correcting light-section line, performs the height change value acquisition processing on a plurality of points of different longitudinal-direction positions of the second correcting light-section line using captured images of the second correcting light-section line, and estimates the amount of height fluctuation derived from the disturbance superimposed in the shape data, using a plurality of height change values derived from the disturbance obtained from captured images of the first correcting light-section line and a plurality of height change values derived from the disturbance obtained from captured images of the second correcting light-section line, and a correction unit that subtracts the amount of height fluctuation from the shape data and thereby corrects the measurement error derived from the disturbance.

2. The shape measurement apparatus according to claim 1, wherein the disturbance estimation unit approximates, with a straight line, height change values derived from the disturbance at a plurality of points on the first correcting light-section line and estimates a height change value derived from the disturbance at an intersection point of the straight line and the shape-measuring light-section line, approximates, with a straight line, height change values derived from the disturbance at a plurality of points on the second correcting light-section line and estimates a height change value derived from the disturbance at an intersection point of the straight line and the shape-measuring light-section line, and estimates the amount of height fluctuation by means of a straight line connecting the height change values derived from the disturbance at the two intersection points.

3. The shape measurement apparatus according to claim 1, wherein each of the first camera and the second camera performs imaging at each time corresponding to a prescribed longitudinal-direction interval and generates N (N being an integer of 2 or more) captured images, and the disturbance estimation unit calculates the amount of height fluctuation on the assumption that the disturbance has not occurred in a 1st captured image.

4. The shape measurement apparatus according to claim 1, wherein an imaging timing of the first camera and the second camera is controlled so that a common irradiation region that is a portion of the rigid body to be measured irradiated with the correcting light-section line in common exists in captured images of the second camera captured at mutually adjacent imaging times, and the disturbance estimation unit calculates a height change value derived from the disturbance for the plurality of points falling under the common irradiation region of each of the first correcting light-section line and the second correcting light-section line.

5. The shape measurement apparatus according to claim 4, wherein, using an apparent surface height including the height change value obtained from an i+1-th captured image (i=1, 2, . . . , N−1) of the second camera and a surface height that is obtained from an i-th captured image of the second camera and that is after the height change value in the common irradiation region of the i-th captured image is removed, the disturbance estimation unit calculates the height change value in the i+1-th captured image and a surface height after the height change value is removed.

6. The shape measurement apparatus according to claim 4, wherein the disturbance estimation unit calculates the height change value in an i-th captured image (i= 2, . . . , N) of the second camera with a 1st captured image of the second camera as a reference.

7. The shape measurement apparatus according to claim 1, wherein the first linear laser light source, the second linear laser light source, and the third linear laser light source are provided such that an optical axis of each light source is perpendicular to a plane defined by a longitudinal direction and a width direction of the rigid body to be measured.

8. The shape measurement apparatus according to claim 1, wherein an angle between an optical axis of the first camera and an optical axis of the first linear laser light source, an angle between a line of sight of the second camera and an optical axis of the second linear laser light source, and an angle between the line of sight of the second camera and an optical axis of the third linear laser light source are mutually independently not less than 30 degrees and not more than 60 degrees.

9. A shape measurement method that measures a shape of a rigid body to be measured by means of a plurality of light-section lines based on a plurality of linear laser light beams applied to a surface of the rigid body to be measured from a plurality of linear laser light sources moving relative to the rigid body to be measured along a longitudinal direction of the rigid body to be measured, the shape measurement method comprising:

an imaging step of imaging reflected light of three light-section lines from the surface of the rigid body to be measured at a prescribed longitudinal-direction interval by applying the three light-section lines to the surface of the rigid body to be measured moving relatively along the longitudinal direction from an imaging apparatus including a first linear laser light source that emits a shape-measuring light-section line that is the light-section line extending in a width direction of the rigid body to be measured and is used to calculate a surface shape of the rigid body to be measured, a second linear laser light source that emits a first correcting light-section line that is parallel to the longitudinal direction of the rigid body to be measured and crosses the shape-measuring light-section line, and is used to correct an effect of disturbance acting on the rigid body to be measured, a third linear laser light source that emits a second correcting light-section line that is parallel to the longitudinal direction of the rigid body to be measured, crosses the shape-measuring light-section line, and exists in a width-direction position of the rigid body to be measured different from the first correcting light-section line, and is used to correct an effect of disturbance acting on the rigid body to be measured, a first camera that images the shape-measuring light-section line at each time corresponding to a prescribed longitudinal-direction interval and generates a captured image of the shape-measuring light-section line at each time, and a second camera that images the correcting light-section lines at each time corresponding to a prescribed longitudinal-direction interval and generates a captured image of the correcting light-section lines at each time;

a shape data calculation step of, on the basis of the captured image of the shape-measuring light-section line at each time generated by the first camera, calculating shape data that show a three-dimensional shape of the surface of the rigid body to be measured and in which a measurement error derived from the disturbance is superimposed;

a disturbance estimation step of performing, on a plurality of points of different longitudinal-direction positions of the first correcting light-section line, height change value acquisition processing of acquiring, from height measurement values related to a surface height of the rigid body to be measured acquired at different two times for the same position of the rigid body to be measured, a height change value derived from the disturbance at the position, using captured images of the first correcting light-section line, performing the height change value acquisition processing on a plurality of points of different longitudinal-direction positions of the second correcting light-section line using captured images of the second correcting light-section line, and estimating the amount of height fluctuation derived from the disturbance superimposed in the shape data, using a plurality of height change values derived from the disturbance obtained from captured images of the first correcting light-section line and a plurality of height change values derived from the disturbance obtained from captured images of the second correcting light-section line; and a correction step of subtracting the amount of height fluctuation from the shape data and thereby correcting the measurement error derived from the disturbance.

10. The shape measurement method according to claim 9, wherein, in the disturbance estimation step, height change values derived from the disturbance at a plurality of points on the first correcting light-section line are approximated with a straight line and thereby a height change value derived from the disturbance at an intersection point of the straight line and the shape-measuring light-section line is estimated, height change values derived from the disturbance at a plurality of points on the second correcting light-section line are approximated with a straight line and thereby a height change value derived from the disturbance at an intersection point of the straight line and the shape-measuring light-section line is estimated, and the amount of height fluctuation is estimated by means of a straight line connecting the height change values derived from the disturbance at the two intersection points.

11. The shape measurement method according to claim 9, wherein each of the first camera and the second camera performs imaging at each time corresponding to a prescribed longitudinal-direction interval and generates N (N being an integer of 2 or more) captured images, and in the disturbance estimation step, the amount of height fluctuation is calculated on the assumption that the disturbance has not occurred in a 1st captured image.

12. The shape measurement method according to claim 9, wherein an imaging timing of the first camera and the second camera is controlled so that a common irradiation region that is a portion of the rigid body to be measured irradiated with the correcting light-section line in common exists in captured images of the second camera imaged at mutually adjacent imaging times, and in the disturbance estimation step, a height change value derived from the disturbance is calculated for the plurality of points falling under the common irradiation region of each of the first correcting light-section line and the second correcting light-section line.

13. The shape measurement method according to claim 12, wherein, in the disturbance estimation step, using an apparent surface height including the height change value obtained from an i+1-th captured image (i=1, 2, . . . , N−1) of the second camera and a surface height that is obtained from an i-th captured image of the second camera and that is after the height change value in the common irradiation region of the i-th captured image is removed, the height change value in the i+1-th captured image and a surface height after the height change value is removed are calculated.

14. The shape measurement method according to claim 12, wherein, in the disturbance estimation step, the height change value in an i-th captured image (i=2, . . . , N) of the second camera is calculated with a 1st captured image of the second camera as a reference.

15. The shape measurement method according to claim 9, wherein the first linear laser light source, the second linear laser light source, and the third linear laser light source are provided such that an optical axis of each light source is perpendicular to a plane defined by a longitudinal direction and a width direction of the rigid body to be measured.

16. The shape measurement method according to claim 9, wherein an angle between an optical axis of the first camera and an optical axis of the first linear laser light source, an angle between a line of sight of the second camera and an optical axis of the second linear laser light source, and an angle between the line of sight of the second camera and an optical axis of the third linear laser light source are mutually independently not less than 30 degrees and not more than 60 degrees.

* * * * *